United States Patent
Wang et al.

(10) Patent No.: US 9,825,559 B2
(45) Date of Patent: Nov. 21, 2017

(54) MOTOR CONTROL SYSTEM AND CONTROL SYSTEM FOR ELECTRIC MOTOR-DRIVEN VEHICLE

(71) Applicant: Kanzaki Kokyukoki Mfg. Co., Ltd., Amagasaki, Hyogo (JP)

(72) Inventors: Hongkun Wang, Hyogo (JP); Kazunari Koga, Hyogo (JP); Shigeaki Nakagawa, Hyogo (JP); Fumitoshi Ishino, Hyogo (JP); William J. Cass, Southwick, MA (US)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 65 days.

(21) Appl. No.: 14/870,748

(22) Filed: Sep. 30, 2015

(65) Prior Publication Data
US 2016/0020714 A1  Jan. 21, 2016

Related U.S. Application Data

(62) Division of application No. 14/012,423, filed on Aug. 28, 2013, now Pat. No. 9,263,975.

(30) Foreign Application Priority Data

Aug. 29, 2012 (JP) ................... 2012-188266
Sep. 10, 2012 (JP) ................... 2012-198243
Dec. 7, 2012 (JP) ................... 2012-268076

(51) Int. Cl.
*H02P 1/00* (2006.01)
*H02P 1/02* (2006.01)
(Continued)

(52) U.S. Cl.
CPC .............. *H02P 1/021* (2013.01); *A01D 34/78* (2013.01); *B60L 11/1861* (2013.01); *H02P 3/02* (2013.01);
(Continued)

(58) Field of Classification Search
CPC .......... B60L 2200/40; B60L 2240/486; B60L 2240/36; B60L 11/1861; B60L 1/00;
(Continued)

(56) References Cited

U.S. PATENT DOCUMENTS 5,502,957 A * 4/1996 Robertson .......... A01D 34/6806
56/10.2 G
5,937,622 A * 8/1999 Carrier ................. A01D 34/006
56/10.2 R
(Continued)

FOREIGN PATENT DOCUMENTS

JP   H5015230 A   1/1993
JP   05-158534 A   6/1993
(Continued)

OTHER PUBLICATIONS

United States *Ex Parte Quayle Action* corresponding to U.S. Appl. No. 14/012,423, dated Jul. 31, 2015.
(Continued)

*Primary Examiner* — Bentsu Ro
*Assistant Examiner* — Thai Dinh
(74) *Attorney, Agent, or Firm* — Cantor Colburn LLP

(57) ABSTRACT

A motor control system includes a drive motor and a deck motor that are connected to a battery, an ECU, and a key switch. The key switch acquires that an operation unit has been turned on, and transmits a restart permission signal to the ECU. When SOC of the battery reaches or falls below a first threshold set in advance, the ECU performs a step of disabling all the motors, and when the restart permission signal is received, the ECU performs a step of executing a decelerated travelling mode where the disabled state of the drive motor is released and an allowed speed of the drive motor is reduced.

8 Claims, 33 Drawing Sheets

(51) Int. Cl.
*H02P 3/02* (2006.01)
*B60L 11/18* (2006.01)
*A01D 34/78* (2006.01)
*H02P 5/68* (2006.01)
*H02P 29/028* (2016.01)
*H02P 29/032* (2016.01)
*H02P 29/60* (2016.01)

(52) U.S. Cl.
CPC ............. *H02P 5/68* (2013.01); *H02P 29/028* (2013.01); *H02P 29/032* (2016.02); *H02P 29/60* (2016.02); *B60L 2200/40* (2013.01); *Y02T 10/648* (2013.01); *Y02T 10/705* (2013.01); *Y02T 10/7005* (2013.01); *Y02T 10/7044* (2013.01); *Y02T 10/7258* (2013.01)

(58) Field of Classification Search
CPC .... B60L 7/14; B60L 11/1872; B60L 2240/12; B60L 2240/485; H02P 5/68; H02P 29/028; H02P 29/60; H02P 3/02
USPC ......... 318/139, 34, 46, 51, 53, 59; 180/65.1, 180/65.31, 65.8, 422
See application file for complete search history.

(56) References Cited

U.S. PATENT DOCUMENTS

| | | | | |
|---|---|---|---|---|
| 6,523,334 | B1* | 2/2003 | Dettmann | A01D 34/58 56/11.9 |
| 7,017,327 | B2* | 3/2006 | Hunt | B60W 10/08 56/14.7 |
| 7,164,247 | B2 | 1/2007 | Joe et al. | |
| 7,426,973 | B2 | 9/2008 | Matsubara et al. | |
| 7,610,738 | B2* | 11/2009 | Daly | A01D 34/006 56/10.2 R |
| 7,973,499 | B2* | 7/2011 | Yoshioka | B60L 11/18 318/139 |
| 8,055,399 | B2* | 11/2011 | Wyatt | B60K 7/0007 701/22 |
| 8,210,291 | B2 | 7/2012 | Matsubara et al. | |
| 8,307,924 | B2 | 11/2012 | Wang et al. | |
| 8,598,816 | B2 | 12/2013 | Iesaki | |
| 9,263,975 | B2* | 2/2016 | Wang | A01D 34/78 |
| 2005/0126145 | A1 | 6/2005 | Hunt et al. | |
| 2009/0065273 | A1 | 3/2009 | Wyatt et al. | |
| 2009/0069964 | A1 | 3/2009 | Wyatt et al. | |
| 2009/0201650 | A1* | 8/2009 | Hauser | A01D 34/78 361/736 |
| 2010/0125384 | A1* | 5/2010 | Wyatt | B60K 7/0007 701/22 |
| 2012/0227368 | A1 | 9/2012 | Koike et al. | |

FOREIGN PATENT DOCUMENTS

| | | |
|---|---|---|
| JP | H7001350 A | 4/1995 |
| JP | H10174204 A | 6/1998 |
| JP | 2001112102 A | 4/2001 |
| JP | 2003310026 A | 11/2003 |
| JP | 2004189409 A | 7/2004 |
| JP | 2005341749 A | 12/2005 |
| JP | 2009175977 A | 8/2009 |
| JP | 2011188789 A | 9/2011 |
| JP | 2011223856 A | 11/2011 |
| JP | 2012147592 A | 8/2012 |
| JP | 2012187026 A | 10/2012 |

OTHER PUBLICATIONS

Japanese Notice of Grounds for Rejection corresponding to Patent Application No. 2012-188266; dated Feb. 23, 2016, with English translation.
Japanese Notice of Grounds for Rejection corresponding to Patent Application No. 2012-268076; dated Mar. 1; 2016, with English translation.
Japanese Notice of Grounds for Rejection corresponding to Application No. 2012-198243; dated May 31, 2016, with English translation.
Japanese Notice of Grounds for Rejection corresponding to Application No. 2012-268076; dated Jun. 7, 2016, with English translation.

* cited by examiner

| SWITCH INPUT (TI) | MOTOR OPERATION (MS) | OUTPUT (TO) |
|---|---|---|
| ON | ON | ON |
| ON | OFF | ON |
| OFF | ON | ON |
| OFF | OFF | OFF |

FIG. 11

MOTOR CONTROL SYSTEM AND CONTROL SYSTEM FOR ELECTRIC MOTOR-DRIVEN VEHICLE

PRIORITY INFORMATION

The present application is a divisional application of U.S. patent application Ser. No. 14/012,423, filed on Aug. 28, 2013, the entire contents of which are incorporated herein by reference. The Ser. No. 14/012,423 application claimed the benefit of the date of the earlier filed Japanese Patent Application No. JP 2012-188266, filed Aug. 29, 2012, JP2012-198243, filed Sep. 10, 2012, and JP2012-268076, filed Dec. 7, 2012, priority to which are also claimed herein, and the contents of which are also incorporated by reference herein.

BACKGROUND

Technical Field

The present invention relates to a motor control system including a drive motor, an auxiliary motor, and a controller. The present invention also relates to a control system for a motor-driven vehicle including the drive motor and the auxiliary motor, a drive motor controller for controlling the drive motor, an auxiliary motor controller for controlling the auxiliary motor, and a main controller.

Related Art

A mower vehicle including a mower which is a working implement that is driven to perform mowing, is conventionally known. With respect to such a mower vehicle, it is conceivable to configure a motor-driven vehicle where left and right wheels, which are main driving wheels, are each driven by a drive motor which is a separate or a common electric motor, and where the mower is driven by a mower motor which is an electric motor.

In the specification of US 2009/0069964A1, there is described a mower vehicle including a drive motor which is a common electric motor that drives left and right wheels, a steering wheel, and a mower motor. This mower vehicle includes a drive controller to be connected to the drive motor, and a mower controller to be connected to the mower motor and the drive controller. The drive controller stores instructions that can be carried out by a computer, and such an instruction is for performing a process of stopping electric power supply to the mower motor and reducing the vehicle speed when battery voltage reaches a specific minimum voltage, for example.

Furthermore, in the specification of U.S. Pat. No. 5,502,957, there is described a mower vehicle where a control unit stops the mower when battery voltage reaches or falls below a certain voltage and the amount of charge reaches or falls below a certain amount of charge. The specification of U.S. Pat. No. 5,502,957 also describes stopping a deck motor in a case where a thermistor detects high temperature. Additionally, as related art documents related to the present invention, there are, in addition to the specification of US 2009/0069964A1 and the specification of U.S. Pat. No. 5,502,957, the specification of U.S. Pat. No. 8,055,399B2, the specification of US2009/0065273A1, the specification of US 2009/0201650A1, and the specification of US2005/0126145A1.

According to an electric motor-driven vehicle including a drive motor and an auxiliary motor, electric power is supplied to the drive motor and the auxiliary motor from a battery which is an electric power storage unit. In this case, electric power supply to each motor may stop when SOC (state of charge), which is the amount of charge of the battery, reaches or falls below a certain threshold. In this case, the vehicle cannot be driven by the drive motor, and it becomes difficult to make the vehicle move on its own to a desired location to pull over, such as a repair garage. Accordingly, it is desired to provide a driver a chance to pull over when the SOC of the battery is reduced, instead of immediately disabling travelling, and to increase the travelling range after providing the chance. The configurations described in the specification of US2009/0069964A1, the specification of U.S. Pat. No. 5,502,957, the specification of U.S. Pat. No. 8,055,399B2, the specification of US2009/0065273 A1, the specification of US2009/0201650A1, and the specification of US2005/0126145A1 do not disclose means for providing a driver a chance to pull over when the SOC is reduced, and for increasing the travelling range after providing the chance.

Also, according to a motor-driven vehicle including a drive motor for driving a driving wheel, and an auxiliary motor for driving a working implement or the like, there are cases where the drive motor and the auxiliary motor are driven by a controller. Also, electric power is supplied to the controller from a battery which is an electric power storage unit. In this case, switching between electric power supply from the battery to the controller and interruption of the electric power supply may be performed according to ON/OFF of a key switch, which is a manual switch to be operated by the driver. However, there is a possibility that the driver turns off the key switch by mistake while driving the vehicle or a device to be driven by a motor. If the controller is immediately turned off in this state, because at least one motor is not controlled while the motor is rotating, there possibly arises a situation which is not desirable with respect to the durability of the motor or a part such as an inverter connected to the motor.

Moreover, with a motor-driven vehicle including a drive motor and an auxiliary motor, in a case where at least one of the drive motor and the auxiliary motor is overloaded, it is desired to swiftly remove the overload and to protect the motor. The specifications of US2009/0069964A1, the specification of U.S. Pat. No. 5,502,957, the specification of U.S. Pat. No. 8,055,399B2, the specification of US2009/0065273A1, the specification of US 2009/0201650A1, and the specification of US2005/0126145A1 do not disclose means for solving such problems.

SUMMARY

At least one of the advantages of the present invention is to provide, with respect to a motor control system, a driver a chance to pull over when the amount of charge of an electric power storage unit to which a drive motor and an auxiliary motor are connected is reduced, and to increase the travelling range after providing the chance.

Furthermore, at least one of the advantages of the present invention is to prevent, with respect to the motor control system, occurrence of a situation which is not desirable with respect to the durability of a part even in a case where a manual switch is turned off during rotation of at least one of the drive motor and the auxiliary motor.

Moreover, at least one of the advantages of the present invention is to alleviate or remove overload swiftly in a case where at least one of the drive motor and the auxiliary motor is overloaded in a control system for the electric motor-driven vehicle, and to protect the motor.

A first motor control system according to the present invention includes a drive motor and an auxiliary motor connected to an electric power storage unit, a controller for controlling the drive motor and the auxiliary motor, and a restart permission section for acquiring that an operation unit is operated by a user, and for transmitting a restart permission signal to the controller, wherein the controller includes a charge calculation unit for calculating an amount of charge of the electric power storage unit, and a low charge processing unit for performing a step of disabling the auxiliary motor and the drive motor when the amount of charge of the electric power storage unit reaches or falls below a first threshold set in advance, and a step of causing a decelerated travelling mode to be executed where, when the restart permission signal is received, a disabled state of the drive motor is released while maintaining a disabled state of the auxiliary motor, and an allowed speed of the drive motor is reduced to a predetermined proportion with respect to a normally allowed speed.

Also, a second motor control system according to the present invention includes a drive motor and an auxiliary motor connected to an electric power storage unit, and a controller for controlling the drive motor and the auxiliary motor, wherein the controller includes a charge calculation unit for calculating an amount of charge of the electric power storage unit, and a low charge processing unit for performing a step of disabling the auxiliary motor when the amount of charge of the electric power storage unit reaches or falls below a first threshold set in advance, and a step of causing a decelerated travelling mode to be executed where an allowed speed of the drive motor is reduced to a predetermined proportion with respect to a normally allowed speed when the amount of charge of the electric power storage unit reaches or falls below a second threshold lower than the first threshold after the auxiliary motor has been disabled.

Furthermore, a third motor control system according to the present invention includes a drive motor and an auxiliary motor connected to an electric power storage unit, and a controller for controlling the drive motor and the auxiliary motor, wherein the controller includes a charge calculation unit for calculating an amount of charge of the electric power storage unit, and a low charge processing unit for performing a step of disabling the auxiliary motor when the amount of charge of the electric power storage unit reaches or falls below a first threshold set in advance, and a step of disabling the drive motor when the amount of charge of the electric power storage unit reaches or falls below a second threshold lower than the first threshold after the auxiliary motor has been disabled.

Furthermore, a fourth motor control system according to the present invention includes a drive motor and an auxiliary motor that are each an electric motor, a controller to which signals indicating driving states are to be input from the drive motor and the auxiliary motor, the controller being for controlling the drive motor and the auxiliary motor, a manual switch to be turned on or off according to a manual operation of a user, and for outputting to the controller a signal indicating ON or OFF, and a controller electric power supply switching unit for supplying electric power from an electric power storage unit to the controller in a case where an ON instruction signal is input from the controller, and for interrupting supply of electric power from the electric power storage unit to the controller in a case where the manual switch is turned off and where input of the ON instruction signal from the controller is interrupted, the controller electric power supply switching unit being connected between the electric power storage unit and the controller, wherein the controller maintains the ON instruction signal to the controller electric power supply switching unit while at least one of the drive motor and the auxiliary motor controlled by the controller is rotating in a case where the manual switch is turned off, and interrupts the ON instruction signal to the controller electric power supply switching unit in a case where both the drive motor and the auxiliary motor controlled by the controller are stopped.

A first control system for an electric motor-driven vehicle according to the present invention includes a drive motor and an auxiliary motor that are connected to a power source unit, a drive motor controller for controlling the drive motor, an auxiliary motor controller for controlling the auxiliary motor, and a main controller for outputting a control signal to each of the motor controllers, wherein each of the motor controller determines, based on a driving state of the corresponding motor or an operation state of the motor controller itself, whether or not the motor is overloaded, and in a case where the motor is overloaded for a predetermined period of time set in advance or longer, outputs an overload determination signal to the main controller, and wherein the main controller performs an overload handling process set in advance in a case where the overload determination signal is input from at least one of the motor controllers.

A second control system for an electric motor-driven vehicle according to the present invention includes a drive motor and an auxiliary motor, a drive motor controller for controlling the drive motor, an auxiliary motor controller for controlling the auxiliary motor, a main controller for outputting a control signal to each of the motor controllers, and a power source unit for supplying electric power to the drive motor and the auxiliary motor, wherein the main controller monitors at least one of temperature and a change in voltage of the power source unit and determines whether or not there is an abnormality, and in a case where an abnormality is determined to be present for a predetermined period of time or longer, identifies which of the drive motor and the auxiliary motor is overloaded, and performs an overload handling process according to the motor which is overloaded.

BRIEF DESCRIPTION OF THE DRAWINGS

FIG. 11 is a diagram showing a relationship between a switch input state (TI) and a motor operation state (MS) acquired with respect to an ECU, and an output state (TO) with respect to an ECU electric power supply switching unit in the schematic configuration shown in FIG. 10;

DESCRIPTION OF EXEMPLARY EMBODIMENTS

[First Embodiment]

Figure 1:
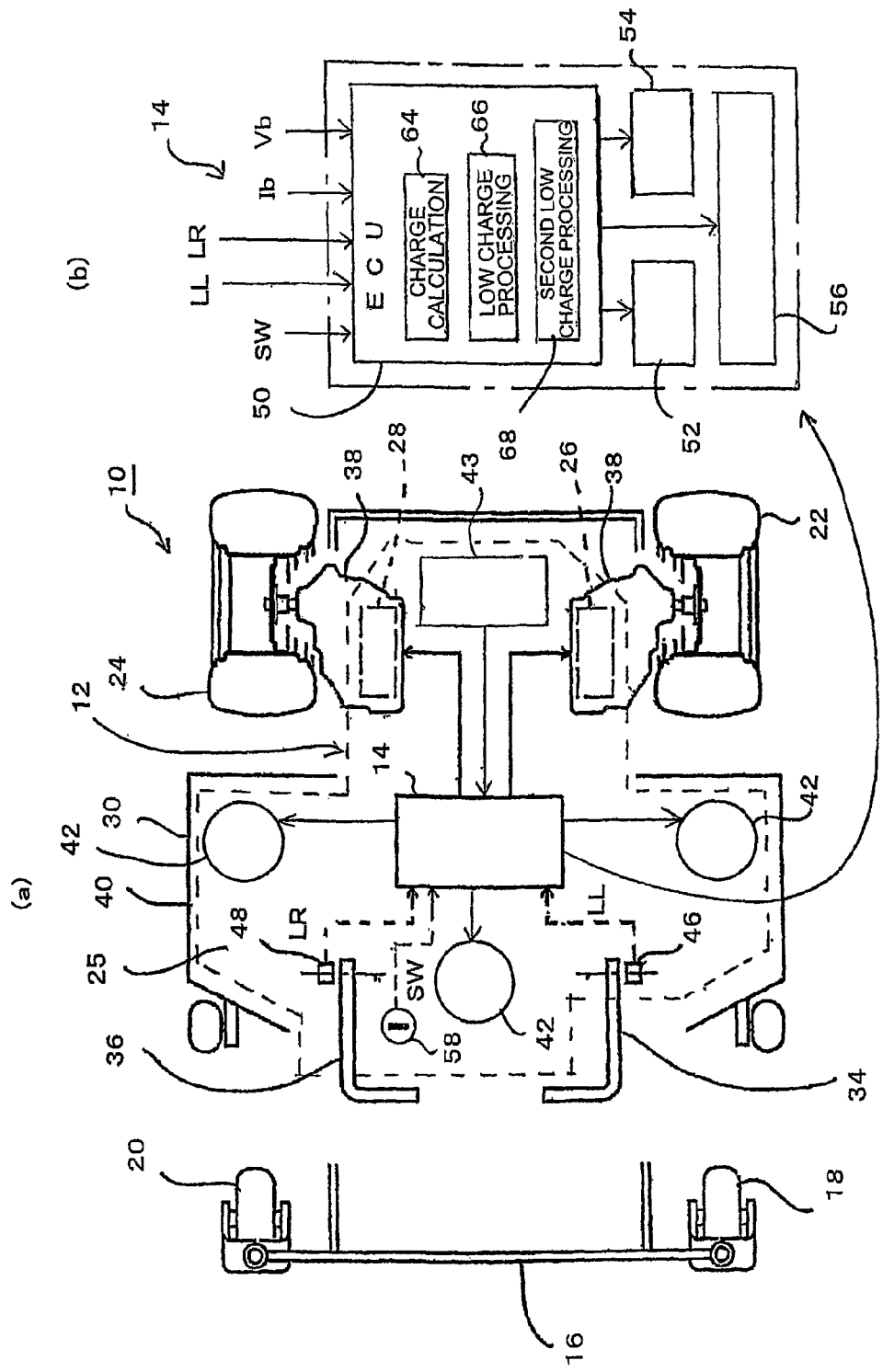
FIG. 1 is a diagram showing a schematic configuration (a) of a configuration, seen from above, of a mower vehicle which is an electric motor-driven vehicle on which a control system of a first embodiment of the present invention is mounted, and a configuration (b) of a controller unit.

Hereinafter, embodiments of the present invention will be described in detail by reference to the drawings. In first to fourth embodiments, and embodiments of FIGS. 15 to 32 and 34, a case will be mainly described where a mower vehicle includes, as a structure having the functions of both a turning instruction device and an acceleration instruction device, a left/right lever-type operator including two operation levers, left and right operation levers, but this is only an example, and it is also possible to use a steering operator which is a steering handle as the turning instruction device, and an accelerator pedal which is an operator provided at the front side of a seat as the acceleration instruction device. Also, in the first to fourth embodiments, and embodiments of FIGS. 15 to 32 and 34, a case will be described where three deck motors, which are auxiliary motors, are provided to the mower vehicle, but one, two, or four or more deck motors may be provided. Moreover, in the following, a case will be described where an electric motor-driven vehicle is a mower vehicle including, as a device to be driven by an auxiliary motor, a mower which is a working implement for performing ground work, but this is only an example, and the electric motor-driven vehicle may be any vehicle, so long as it has wheels to be driven by an electric motor, such as a ground work vehicle including another working implement such as a farming device, an excavator, or the like that is driven by the auxiliary motor, or another vehicle including another device such as a cleaning machine that is driven by the auxiliary motor. Additionally, in the following, the same elements will be denoted with the same reference numerals in all the drawings.

FIGS. 1 to 4 are diagrams showing a first embodiment of the present invention. FIG. 1 is a diagram showing a schematic configuration (a) of a configuration, seen from above, of a mower vehicle 10, which is an electric motor-driven vehicle on which a motor control system 12 of the present embodiment is mounted, and a configuration (b) of a controller unit 14.

First, an overall configuration of the mower vehicle 10 will be described, and then, a configuration of the motor control system 12 will be described. As shown in FIG. 1(a), the mower vehicle 10, which is a riding ground work vehicle on which an engine is not mounted, includes a main frame 16 configuring the vehicle body, left and right caster wheels 18 and 20, left and right wheels 22 and 24, a mower main body 30 configuring a mower 25, which is a working implement, left and right operation levers 34 and 36, and the motor control system 12. The motor control system 12 will be described later in detail. The main frame 16 is made of metal such as iron, and a plate portion, not shown, placed above in a crosswise direction is fixed thereon, and a seat, not shown, is fixed on the upper side of the plate portion.

The left and right caster wheels 18 and 20 are supported on the left side in FIG. 1(a), which is the front side of the main frame 16. Each of the caster wheels 18 and 20 is a steering wheel which is a front wheel. Each of the caster wheels 18 and 20 allows steering of 360 degrees or more around a shaft in the front-back direction in FIG. 1, which is the vertical direction. The left and right wheels 22 and 24 are supported on the right side in FIG. 1(a), which is the rear side of the main frame 16. The left and right wheels 22 and 24 are main driving wheels which are rear wheels, and are driven by drive motors 26 and 28 which are left and right electric motors to be described later.

The number of the caster wheels 18 and 20 may be other than two, and for example, only one caster wheel may be provided to the mower vehicle 10 or three or more caster wheels may be provided thereto. In the present embodiment, the left and right wheels 22 and 24, which are the main driving wheels, are made the rear wheels, and the caster wheels 18 and 20 are made the front wheels, but the left and right wheels 22 and 24, which are the main driving wheels, may be made the front wheels, and the caster wheels 18 and 20 may be made the rear wheels.

The mower main body 30 is called a mower, and is supported at a middle portion in the longitudinal direction of the main frame 16, on the lower side thereof. The mower main body 30 includes a mower deck 40, and includes, inside the mower deck 40, three mower blades, not shown, which are mowing rotary tools capable of rotating around a vertical shaft. Each of the mower blades includes a plurality of cutting blade elements arranged around the vertical shaft, and is enabled to perform mowing by the cutting blade elements rotating and cutting the lawn grass or the like. The mower blades of the mower main body 30 are each driven by a deck motor 42, which is a mower-related electric motor to be described later.

The lawn can be mowed by the rotation of the mower blades, and the mowed grass is ejected from within the mower deck 40 to a side of the vehicle in the width direction. Additionally, a configuration may be adopted where the mowed grass is collected in a grass collecting tank by installing the grass collecting tank, not shown, in the mower vehicle 10 and connecting the grass collecting tank and the mower deck 40 by a duct.

Additionally, as the mowing rotary tool of the mower, besides the mower blade type, there may also be used a reel type which has, for example, blades spirally arranged on a cylinder having a rotating shaft that is parallel to the ground, which has a function of snipping and cutting the grass or the like, and which is driven by a deck motor.

The left and right operation levers 34 and 36 are provided on both the left and right sides of a driver's seat in a manner capable of swinging in the front and back direction around a horizontal shaft along a left and right direction. Each of the operation levers 34 and 36 has a function of instructing, by swinging, the drive motor 26 or 28 on the corresponding side to rotate to the swinging side. Each of the operation levers 34 and 36 also has a function of instructing, in an upright neutral state, the drive motor 26 or 28 to stop rotating. For example, by swinging the right operation lever 36 in such a way as to tilt it to the front from the upright position, the right drive motor 28 is instructed to rotate in the forward direction from a stopped state. Also, by swinging the right operation lever 36 in such a way as to tilt it to the rear side, the right drive motor 28 is instructed to rotate in the reverse direction.

Furthermore, in a case where a steering operator of a steering wheel or the like is used as the turning instruction device, the amount of operation and the steering direction of the steering operator are detected by a steering sensor, and in a case where an accelerator pedal is used as the acceleration instruction device, which is an operator, the amount of operation of the accelerator pedal is detected by an accelerator sensor.

The overall configuration of the mower vehicle 10 has been described above, and next, the motor control system 12 mounted on the mower vehicle 10 will be described. In the following, the motor control system 12 is sometimes referred to simply as the control system 12. The control system 12 includes the left and right drive motors 26 and 28, the three deck motors 42 which are auxiliary motors, a battery 43, left and right lever sensors 46 and 48, a key switch 58 which is a restart permission section as well as a main switch, and the controller unit 14.

The left and right drive motors 26 and 28 are electric motors such as three-phase synchronous motors or induction motors, and each independently drives the wheel 22 or 24 on the corresponding side. The left and right drive motors 26 and 28 are connected to the left and right wheels 22 and 24, respectively, via power transmission units including deceleration mechanisms, not shown, in a manner allowing transmission of power. A reduction gear device including one or more stages may be used as the reduction mechanism provided in the power transmission unit, for example.

The vehicle is allowed to travel straight when the rotational speeds of the left and right wheels 22 and 24 coincide with each other by the driving by the left and right drive motors 26 and 28. On the other hand, the vehicle is allowed to make a turn when a difference occurs in the rotational speeds of the left and right wheels 22 and 24.

In FIG. 1, the left and right drive motors 26 and 28 and the deceleration mechanisms are provided inside of left and right motor accommodating cases 38, and each motor accommodating case 38 is supported on the left or right side of the main frame 16. Additionally, a configuration may also be adopted according to which power of the drive motors 26 and 28 is transmitted to the left and right wheels 22 and 24 without using the deceleration mechanisms.

The three deck motors are mower-related electric motors, are provided on the upper side of the mower deck 40 configuring the mower main body 30, and are coupled to the rotating shafts of the three mower blades, respectively. The mower 25 may be configured from each deck motor 42 and the mower main body 30 shown in FIG. 1. Instructions regarding activation and activation suspension of the deck motor 42 are issued by a deck switch 44 shown in FIG. 2 to be described later.

The battery 43 is a DC current source, and is connected to each of the drive motors 26 and 28 and each deck motor to supply electric power thereto. The battery 43 may be a lead acid battery, a nickel-metal-hydride battery, a lithium battery, or the like, and may have voltage of 48V, for example. The battery 43 may also be charged by an external commercial AC source via a charger.

Additionally, the mower vehicle 10 may be a so-called hybrid including an engine and a generator. In this case, the generator is made to generate electric power using the power of the engine, and the generated electric power may be supplied to the battery 43. Also, other electric power storage units, such as a capacitor, may be used instead of the battery 43.

The left and right lever sensors 46 and 48 detect the swing directions and the swing angles of the operation levers 34 and 36 on the corresponding sides, and transmit detection signals to the controller unit 14.

The key switch 58 is capable of acquiring each of an ON operation and an OFF operation on a key operation unit whose ON and OFF can be operated by a user in a state where a key is inserted. That is, the key switch is switched between ON and OFF by a key being inserted into the key operation unit and being rotated. The key switch 58 is connected between the battery 43 and an ECU 50, and electric power can be supplied from the battery 43 to the ECU 50 when an ON operation is performed. The ECU 50 is activated when electric power is supplied thereto.

On the other hand, when an OFF operation of the key switch 58 is performed, electric power supply from the battery 43 to the ECU 50 is interrupted and the ECU 50 is deactivated under the condition that rotation of all of the drive motors 26 and 28 and the deck motors 42 is stopped. Such a function is realized by a self-holding relay 60 shown in FIG. 2 and a switch connection relay, not shown, and details thereof will be given later. Moreover, the signal indicating that an ON operation is performed on the key switch 58 is transmitted to the main controller 50 described later as a restart permission signal.

As shown in FIG. 1(*b*), the controller unit 14 is for controlling each of the drive motors 26 and 28 and each deck motor 42, and includes a main controller 50, which is an upper controller called an ECU, left and right drive motor controllers 52 and 54, and three deck motor controllers 56. In FIG. 1(*b*), the three deck motor controllers 56 are shown by a single block for the sake of simplicity. In the following, the main controller will be referred to as an ECU. The ECU includes a microcomputer including a CPU, a memory, and the like. The ECU 50 calculates target rotational speeds of the left and right drive motors 26 and 28 from the detected swing angles of the left and right operation levers 34 and 36, and outputs the target rotational speeds to the corresponding lower controllers, the drive motor controllers 52 and 54. Each of the drive motor controllers 52 and 54 includes a driving inverter, not shown, which is a driver, and a driving control circuit, not shown, for controlling the driving inverter. The driving control circuit includes a CPU, a storage unit such as a memory, and the like, and a signal indicating the target rotational speed is input thereto from the ECU 50. The driving control circuit controls the driving inverter so as to cause the corresponding drive motor 26 or 28 to rotate at the target rotational speed. Additionally, in the present specification, the "rotational speed" has both the general meaning of rotational speed and the meaning of the number of revolutions per unit time, such as per minute.

The ECU 50 includes functional structures: a charge calculation unit 64, a low charge processing unit 66, and a second low charge processing unit 68. These functional structures will be described later in detail.

Figure 2:
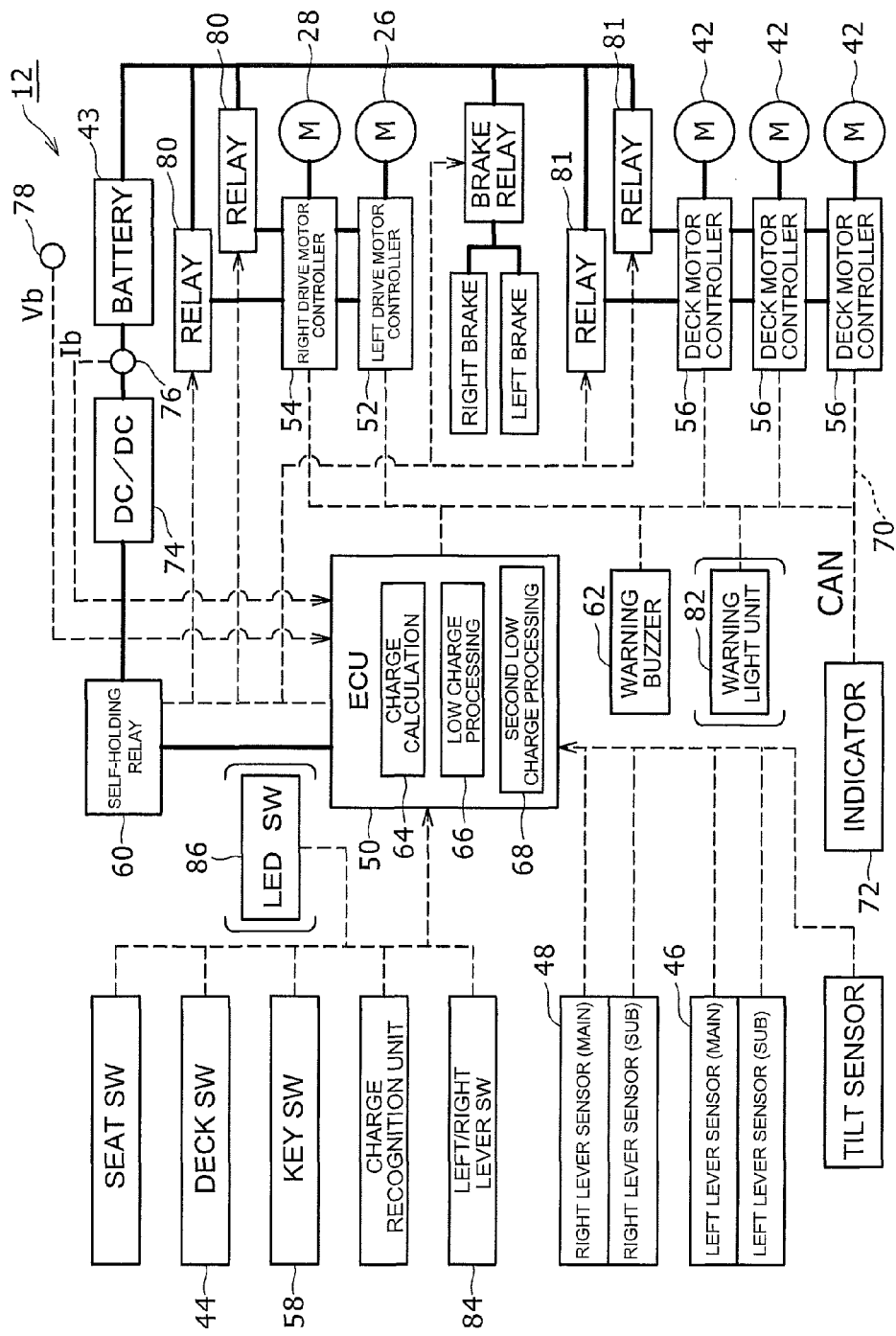
FIG. 2 is a block diagram showing an overall configuration of the control system shown in FIG. 1.

FIG. 2 is a block diagram showing the overall configuration of the motor control system 12 shown in FIG. 1. The deck switch 44 is provided near a seat, not shown, at a position allowing a driver to operate the same, and switching between ON and OFF is performed by an operation of the driver, and a signal indicating the ON operation or the OFF operation is transmitted to the ECU 50. When a signal indicating ON or OFF of the deck switch 44 has been transmitted, the ECU 50 outputs a control signal to each deck motor controller 56 and controls the operation state of each deck motor 42 via the respective deck motor controller 56.

The deck motor controller 56 is a lower controller, and includes a deck inverter, not shown, which is a driver for driving the deck motor 42, and a deck control circuit, not shown, for controlling the deck inverter. The deck control circuit includes a CPU, a storage unit such as a memory, and the like, and a signal indicating the target rotational speed of the deck motor 42 is input thereto from the ECU 50. This target rotational speed may be a predetermined value that is set in advance. The deck control circuit controls the corresponding deck inverter such that the corresponding deck motor 42 is rotated at the target rotational speed. Each deck motor controller 56 is connected to the ECU 50 by a CAN communication line 70.

Each of the drive motor controllers 52 and 54 is also connected to the ECU 50 by the CAN communication line 70. The deck motor controller 56 may be provided integrally with the controller unit including the ECU 50 and the drive motor controllers 52 and 54, or may be provided separately. Also, the motor controllers 52, 54, and 56 and the ECU 50 may be separately arranged on the mower vehicle 10.

Two relays 80 are connected between the battery 43 and the drive motor controllers 52 and 54, and the ON/OFF state of each relay 80 is controlled by the ECU 50. The drive motor controllers 52 and 54 are connected to the battery 43 in parallel. Also, two relays 81 are connected between the battery 43 and the deck motor controllers 56, and the ON/OFF state of each relay 81 is also controlled by the ECU 50. The deck motor controllers 56 are also connected to the battery 43 in parallel.

The ECU 50 may calculate target torque of the left and right drive motors 26 and 28 by a target torque calculation unit, not shown, according to detection signals of the left and right lever sensors 46 and 48 (or the steering sensor and the accelerator sensor) to cause the vehicle to travel in a corresponding direction at a corresponding speed. In this case, the ECU 50 transmits to the drive motor controllers 52 and 54 the target torque of the corresponding drive motors 26 and 28, and controls the operation of each of the drive motors 26 and 28. Additionally, FIG. 2 shows a case where there are two sensors, main and sub, for each of the left and right lever sensors 46 and 48. By using two sensors for each of the lever sensors 46 and 48, the ECU 50 may determine an abnormality in a sensor in a case where different detection values are detected at the sensors on the same side, and may perform an abnormality handling process, such as stopping of the vehicle. However, it is also possible to provide only one sensor for each of the left and right lever sensors 46 and 48.

An indicator 72 is provided in the periphery of the driver's seat, and has a function of notifying a user of occurrence of an abnormality in a case where the ECU 50 identifies occurrence of an abnormality in the vehicle, by displaying to that effect or by using a light unit or the like. The indicator 72 may also serve the function of displaying charging of the battery 43 during charging by an external AC source.

The ECU 50 is connected to the battery 43 via a DC/DC converter 74 and a switch connection relay, not shown, connected to the key switch 58. The DC/DC converter 74 steps down the voltage of the battery 43 and supplies the same to the ECU 50. For example, in the case where the voltage of the battery 43 is 48V, this is stepped down by the DC/DC converter 74 to 12V and is supplied to the ECU 50, and the ECU 50 is activated.

The self-holding relay 60 is connected between the battery 43 and the ECU 50 in parallel with the key switch 58, and is switched between ON and OFF by a control signal from the ECU 50. When the key switch 58 is turned on, electric power is supplied from the battery 43 to the ECU 50 via the DC/DC converter 74 and the switch connection relay, and the ECU 50 turns on the self-holding relay 60. The self-holding relay 60 thereby connects the battery 43 and the ECU 50 in a manner capable of supplying electric power of the battery 43 to the ECU 50. On the other hand, in the case where the key switch 58 is switched from ON to OFF, the switch connection relay is interrupted, but the self-holding relay 60 is maintained in the ON state until all of the drive motors 26 and 28 and the deck motors 42 are stopped. When all of the drive motors 26 and 28 and the deck motors 42 are stopped, the ECU 50 outputs to the self-holding relay 60 a control signal for switching from ON to OFF, and the electric power supply from the battery 43 to the ECU 50 is interrupted by the turning off of the self-holding relay 60. According to the configuration described above, if any of the drive motors 26 and 28 and the deck motors 42 is being driven, the electric power of the ECU 50 is not immediately interrupted even if the key switch 58 is turned off by mistake. Of course, there is also possible a configuration where the self-holding relay 60 is not provided, and electric power is supplied from the battery 43 to the ECU 50 via the DC/DC converter 74 and the key switch 58.

A current sensor 76 and a voltage sensor 78 are connected to the battery 43, and they detect input/output current or output voltage of the battery 43. Signals indicating the input/output current and the output voltage detected by the current sensor 76 and the voltage sensor 78 are input to the ECU 50. A warning buzzer 62 is provided in the periphery of the driver's seat, and its operation is controlled based on input of a control signal from the ECU 50.

The charge calculation unit 64 of the ECU 50 calculates SOC, which is the amount of charge of the battery 43, using the output current and the output voltage which have been input. Additionally, there is also possible a configuration where only one of the current sensor 76 and the voltage sensor 78 is provided, and where the SOC is calculated based on the input from the one sensor. Furthermore, the low charge processing unit 66 of the ECU 50 performs a "vehicle lock step" and a "decelerated travelling step" using the motor controllers 52, 54, and 56.

In the "vehicle lock step," when the calculated SOC reaches or falls below a first threshold Tsoc1 set in advance (SOC≤Tsoc1), there is executed a "vehicle lock mode" where all of the deck motors 42 and the drive motors 26 and 28 are disabled. Here, a disabled state of a motor is, in a case where the motor is being driven, a state where the motor is stopped, and in a case where the driving of the motor is stopped, a state where a control signal for driving is not output from the ECU 50 to a corresponding motor controller such that driving of a corresponding motor is not performed regardless of presence or absence of operation of the left and right operation levers 34 and 36 and the deck switch 44 in FIG. 1.

In the "decelerated travelling step," when the key switch 58 is turned off and then a signal indicating that the key switch 58 is turned on again is received by the ECU 50 as a restart permission signal, a "low power mode," which is a decelerated travelling mode, is executed. In the "low power mode," the disabled state of each of the drive motors 26 and 28 is released, and also, with respect to the rotational speed of the drive motor 26 or 28, an allowed speed according to the swing angle, which is the amount of operation of the corresponding operation lever 34 or 36, is reduced to a predetermined proportion X % with respect to a normally allowed speed which is the allowed speed in normal times. For example, there is a case where the right operation lever 36 is tilted to the front side by a predetermined angle from the neutral position. If this predetermined angle corresponds to a case where the right drive motor 28 is to be rotated at a predetermined rotational speed in normal times, in the low power mode, the right drive motor 28 is rotated at a rotational speed which has been reduced from the predetermined rotational speed to X %, which is a predetermined proportion below 100%, such as 50%. The same applies to the case of the left drive motor 26.

When the calculated SOC reaches or falls below a second threshold Tsoc2 lower than the first threshold Tsoc1 (SOC≤Tsoc2<Tsoc1), the second low charge processing unit 68 of the ECU 50 performs a "motor re-disabling step" where the drive motors 26 and 28 fall into the disabled state again.

When the SOC reaches or falls below the first threshold Tsoc1 (SOC≤Tsoc1), the ECU 50 causes the warning buzzer 62 to operate until the key switch 58 is turned off.

Each function of the ECU 50 may be realized by software by means of execution of stored programs or the like, or a part or all of the functions may be realized by hardware.

Figure 3:
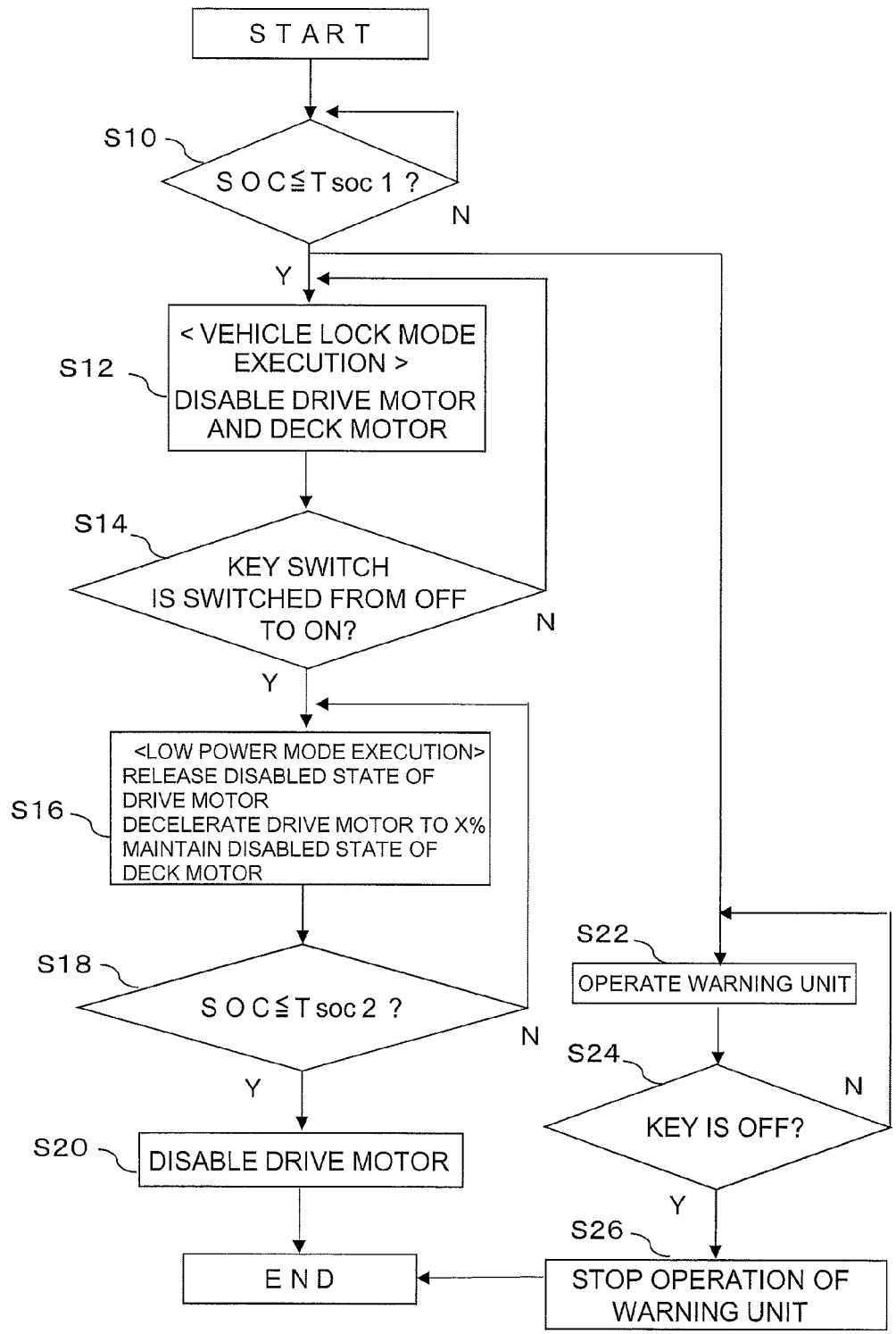
FIG. 3 is a flow chart showing a method of controlling a drive motor and a deck motor which is an auxiliary motor, by using the control system of the first embodiment.

The motor control system 12 as described controls each of the drive motors 26 and 28 and the deck motors 42 by a control method shown in FIG. 3. FIG. 3 is a flow chart showing a method of controlling the drive motors 26 and 28 and the deck motors 42 by using the control system 12 of the present embodiment. When it is determined, in step S10 (hereinafter, "step S" will be referred to simply as "S"), that SOC calculated by the charge calculation unit 64 has reached or fallen below the first threshold Tsoc1 set in advance (SOC≤Tsoc1), the low charge processing unit 66 executes the "vehicle lock mode" in S12, and disables each of the drive motors 26 and 28 and the deck motors 42.

After the key switch 58 is turned off and is then turned on again in S14, the low charge processing unit 66 executes the "low power mode" in S16. In the low power mode, the disabled state of each of the drive motors 26 and 28 is released while maintaining the disabled state of each of the deck motors 42, and also, the allowed speed, which is a speed according to the operation of the corresponding operation lever 34 or 36 of the drive motor 26 or 28, is reduced to X %, which is a predetermined proportion set in advance with respect to a normally allowed speed. In this case, when the vehicle lock mode is executed while the vehicle is travelling, the vehicle is stopped, and thus, when the ON operation of the key switch 58 is performed and then each of the operation levers 34 and 36 is tilted to the front side from the neutral position in the low power mode, the forward travelling of the vehicle is enabled. In this case, the vehicle speed is reduced to X % with respect to the vehicle speed in normal times corresponding to the operation of the operation levers 34 and 36. For example, the maximum vehicle speed of the vehicle is also reduced to X % of the maximum vehicle speed in normal times.

When the SOC is further reduced to or below the second threshold Tsoc2, which is lower than the first threshold Tsoc1, in S18 (SOC≤Tsoc2), the second low charge processing unit 68 performs the "motor re-disabling step" where each of the drive motors 26 and 28 is disabled again.

When it is determined in S10 that the SOC has reached or fallen below the first threshold Tsoc1 set in advance (SOC≤Tsoc1), the ECU 50 causes the warning buzzer 62 to operate in S22, and causes the same to operate, in S22 and S24, until the key switch 58 is turned off. The ECU 50 stops the operation of the warning buzzer 62 when the key switch 58 is turned off.

The indicator 72 may be used as a warning unit instead of the warning buzzer 62, and display indicating "charging necessary"; for example, text "CHARGE," may be displayed by the indicator 72 from S22 to S26 until the key switch 58 is turned off. Also, a warning light unit 82, such as an LED, shown in FIG. 2 may be used as the warning unit, and the warning light unit 82 may be lighted up or caused to blink from S22 to S26 until the key switch 58 is turned off.

According to the mower vehicle 10 on which the control system 12 as described is mounted, the vehicle may be accelerated in the forward or reverse direction by swinging of the operation levers 34 and 36. Also, by changing the amount of tilt for the left and right operation levers 34 and 36, a difference is caused in the rotational speeds of the left and right wheels 22 and 24, and the vehicle may be made to turn.

Furthermore, according to the control system 12, when the SOC of the battery 43 reaches or falls below the first threshold Tsoc1 set in advance, all of the drive motors 26 and 28 and the deck motors 42 are disabled, and the disabled state of the deck motors 42 is maintained even in the case of re-operation. Thus, the driver may recognize the need to pull over in the case where the SOC becomes low, and may be provided a chance to pull over, and also, reduction in the SOC after providing the chance may be suppressed and the travelling range of the vehicle may be increased.

Also, in the case where the disabled state of the drive motors 26 and 28 is released after the SOC has reached or fallen below the first threshold Tsoc1 and the drive motors 26 and 28 and the deck motors 42 have been disabled, the low power mode is executed where the allowed speed of the drive motors 26 and 28 is reduced, and thus, reduction in the SOC may be more effectively suppressed, and the travelling range may be even further increased.

Figure 4:
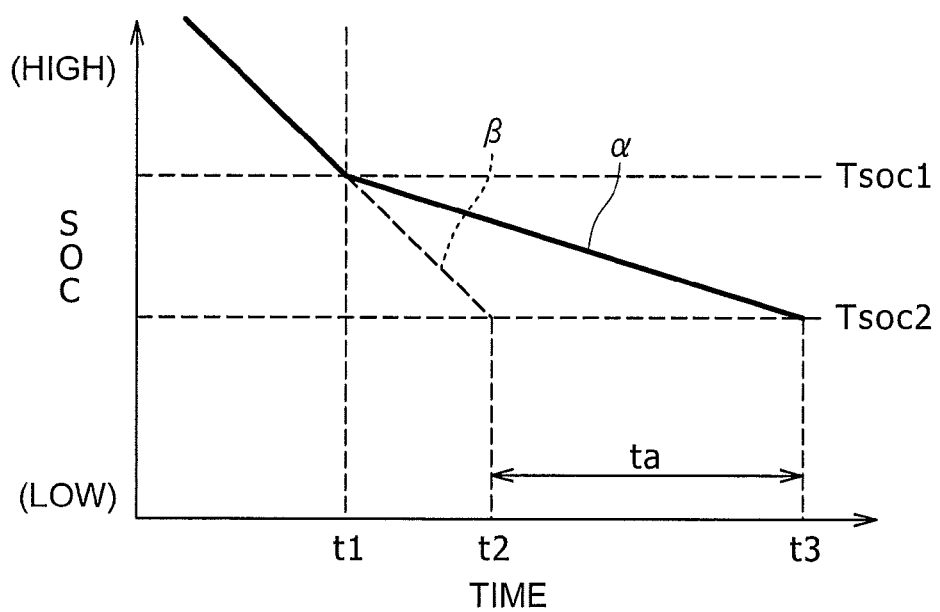
FIG. 4 is a diagram showing gradual reduction in SOC, which is the amount of charge of a battery, in a case where a vehicle is travelling at a maximum allowed vehicle speed in the first embodiment.

FIG. 4 is a diagram showing gradual reduction in the SOC, which is the amount of charge of the battery 43, in a case where the vehicle is travelling at a maximum allowed vehicle speed. As shown by a solid line α in FIG. 4, when the SOC is reduced and reaches or falls below the first threshold Tsoc1, the speed in the reduction of the SOC after time t1 becomes gradual in a case where the disabled state of the deck motors 42 is maintained even after the re-operation after the disabling of all the drive motors 26 and 28 and the deck motors 42. Accordingly, the travelling range until the SOC is further reduced down to the second threshold Tsoc2 and the drive motors 26 and 28 are disabled again may be increased. For example, if, unlike in the present embodiment, the deck motors 42 are not disabled even when the SOC has reached or fallen below the first threshold Tsoc1, and the low power mode where the allowed speed of the drive motors 26 and 28 is reduced is not executed, as shown by a dashed line β in FIG. 4, the SOC swiftly reaches the second threshold Tsoc2, and the drive motors 26 and 28 are disabled. In this case, the speed in the reduction of the SOC is great, and the travelling range is reduced as compared with the present embodiment, by the distance corresponding to time to from t2 to t3.

Figure 5:
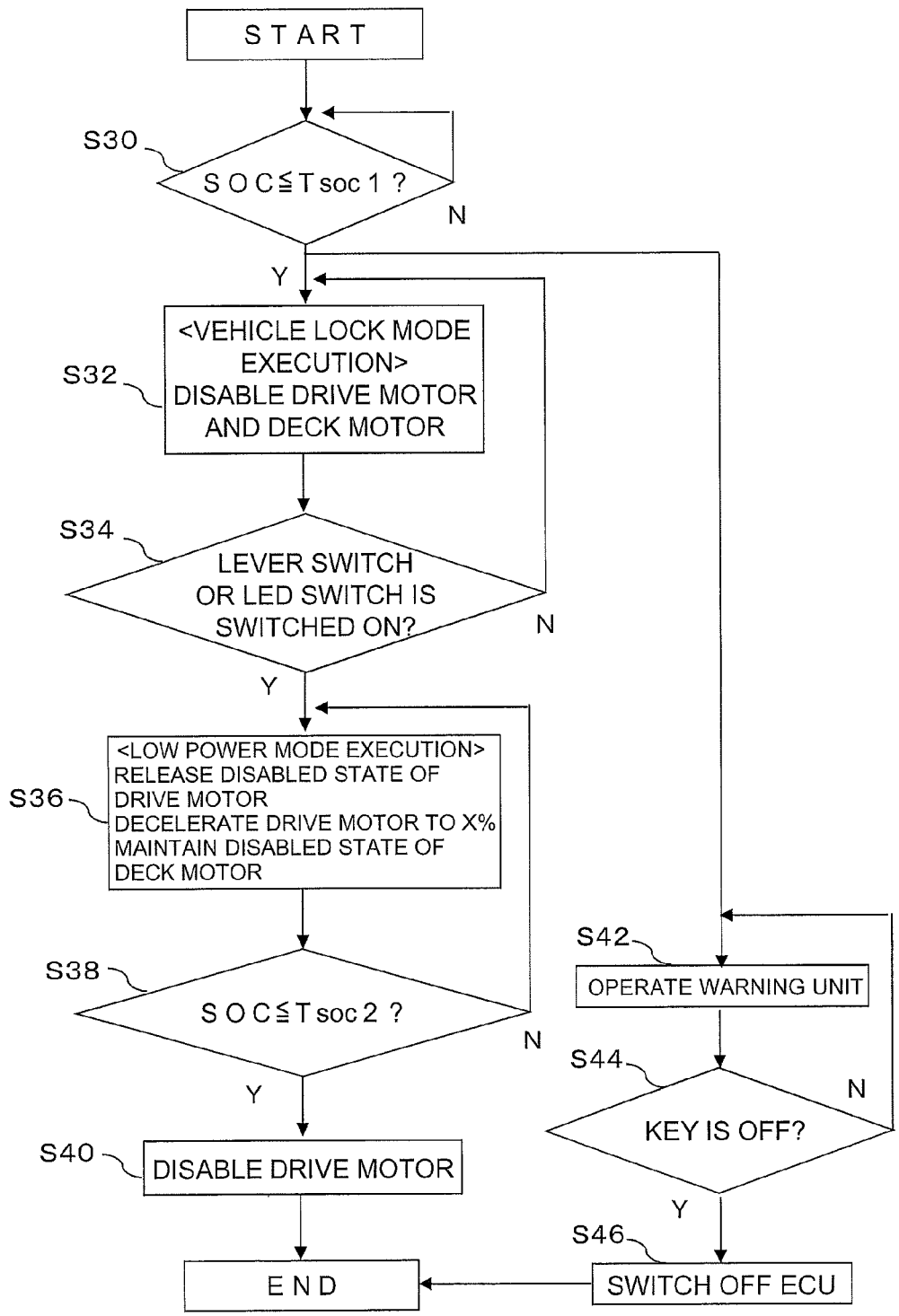
FIG. 5 is a flow chart showing a method of controlling a drive motor and a deck motor in a control system of another example of the first embodiment.

FIG. 5 is a flow chart showing a method of controlling the drive motors 26 and 28 and the deck motors 42 in a control system of another example of the present embodiment. In the description above, the restart permission section is the key switch 58, but in another example shown in FIG. 5, the restart permission section is a lever switch 84 or an LED switch 86 shown in FIG. 2. First, a case where the lever switch 84 is the restart permission section is described. As shown in FIG. 2, two lever switches 84 are provided, on the left and right. With respect to the left and right lever switches 84, an operation unit is turned on when the left and right operation levers 34 and 36 are moved by a user so as to tilt to the left and right sides, which is a specific direction, to widen the gap between the left and right operation levers 34 and 36 from the upright state of the left and right operation levers 34 and 36. That the operation unit is turned on is acquired as an electrical signal by the left and right lever switches 84, and a restart permission signal is transmitted to the ECU 50. When the restart permission signal is received by the ECU 50, the ECU 50 executes the low power mode in the manner described above. Also, the lever switches 84 may be made to serve the function of a neutral switch, and a vehicle stopped state may be maintained by causing the ECU 50 to operate an electromagnetic brake in a state where the ON operation on the lever switches 84 is continued, for example.

In the case where the LED switch 86 is the restart permission section, the LED switch 86 is provided in the periphery of the driver's seat, and includes an operation unit configured from an LED. That the operation unit is turned on is acquired as an electrical signal by the LED switch 86, and a restart permission signal is transmitted to the ECU 50. When the restart permission signal is received by the ECU 50, the ECU 50 executes the low power mode in the manner described above.

In the flow chart of FIGS. 5, S30 and S32 are the same as S10 and S12 in the flow chart of FIG. 3. When an ON operation is performed in S34 for the lever switch 84 or the LED switch 86, transition to S36 takes place, and the low power mode is executed. Also, S36 to S40 in the flow chart of FIG. 5 are the same as S16 to S20 in the flow chart of FIG. 3.

Furthermore, in the case it is determined in S30 that the SOC has reached or fallen below the first threshold Tsoc1 set in advance (SOC≤Tsoc1), the ECU 50 causes a warning unit such as the warning buzzer 62 to operate in S42, and keeps the same operating in S42 and S44 until the key switch 58 is turned off. Since, when the key switch 58 is turned off, supply of electric power from the battery 43 to the ECU 50 is stopped and the ECU 50 is turned off in S46, the operation of the warning unit is also stopped. Also in the configuration of the other example described above, reduction in the SOC may be effectively suppressed, and the travelling range may be increased, as with the embodiment shown in FIGS. 1 to 4.

[Second Embodiment]

Figure 6:
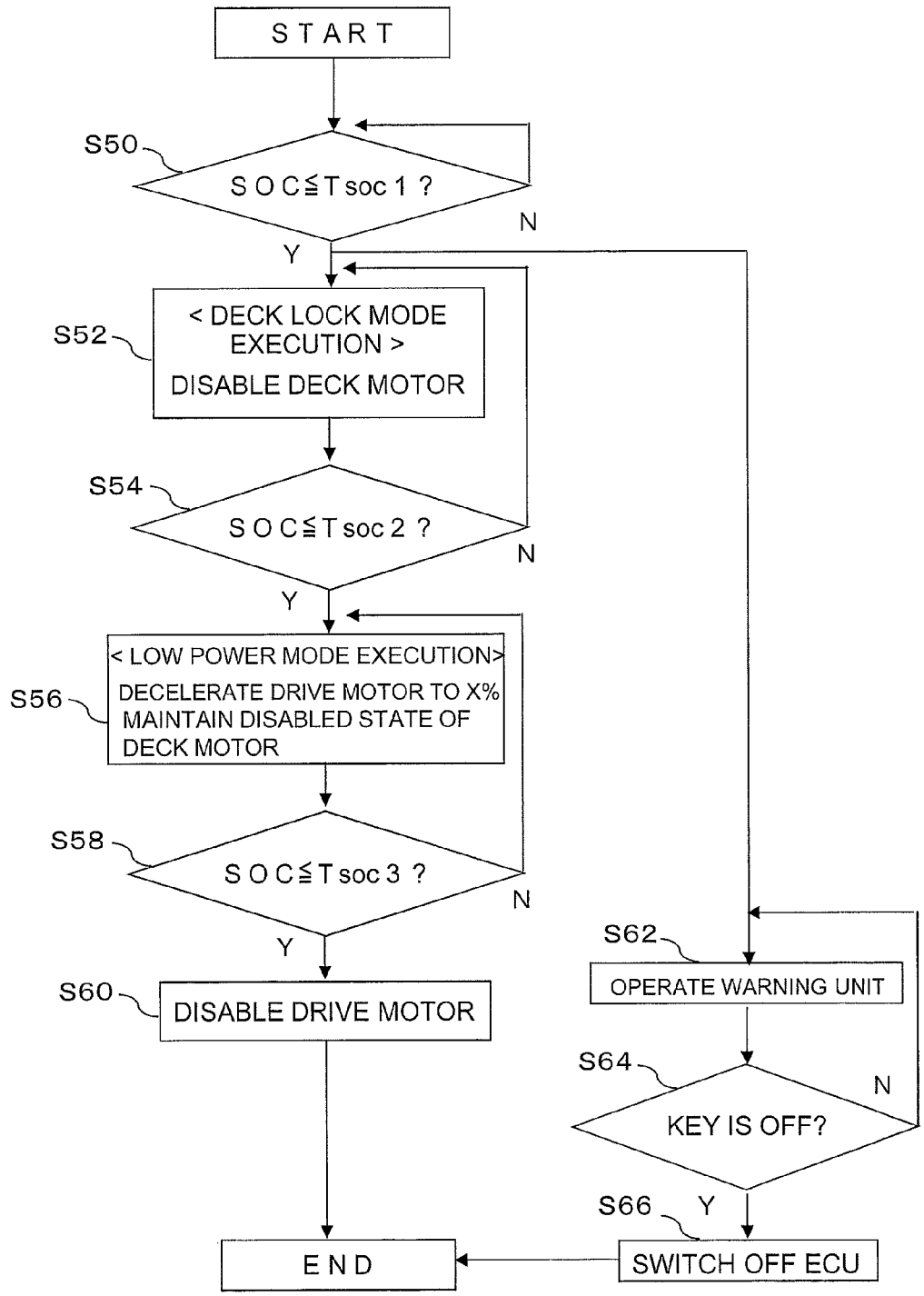
FIG. 6 is a flow chart showing a method of controlling a drive motor and a deck motor in a control system of a second embodiment of the present invention.

FIG. 6 is a flow chart showing a method of controlling a drive motor and a deck motor in a control system of a second embodiment of the present invention. In the following description, elements identical with those shown in FIGS. 1 and 2 are denoted with the same reference numerals. The basic configuration of the present embodiment is the same as that of the first embodiment described above. In the present embodiment, the key switch 58 is not used as the restart permission section. Instead, the low charge processing unit 66 of the ECU 50 executes a "deck lock mode" of performing a step of disabling the deck motors 42 when the SOC, which is the amount of charge of the battery 43, reaches or falls below the first threshold Tsoc1 set in advance. When the SOC of the battery 43 reaches or falls below the second threshold Tsoc2 lower than the first threshold Tsoc1 after the deck motors 42 have been disabled, the low charge processing unit 66 executes the "low power mode," which is a decelerated travelling mode where the allowed speed of the drive motors 26 and 28 is reduced to a predetermined proportion of the normally allowed speed. When the SOC of the battery 43 reaches or falls below a third threshold Tsoc3 lower than the second threshold Tsoc2 after the execution of the low power mode, the second low charge processing unit 68 of the ECU 50 performs a "motor disabling step" of disabling the drive motors 26 and 28.

When the SOC of the battery 43 reaches or falls below the first threshold Tsoc1, the ECU 50 causes the warning unit to operate until the key switch 58 connected between the battery 43 and the ECU 50 is turned off.

Next, a method of controlling each of the drive motors 26 and 28 and the deck motors 42 will be described by reference to the flow chart of FIG. 6. When it is determined in S50 that the SOC calculated by the charge calculation unit 64 has reached or fallen below the first threshold Tsoc1 set in advance (SOC≤Tsoc1), the low charge processing unit 66 executes the "deck lock mode" in S52, and disables each deck motor 42.

When the SOC is further reduced and reaches or falls below the second threshold Tsoc2 lower than the first threshold Tsoc1 (SOC≤Tsoc2) in S54, the low charge processing unit 66 executes in S56 the low power mode where the allowed speed, which is a speed according to the operation of the corresponding operation lever 34 or 36 of the drive motor 26 or 28, is reduced to X %, which is a predetermined proportion set in advance with respect to a normally allowed speed. In this case, the disabled state of the deck motors 42 is maintained.

When the SOC is further reduced to reach or fall below the third threshold Tsoc3 lower than the second threshold Tsoc2 in S58 (SOC≤Tsoc3), the second low charge processing unit 68 performs the "motor disabling step" where each of the drive motors 26 and 28 is disabled.

Furthermore, in the case it is determined in S50 that the SOC has reached or fallen below the first threshold Tsoc1 set in advance (SOC≤Tsoc1), the ECU 50 causes a warning unit such as the warning buzzer 62 to operate in S62, and keeps the same operating in S62 and S64 until the key switch 58 is turned off. Since, when the key switch 58 is turned off, supply of electric power from the battery 43 to the ECU 50 is stopped and the ECU 50 is turned off in S66, the operation of the warning unit is also stopped.

According to the motor control system described above, when the SOC of the battery 43 reaches or falls below the first threshold Tsoc1, the deck lock mode where the deck motors 42 are disabled is executed, and thus, reduction in the SOC of the battery 43 may be effectively suppressed, and the travelling range may be increased. Also, when the SOC of the battery 43 reaches or falls below the second threshold Tsoc2 lower than the first threshold Tsoc1, the low power mode where the allowed speed of the drive motors 26 and 28 is reduced is executed, and thus, reduction in the SOC of the battery 43 may be even more effectively suppressed, and the travelling range may be even more increased. Furthermore, from the time of the SOC reaching or falling below the first threshold Tsoc1 to the time of the SOC reaching or falling below the second threshold Tsoc2, the deck motors 42 are disabled, but the allowed speed of the drive motors 26 and 28 does not have to be reduced, and the reduction in the travelling performance over a long time may be suppressed.

Figure 7:
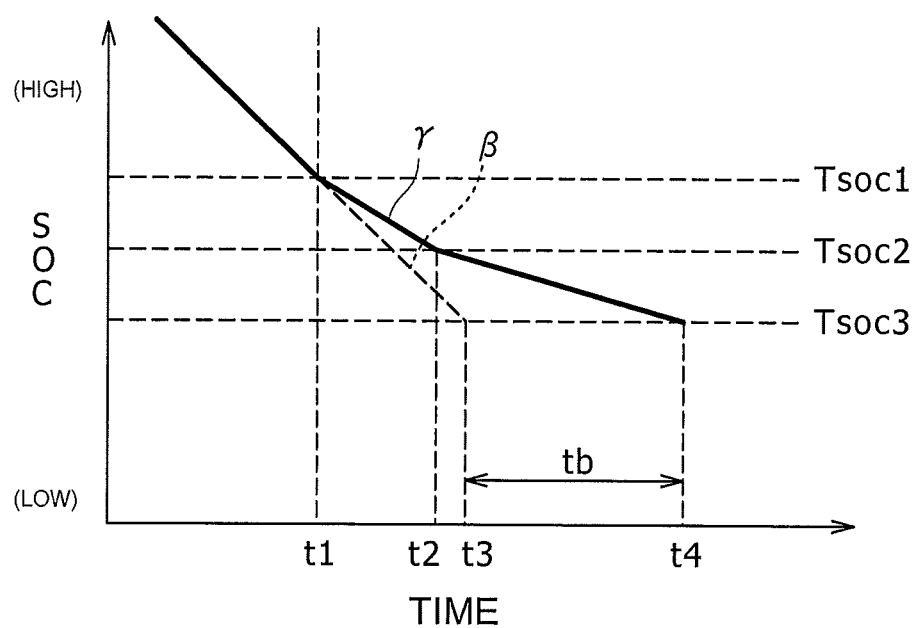
FIG. 7 is a diagram showing gradual reduction in SOC, which is the amount of charge of a battery, in a case where a vehicle is travelling at a maximum allowed vehicle speed in the second embodiment.

FIG. 7 is a diagram showing reduction in the SOC of the battery 43 in a case where a vehicle is travelling at a maximum allowed vehicle speed in the present embodiment. As shown by a solid line γ in FIG. 7, when the SOC is reduced and reaches or falls below the first threshold Tsoc1, all the deck motors 42 are disabled, and the speed of reduction in the SOC after time t1 becomes gradual. Also, when the SOC is further reduced and reaches or falls below the second threshold Tsoc2, the low power mode where the allowed speed of the drive motors 26 and 28 is reduced is executed, and the speed of reduction in the SOC after time t2 becomes even more gradual. Accordingly, the travelling range until the SOC is further reduced down to the third threshold Tsoc3 and the drive motors 26 and 28 are disabled may be increased. For example, if, unlike in the present embodiment, the deck motors 42 are not disabled even when the SOC has reached or fallen below the first threshold Tsoc1, and the low power mode where the allowed speed of the drive motors 26 and 28 is reduced is not executed, as shown by a dashed line β in FIG. 7, the SOC reaches the third threshold Tsoc3, and the drive motors 26 and 28 are disabled. In this case, the speed in the reduction of the SOC is great, and the travelling range is reduced as compared with the present embodiment, by the distance corresponding to time tb from t3 to t4. Other configurations and effects are the same as those of the first embodiment described above.

[Third Embodiment]

Figure 8:
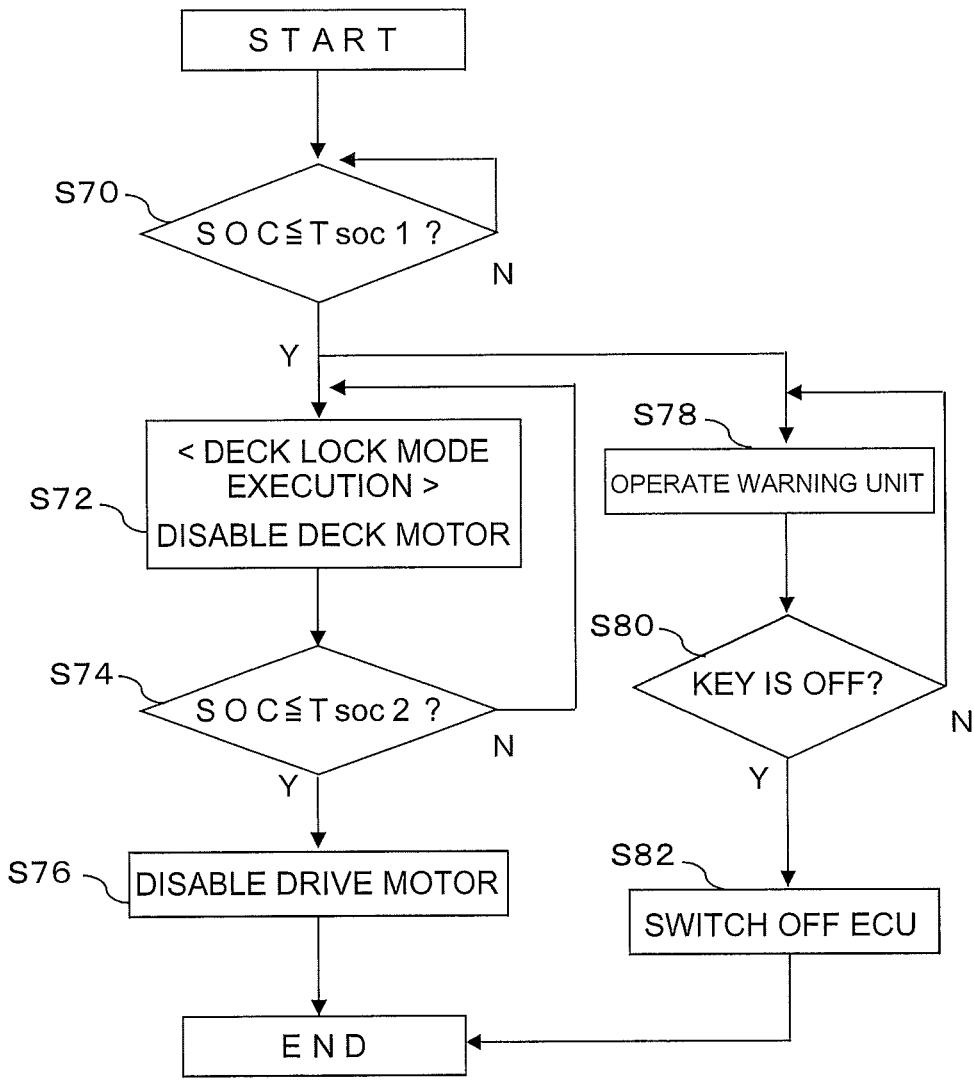
FIG. 8 is a flow chart showing a method of controlling a drive motor and a deck motor in a control system of a third embodiment of the present invention.

FIG. 8 is a flow chart showing a method of controlling a drive motor and a deck motor in a control system of a third embodiment of the present invention. The basic configuration of the present embodiment is the same as that of the first embodiment described above. Also in the present embodiment, the key switch 58 is not used as the restart permission section. Instead, the low charge processing unit 66 of the ECU 50 executes the "deck lock mode" of performing a step of disabling the deck motors 42 when the SOC, which is the amount of charge of the battery 43, reaches or falls below the first threshold Tsoc1 set in advance. Also, when the SOC of the battery 43 reaches or falls below the second threshold Tsoc2 lower than the first threshold Tsoc1 after the deck motors 42 have been disabled, the low charge processing unit 66 performs the "motor disabling step" of disabling the drive motors 26 and 28.

When the SOC of the battery 43 reaches or falls below the first threshold Tsoc1, the ECU 50 causes the warning unit to operate until the key switch 58 connected between the battery 43 and the ECU 50 is turned off.

Next, a method of controlling each of the drive motors 26 and 28 and the deck motors 42 will be described by reference to the flow chart of FIG. 8. When it is determined in S70 that the SOC calculated by the charge calculation unit 64 has reached or fallen below the first threshold Tsoc1 set in advance (SOC≤Tsoc1), the low charge processing unit 66 executes the "deck lock mode" in S72, and disables each deck motor 42.

When the SOC is further reduced and reaches or falls below the second threshold Tsoc2 lower than the first threshold Tsoc1 (SOC≤Tsoc2) in S74, the low charge processing unit 66 performs in S76 the "motor disabling step" where the drive motors 26 are 28 are disabled.

When it is determined in S70 that the SOC has reached or fallen below the first threshold Tsoc1 set in advance (SOC≤Tsoc1), the ECU 50 causes the warning unit such as the warning buzzer 62 to operate in S78, and keeps the same operating, in S78 and S80, until the key switch 58 is turned off. Since, when the key switch 58 is turned off, supply of electric power from the battery 43 to the ECU 50 is stopped and the ECU 50 is turned off in S82, the operation of the warning unit is also stopped.

According to the motor control system described above, when the SOC of the battery 43 reaches or falls below the first threshold Tsoc1, the deck lock mode where the deck motors 42 are disabled is executed, and thus, reduction in the SOC of the battery 43 may be effectively suppressed, and the travelling range may be increased. The configuration described above is the same as that of the second embodiment with the low power mode omitted.

[Fourth Embodiment]

Figure 9:
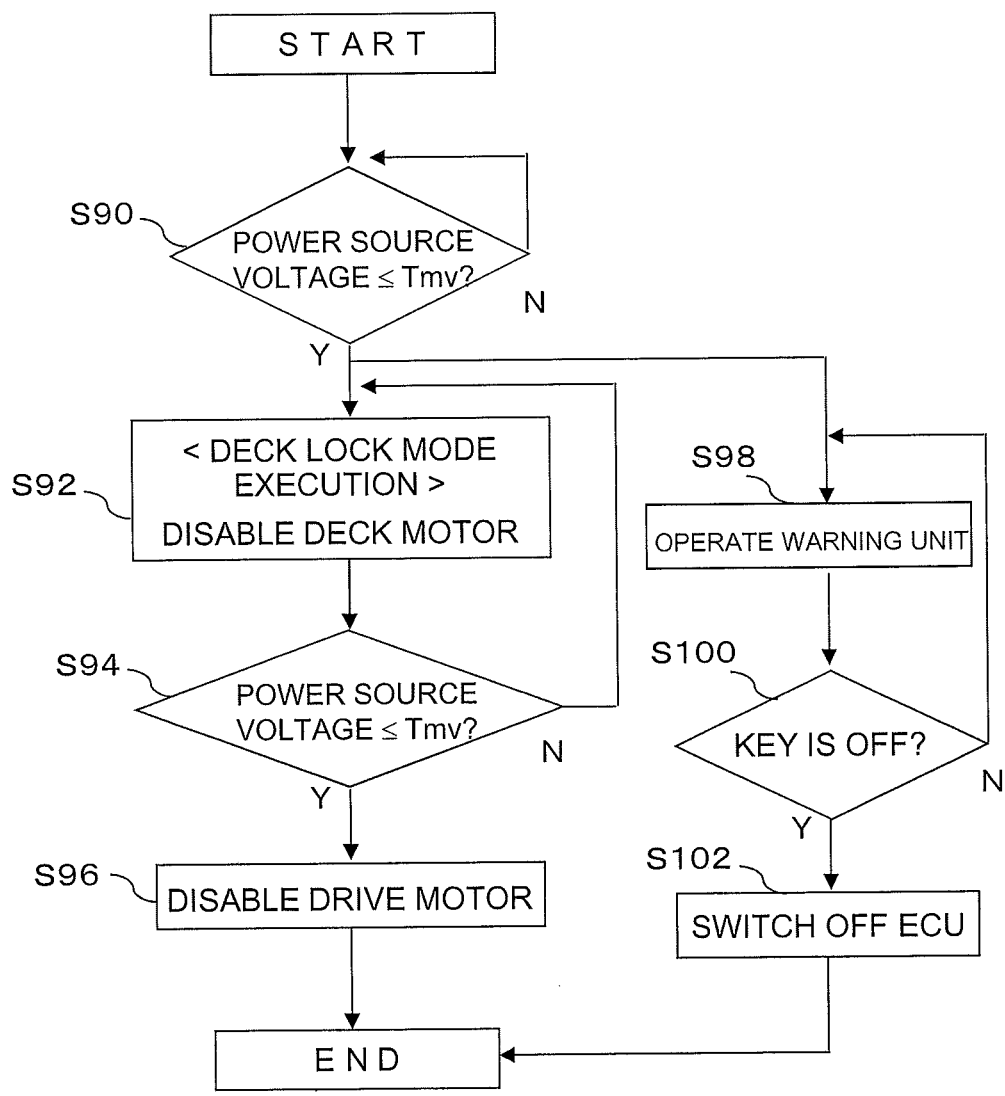
FIG. 9 is a flow chart showing a method of controlling a drive motor and a deck motor in a control system of a fourth embodiment of the present invention.

FIG. 9 is a flow chart showing a method of controlling a drive motor and a deck motor in a control system of a fourth embodiment of the present invention. In the present embodiment, execution of the deck lock mode and the disabling of the drive motor in the third embodiment shown in FIG. 8 described above are not determined based on the SOC of the battery 43, but are determined based on the voltage of the battery 43. That is, the ECU 50 includes a low voltage processing unit not shown. The low voltage processing unit performs a step of executing the deck lock mode when detected voltage of the battery 43 detected by the voltage sensor 78 in FIG. 2 reaches or falls below a threshold Tmv set in advance. Also, when the detected voltage of the battery 43 rises and then reaches or falls below the threshold Tmv again, the low voltage processing unit performs the "motor disabling step" where all the drive motors 26 and 28 are disabled.

When it is determined that the detected voltage has reached or fallen below the threshold Tmv set in advance, the ECU 50 causes a warning unit such as the warning buzzer 62 to operate, and keeps the same operating until the key switch 58 is turned off.

Next, a method of controlling each of the drive motors 26 and 28 and the deck motors 42 will be described by reference to the flow chart of FIG. 9. When it is determined in S90 that the detected voltage has reached or fallen below the threshold Tmv set in advance, the low voltage processing unit executes the "deck lock mode" in S92, and disables each deck motor 42.

When the detected voltage rises and then reaches or falls below the threshold Tmv again in S94, the low voltage processing unit performs in S96 the "motor disabling step" where the drive motors 26 are 28 are disabled.

When it is determined in S90 that the detected voltage has reached or fallen below the threshold Tmv set in advance, the ECU 50 causes the warning unit such as the warning buzzer 62 to operate in S98, and keeps the same operating, in S98 and S100, until the key switch 58 is turned off. Since, when the key switch 58 is turned off, supply of electric power from the battery 43 to the ECU 50 is stopped and the ECU 50 is turned off in S102, the operation of the warning unit is also stopped.

According to the motor control system configured in the above manner, when the detected voltage of the battery 43 reaches the threshold Tmv, the deck lock mode where the deck motors 42 are disabled is executed, and thus, reduction in the SOC of the battery 43 may be effectively suppressed, and the travelling range may be increased. Other configurations and effects are the same as those of the third embodiment shown in FIG. 8 described above.

[Fifth Embodiment]

Figure 10:
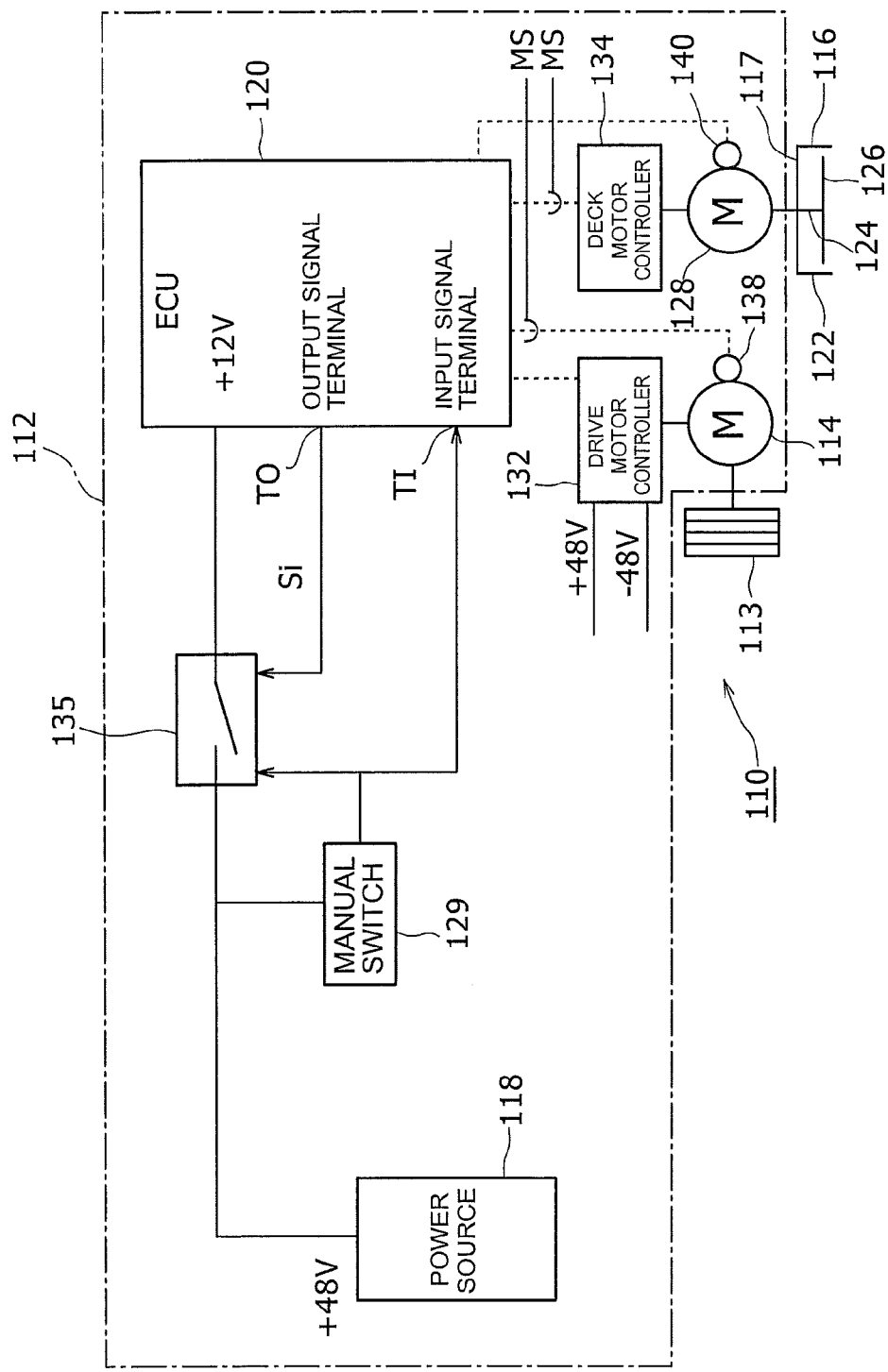
FIG. 10 is a circuit diagram showing a schematic configuration of a motor control system of a fifth embodiment of the present invention.

FIGS. 10 to 13 are diagrams showing a fifth embodiment of the present invention. FIG. 10 is a circuit diagram showing a schematic configuration of a motor control system 112. First, this schematic configuration will be described, and then, a concrete configuration will be described. As shown in FIG. 10, the motor control system 112 is mounted on a mower vehicle 110, which is an electric motor-driven vehicle. The mower vehicle 110 is a riding ground work vehicle on which an engine is not mounted, and includes left and right caster wheels, not shown, supported on the front side of a main frame, not shown, configuring the vehicle body; left and right wheels 113 supported on the rear side of the main frame; left and right drive motors 114; a mower main body 117 configuring a mower 116, which is a working implement; and left and right operation levers, not shown. In the following, the motor control system 112 is sometimes referred to simply as the control system 112.

Although only one wheel 113 and one drive motor 114 are shown in FIG. 10, these are the wheel 113 and the drive motor 114 on the left side of the vehicle shown representatively, and in reality, there are a corresponding wheel and drive motor on the right side of the vehicle. Each caster wheel is provided in such a manner as to be capable of rotating 360 degrees or more around a shaft in the vertical direction. The left and right wheels 113 are driven by the drive motors, 114 which are left and right electric motors, described later, provided on corresponding sides.

The mower vehicle 110 is capable of travelling in the forward direction or the reverse direction by having the left and right drive motors 114 driven, and is capable of turning when a difference occurs in the rotational speeds of the left and right drive motors 114. The left and right operation levers have the function of both a turning instruction device and of an acceleration instruction device, and are separately provided on both the left and right sides of the driver's seat on the main frame. Each operation lever is provided in a manner capable of swinging to the front or back around a horizontal shaft along a left and right direction of the vehicle. The swing direction and the swing angle of each operation lever is detected by a left or right lever sensor, not shown, and the detection signal is transmitted to an ECU, which is a controller described later.

In the mower vehicle, a steering operator, which is a steering handle, may be used as the turning instruction device, and an accelerator pedal may be used as the acceleration instruction device. In this case, the operation direction and the amount of operation of the steering operator are detected by a steering sensor, and the amount of operation of the accelerator pedal is detected by an accelerator sensor, and each of the detection signals are transmitted to the ECU.

The left and right wheels 113 may be made the front wheels, and the caster wheels may be made the rear wheels. The number of caster wheels may be one. A deceleration mechanism may be provided between the wheel 113 and the drive motor 114.

The mower main body 117 is called a mower, and includes a plurality of mower blades 126 that are supported inside a mower deck 122 in a manner capable of rotating around a rotating shaft 124 along a vertical direction, and the lawn may be mowed by the rotation of the mower blades 126. The mower blades 126 are driven by deck motors 128, which are auxiliary motors described later.

As the mowing rotary tool of the mower 116, besides the mower blade type, there may also be used a reel type which has, for example, blades spirally arranged on a cylinder having a rotating shaft that is parallel to the ground, which has a function of snipping and cutting the grass or the like, and which is driven by a deck motor.

The control system 112 includes left and right drive motors 114 and a plurality of deck motors 128, a battery 118, a manual switch 129, an ECU 120, which is an upper controller and a main controller, a drive motor controller 132 and a deck motor controller 134, which are lower controllers, a first rotational angle sensor 138, a second rotational angle sensor 140, and an ECU electric power supply switching unit 135, which is a controller electric power supply switching unit.

The drive motor 114 is an electric motor such as a three-phase synchronous motor or an induction motor, for example. The deck motor 128 is an auxiliary motor which is an electric motor, and one or more of the same are provided on the upper side of the mower deck 122 in correspondence with the mower blade(s) 126. The output shaft of the deck motor 128 is coupled to the rotating shaft 124 of the mower blade 126, and the mower blade 126 is rotated by the rotation of the deck motor 128. The mower 116 is configured from the deck motors 128 and the mower main body 117. Accordingly, the mower 116 is driven by the deck motors 128.

The battery 118 is a DC power source, and is connected to each drive motor 114 and each deck motor 128, and supplies electric power to each of them. The battery 118 may be a lead acid battery, a nickel-metal-hydride battery, a lithium battery, or the like, and may have voltage of 48V, for example. The battery 118 may also be charged by an external commercial AC source via a charger.

The mower vehicle 110 may be a so-called hybrid including an engine and a generator. In this case, the generator is made to generate electric power using the power of the engine, and the generated electric power may be supplied to the battery 118. Also, other electric power storage units, such as a capacitor, may be used instead of the battery 118.

The ECU 120 includes a microcomputer including a CPU, a memory, and the like, and is connected to two drive motor controllers 132 corresponding to the left and right drive motors 114 and two deck motor controllers 134, respectively. Although only one drive motor controller 132 and one deck motor controller 134 are shown in FIG. 10, they are each provided to correspond in number to the drive motors 114 and the deck motors 128. The ECU 120 calculates the target number of revolutions for the left and right drive motors 114 according to the amounts of operation and the operation directions of the left and right operation levers (or a steering operator and an accelerator pedal), and outputs a signal indicating the corresponding target number of revolutions to each drive motor controller 132. Each drive motor controller 132 includes a driving inverter, not shown, which is a driver, and a driving control circuit, not shown, for controlling the driving inverter. The driving control circuit controls the driving inverter such that a corresponding drive motor 114 is driven according to the target number of revolutions.

When one or both of the left and right operation levers are made to swing, the ECU 120 controls the corresponding drive motor(s) 114 such that the drive motor(s) 114 is (are) rotated in the rotation direction according to the swing direction and at the rotational speed according to the swing angle from the upright position.

In the case of using the steering operator as the turning instruction device, and the accelerator pedal as the acceleration instruction device, the ECU 120 controls each drive motor 114 such that the vehicle turns in the direction according to the steering direction of the steering operator, and is accelerated at a speed according to the amount of operation of the accelerator pedal.

The ECU 120 receives a signal indicating an ON/OFF state from a deck switch, not shown, and according to this signal, transmits a signal indicating driving or drive stop of the deck motor 128 to the deck motor controller 134. The deck motor controller 134 includes a deck inverter, not shown, which is a driver, and a deck control circuit, not shown, for controlling the deck inverter. The deck control circuit controls the deck inverter such that a corresponding deck motor 128 is driven according to the target number of revolutions set in advance. Additionally, in the present specification, the "rotational speed" has both the general meaning of a rotational speed and the meaning of the number of revolutions per unit time, such as per minute.

The first rotational angle sensor 138 is attached to each drive motor 114, and detects the rotational angle of the corresponding drive motor 114. The detection signal for the rotational angle is input directly or via the corresponding drive motor controller 132 to the ECU 120 as a signal indicating the driving state of the drive motor 114.

The second rotational angle sensor 140 is attached to each deck motor 128, and detects the rotational angle of the corresponding deck motor 128. The detection signal for this rotational angle is also input directly or via the corresponding deck motor controller 134 to the ECU 120 as a signal indicating the driving state of the deck motor 128.

The ECU 120 calculates the rotational speed of each drive motor 114 and the rotational speed of each deck motor 128 from the detection signals for the rotational angles which have been input. The first rotational angle sensor 138 and the second rotational angle sensor 140 are configured from a resolver or the like. Additionally, a rotational speed sensor for detecting the rotational speed of a corresponding motor may be attached to the motor instead of the rotational angle sensor, and the detection signal for the rotational speed may be input to the ECU 120 as a signal indicating the driving state of the drive motor 114 or the deck motor 128.

The manual switch 129 corresponds to a key switch 130 shown in FIGS. 12 and 14 described later, and is provided at a position allowing a driver, who is a user on the driver's seat, to operate the same. The manual switch 129 is turned on or off according to an operation of the driver, and outputs a signal indicating ON or OFF to an input signal terminal TI of the ECU. The manual switch 129 is not limited to a key switch, and various configurations may be adopted, so long as turning on or off may be performed according to an operation of a user.

The ECU electric power supply switching unit 135 is connected between the battery 118 and the ECU 120. The ECU electric power supply switching unit 135 corresponds to an ECU electric power supply relay 136 or a DC/DC converter 160 in which a control circuit is embedded shown in FIGS. 12 and 14 described later. The ECU electric power supply switching unit 135 supplies electric power; i.e., feeds electric power, from the battery 118 to the ECU 120 while the manual switch 129 is ON. Also, the ECU electric power supply switching unit 135 supplies electric power from the battery 118 to the ECU 120 in a case where an ON instruction signal Si is input from an output signal terminal TO of the ECU 120. On the other hand, when the manual switch 129 is turned off, and input of an ON instruction signal Si from the output signal terminal TO of the ECU 120 is interrupted, the ECU electric power supply switching unit 135 interrupts supply of electric power from the battery 118 to the ECU 120.

While the manual switch 129 is OFF, and at least one of the drive motors 114 and the deck motors 128 controlled by the ECU 120 is rotating, the ECU 120 maintains the output of the ON instruction signal Si to the ECU electric power supply switching unit 135. On the other hand, when the manual switch 129 is OFF, and all of the drive motors 114 and the deck motors 128 controlled by the ECU 120 are stopped, the ECU 120 interrupts the output of the ON instruction signal Si to the ECU electric power supply switching unit 135. The rotation states of the motors 114 and 128 described above are determined based on the rotational speeds which are based on the rotational angles acquired from the rotational angle sensors 138 and 140, or the like.

Control methods including the control method of the ECU 120 described above will be described with reference to FIG. 11. FIG. 11 is a diagram showing a relationship between a switch input state (TI) and a motor operation state (MS) acquired by the ECU 120, and an output state (TO) with respect to the ECU electric power supply switching unit 135 in the schematic configuration shown in FIG. 10. In the following description, elements identical with those shown in FIG. 10 are denoted with the same reference numerals. The switch input state (TI) indicates an ON/OFF state of the manual switch 129. The motor operation state (MS) indicates the rotating states of the motors 114 and 128, and ON indicates that at least one of the drive motors 114 and the deck motors 128 is rotating, and OFF indicates that all of the drive motors 114 and the deck motors 128 have stopped rotating. Also, the output state (TO) indicates the presence or absence of an ON instruction signal Si from the ECU 120 to the ECU electric power supply switching unit 135, and ON indicates that there is an output of an ON instruction signal Si from the ECU 120 to the ECU electric power supply switching unit 135, and OFF indicates that there is no output of an ON instruction signal Si from the ECU 120 to the ECU electric power supply switching unit 135.

The ECU 120 determines the output state (TO) for the ECU electric power supply switching unit 135 corresponding to the acquired switch input state (TI) and the motor operation state (MS), based on the relationship shown in FIG. 11. Accordingly, output of the ON instruction signal Si to the ECU electric power supply switching unit 135 is interrupted only in the case where the switch input state (TI) is OFF; that is, the manual switch 129 is OFF, and the motor operation state (MS) is OFF; that is, all of the drive motors 114 and the deck motors 128 are stopped. With the interruption of the ON instruction signal Si, the ECU electric power supply switching unit 135 stops supply of electric power from the battery 118 to the ECU 120 under the condition that the manual switch 129 is OFF. On the other hand, in cases other than the case where the manual switch 129 is OFF, and all of the drive motors 114 and the deck motors 128 are stopped, output of the ON instruction signal Si is maintained, and thus, the ECU electric power supply switching unit 135 supplies electric power from the battery 118 to the ECU 120 even if the manual switch 129 is OFF. The ECU electric power supply switching unit 135 is not limited to the ECU electric power supply relay 136 or the DC/DC converter 160 in which a control circuit is embedded described later, so long as it is configured in the manner described above, and various configurations may be adopted. The ECU 120 may also hold the relationship shown in FIG. 11 as a map.

Figure 12:
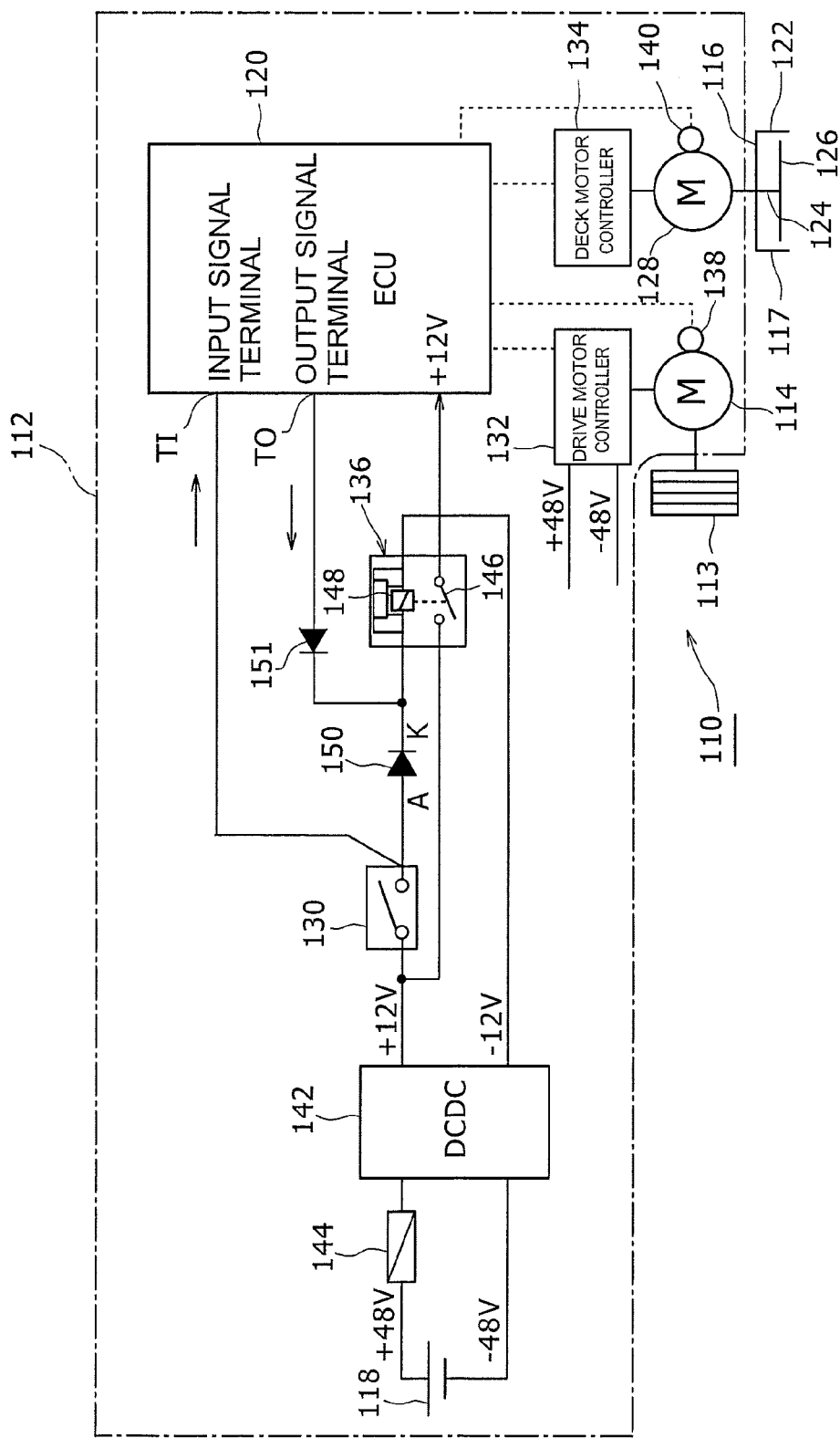
FIG. 12 is a circuit diagram showing a concrete configuration of the motor control system in FIG. 10.

Now, FIG. 12 is a circuit diagram showing a concrete configuration of the motor control system in FIG. 10. In FIG. 12, the key switch 130 is used as the manual switch 129, and the ECU electric power supply relay (ECU power relay) 136 is used as the ECU electric power supply switching unit 135.

The key switch 130 is switched between ON and OFF by an operation unit being operated; that is, by a key being inserted into the operation unit and being rotated. The key switch 130 is connected between the battery 118 and the ECU 120 via a DC/DC converter 142. In the following, the DC/DC converter is sometimes referred to simply as a converter. The converter 142 steps down, and outputs to the side of the key switch 130, the voltage of the battery 118. For example, in the case where the voltage of the battery 118 is 48V, this is stepped down to 12V by the converter 142 and is output to the side of the key switch 130. Additionally, it is also possible to omit the converter 142 by causing the voltage of the battery 118 and the voltage of the ECU 120 to be the same, for example. Also, a fuse 144 is connected between the positive post of the battery 118 and the positive post at the input of the converter 142.

The ECU electric power supply relay 136 includes, between the battery 118 and the ECU 120, a switch main body 146 connected in parallel with the key switch 130, and a coil 148 for switching between connection and disconnection of the switch main body 146 according to the energization state. A diode 150, which is a rectifying element, is connected between the key switch 130 and the coil 148 of the ECU electric power supply relay 136. Also, the input signal terminal TI of the ECU 120 is connected between the key switch 130 and the anode A side of the diode 150. The output signal terminal TO of the ECU 120 is connected between the cathode K side of the diode 150 and the coil 148 via a diode 151 for preventing backflow to the ECU 120. The ECU electric power supply relay 136 maintains connection of the switch main body 146 by causing the coil 148 to be energized by the battery 118 via the diode 150 when the key switch 130 is turned on. Then, electric power is supplied from the battery 118 to the ECU 120 via the switch main body 146. Also, at the same time as being turned on, the key switch 130 outputs, as a key ON signal indicating that the key switch 130 is ON, a voltage signal of the battery 118 to the input signal terminal TI of the ECU 120.

When the key switch 130 has been switched from OFF to ON, and that the key switch 130 has been switched from OFF to ON is determined by an input of the key ON signal to the input signal terminal TI, the ECU 120 energizes the coil 148 of the ECU electric power supply relay 136 as transmission of an ON instruction signal from the output signal terminal TO. According to this configuration, the connection of the switch main body 146 of the ECU electric power supply relay 136 is maintained, and the energized state is maintained. The power source connection to the ECU 120 is thereby self-held.

On the other hand, energization as the ON instruction signal output from the output signal terminal TO to the coil 148 is interrupted; i.e., made zero, only when an "electric power supply stopping condition" is satisfied where all of the drive motors 114 and the deck motors 128 controlled by the ECU 120 are stopped after switching of the key switch 130 from ON to OFF. Energization of the coil 148 is thereby interrupted and the switch main body 146 is interrupted. Then, the electric power supply from the battery 118 to the ECU 120 is interrupted, and the power source connection to the ECU 120 is interrupted. Signals transmitted from the ECU 120 to the ECU electric power supply relay 136 are not transmitted to the side of the key switch 130, due to the diode 150.

Figure 13:
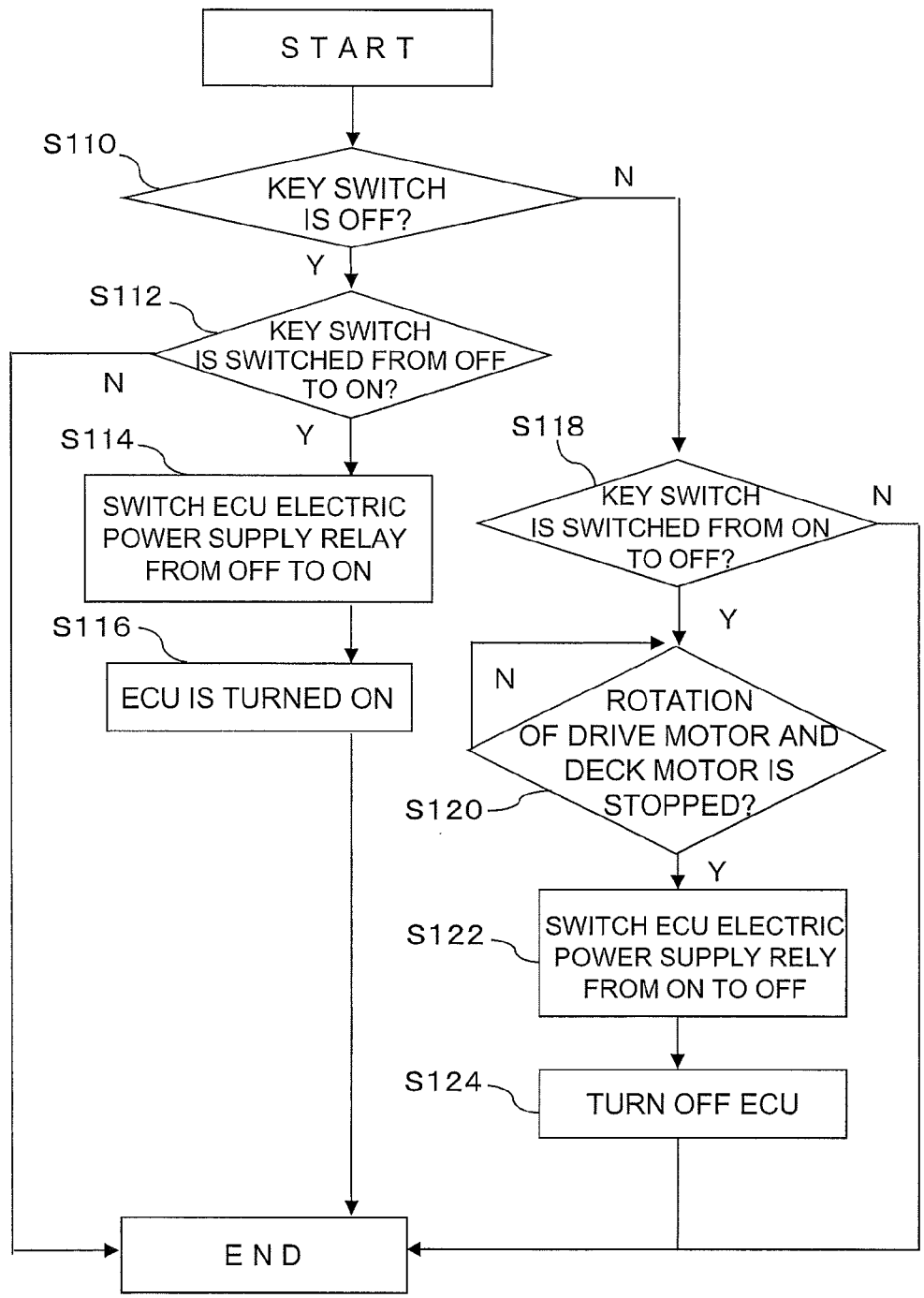
FIG. 13 is a flow chart diagram for describing a method of controlling ON/OFF of an ECU by the motor control system in FIG. 12.

FIG. 13 is a flow chart diagram for describing a method of controlling ON/OFF of the ECU 120 by the control system shown in FIG. 12. In the case where the key switch 130 is OFF in S110, if the key switch 130 is switched from OFF to ON in S112, the coil 148 of the ECU electric power supply relay 136 is energized and the switch main body 146 is switched from OFF to ON in S114. In this case, the ECU 120 is supplied with electric power and is turned on in S116, and a signal is transmitted from the output signal terminal TO to the coil 148. Then, connection of the switch main body 146 of the ECU electric power supply relay 136 is maintained.

On the other hand, in the case where the key switch 130 is ON in S110, if the key switch 130 is switched from ON to OFF in S118, electric power supply from the battery 118 to the ECU 120 via the key switch 130 is interrupted, but the battery 118 and the ECU 120 remain connected via the ECU electric power supply relay 136. Then, the ECU 120 determines in S120 whether all of the drive motors 114 and the deck motors 138 connected to the ECU 120 have stopped rotating or not, and in the case where the rotation is determined to have stopped, the ECU 120 switches the ECU electric power supply relay 136 from ON to OFF in S122. Accordingly, the electric power supply to the ECU 120 is stopped in S124, and the ECU 120 is turned off. The ECU 120 may perform such a control method by a program that is stored in advance.

Additionally, in the above, a case is described where the ECU 120 is provided being separated from the drive motor controller 132 and the deck motor controller 134, but the ECU 120 and at least one of the motor controllers 132 and 134 may be integrated, and a part or all of the functions of the motor controllers 132 and 134 may be included in the ECU 120.

According to the control system 112 described above, even if the key switch 130 is OFF, if at least one of the drive motors 114 and the deck motors 128 controlled by the ECU 120 is rotating, the electric power supply stopping condition is not satisfied, and electric power supply from the battery 118 to the ECU 120 is maintained. Accordingly, even if the key switch 130 is turned off by mistake during rotation of at least one of the drive motors 114 and the deck motors 128, occurrence of a situation not desirable with respect to the durability of parts may be prevented.

Also, the diode 150 is connected between the key switch 130 and the ECU electric power supply relay 136, the anode A side of the diode 150 is connected to the input signal terminal TI of the ECU 120, and the cathode K side is connected to the output signal terminal TO of the ECU 120. Thus, in order to achieve the advantage of the present embodiment, it is not necessary to adopt a configuration where a relay different from the ECU electric power supply relay 136 is connected between the battery 118 and the ECU 120, and where the ON instruction signal is output from the output signal terminal TO of the ECU 120 to the relay. Accordingly, the number of parts may be reduced, and the cost may be reduced.

[Sixth Embodiment]

Figure 14:
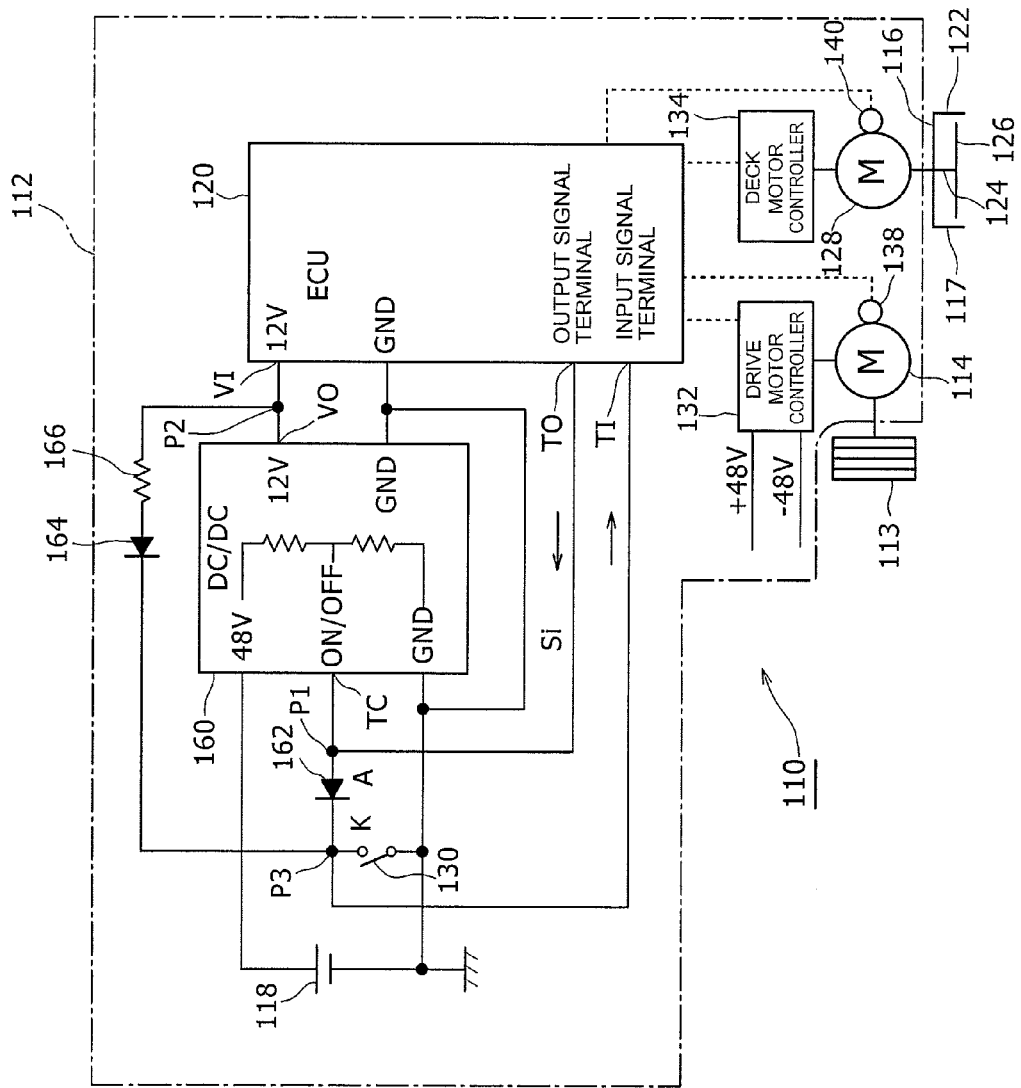
FIG. 14 is a circuit diagram showing a motor control system of a sixth embodiment of the present invention.

FIG. 14 is a circuit diagram showing a motor control system of a sixth embodiment of the present invention. Also in the present embodiment, the schematic configuration is the same as that in FIGS. 10 and 11 of the fifth embodiment described above. Particularly, in the present embodiment, a DC/DC converter 160 in which a control circuit is embedded is used as the ECU electric power supply switching unit 135 shown in FIG. 10. A motor control system 112 includes a battery 118, an ECU 120, the converter 160, a key switch 130 corresponding to the manual switch 129 in FIG. 10, a first diode 162, which is a first rectifying element, a second diode 164, which is a second rectifying element, and a resistor 166.

The converter 160 is connected between the battery 118 and the ECU 120. As with the converter 142 shown in FIG. 12 described above, the converter 160 serves the function of stepping down the voltage of the battery 118 to desired voltage and supplying the same to the ECU 120 in the case where an embedded ON/OFF control circuit, not shown, is turned on. The ON/OFF control circuit appropriately controls the ON/OFF time of a switching element, not shown, provided to the converter 160 and steps down the voltage of the battery 118 to the desired voltage in a state where an ON instruction signal Si, which is a voltage signal, is input to a control circuit terminal TC. When the ON instruction signal Si to the control circuit terminal TC is interrupted, the embedded switching element remains OFF.

The key switch 130 is connected between the battery 118 and the converter 160, and outputs a signal indicating ON or OFF to an input signal terminal TI of the ECU 120. Also, the first diode 162 is connected between a connection portion P1 of the control circuit terminal TC and an output signal terminal TO of the ECU 120, and an end of the key switch 130. Also, the second diode 164 and the resistor 166 are serially connected, and are connected between a connection portion P2 of an output voltage terminal VO of the converter 160 and an input voltage terminal VI of the ECU 120, and a connection portion P3 of an end of the key switch 130 and the input signal terminal TI of the ECU 120.

The converter 160 is activated by the control circuit terminal TC being grounded via the first diode 162 and the key switch 130 and being energized when the key switch 130 is switched from OFF to ON. Then, with this activation, the converter 160 generates an ON/OFF signal for switching on or off the switching element of the ON/OFF control circuit, and supplies to the ECU 120 electric power after conversion; that is, stepping down, of the input voltage input from the battery 118.

The ECU 120 outputs an ON instruction signal Si from the output signal terminal TO and holds an ON/OFF signal of the ON/OFF control circuit by the input of the voltage of the battery 118 after stepping down. According to this configuration, the power source connection to the ECU 120 is self-held. The input signal terminal TI is grounded via the key switch 130 in this state, and thus, the input signal becomes zero.

With respect to the ECU 120, when the key switch 130 is switched from ON to OFF, the voltage between the converter 160 and the ECU 120 is stepped down by the resistor 166, and this voltage is input to the input signal terminal TI as a signal. Accordingly, the ECU 120 detects the signal which has passed through the resistor 166. In this case, the ECU 120 interrupts the ON instruction signal Si from the output signal terminal TO and releases the holding of the ON/OFF signal of the ON/OFF control circuit, and interrupts the supply of electric power from the battery 118 to the ECU 120, only when an "electronic power supply stopping condition" where all of the drive motors 114 and the deck motors 128 controlled by the ECU 120 have been stopped is satisfied.

Also in the case of the configuration described above, as in the fifth embodiment, even if the key switch 130 is OFF, if at least one of the drive motors 114 and the deck motors 128 controlled by the ECU 120 is rotating, the electric power supply stopping condition is not satisfied, and electric power supply from the battery 118 to the ECU 120 is maintained. Accordingly, even if the key switch 130 is turned off by mistake during rotation of at least one of the drive motors 114 and the deck motors 128, occurrence of a situation not desirable with respect to the durability of parts may be prevented.

Also, since the converter 160 has a self-holding function with respect to power source connection, a relay serving the self-holding function with respect to the power source connection for the ECU 120, such as the ECU electric power supply relay 136 in the fifth embodiment shown in FIG. 12, may be omitted. Accordingly, the cost can be further reduced by the reduction in the number of parts. Other configurations and effects are the same as those of the fifth embodiment.

[Another Embodiment]

Figure 15:
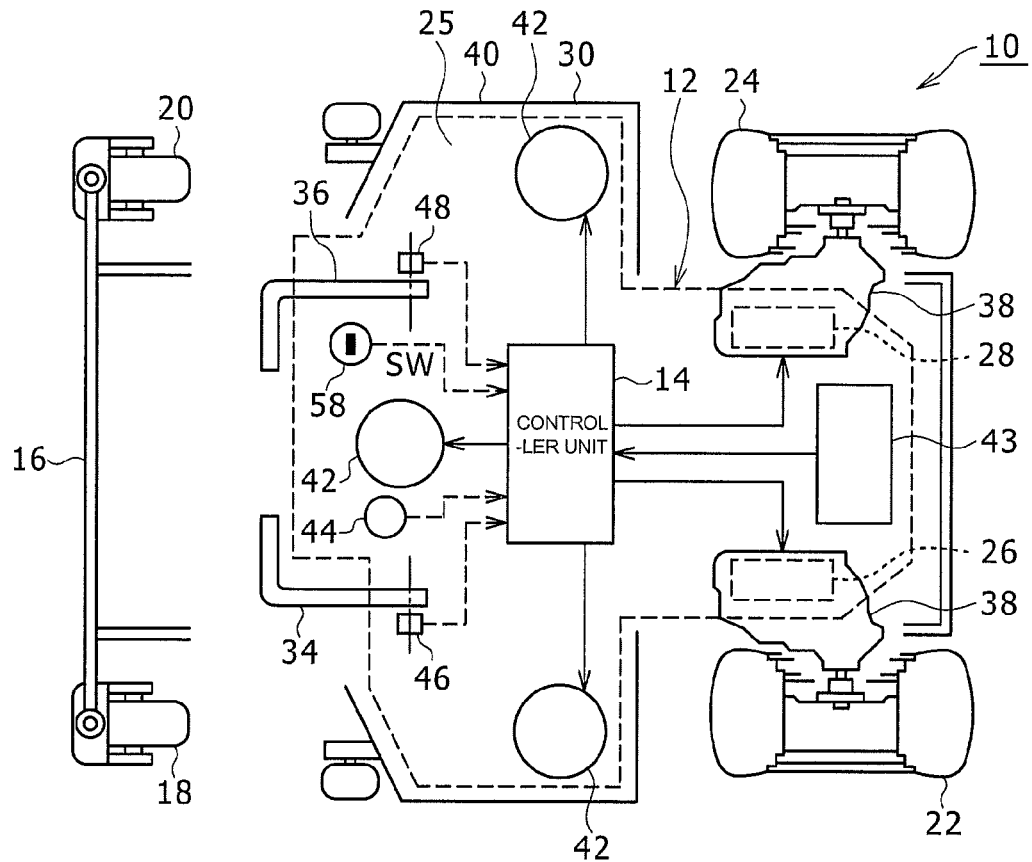
FIG. 15 is a schematic configuration diagram of a configuration, seen from above, of a mower vehicle which is an electric motor-driven vehicle on which a control system of an embodiment of the present invention is mounted.

FIGS. 15 to 20 show another embodiment of the present invention. FIG. 15 is a schematic configuration diagram of a configuration, seen from above, of a mower vehicle 10, which is an electric motor-driven vehicle on which a motor control system 12 of the present embodiment is mounted.

The overall configuration of the mower vehicle 10 is the same as the configuration of the embodiment described with reference to FIG. 1(a) which has been described above. The control system 12 includes left and right drive motors 26 and 28, three deck motors 42, which are auxiliary motors, a battery 43, which is a DC power source unit, a deck switch 44 (FIG. 16), which is a mower activation switch, left and right lever sensors 46 and 48, which are operator sensors, a key switch 58, which is a main switch, and a controller unit 14.

The configurations of the left and right drive motors 26 and 28, a power transmission unit, a motor accommodating case 38, the deck motors 42, and a mower 25 are the same as the configurations of the embodiment described with reference to FIG. 1(a) which has been described above. The rotational speeds of the left and right drive motors 26 and 28 are the same as the rotational speeds of left and right wheels 22 and 24, or they are proportional with the same coefficient for the left and right. Accordingly, if the rotational speed is the same for the left and right drive motors 26 and 28, the rotational speed is the same for the left and right wheels 22 and 24.

The deck switch 44 that instructs the activation or stop of the deck motors 42 is provided, near a seat not shown, at a position allowing the driver to operate the same, and is switched to ON or OFF by an operation of the driver, and outputs; that is, transmits, a signal indicating an ON operation or an OFF operation to an ECU 50 (FIG. 16) of the controller unit 14.

The left and right lever sensors 46 and 48 detect lever positions indicating the swing directions and the swing angles of the operation levers 34 and 36 on the corresponding sides, and transmit signals indicating the detected lever positions to the controller unit 14.

The configuration of the key switch 58, the configuration for controlling a self-holding relay 60 and a switch connection relay by the ECU 50, and the functions thereof are the same as those of the embodiment described with reference to FIG. 1(a) which has been described above.

Figure 16:
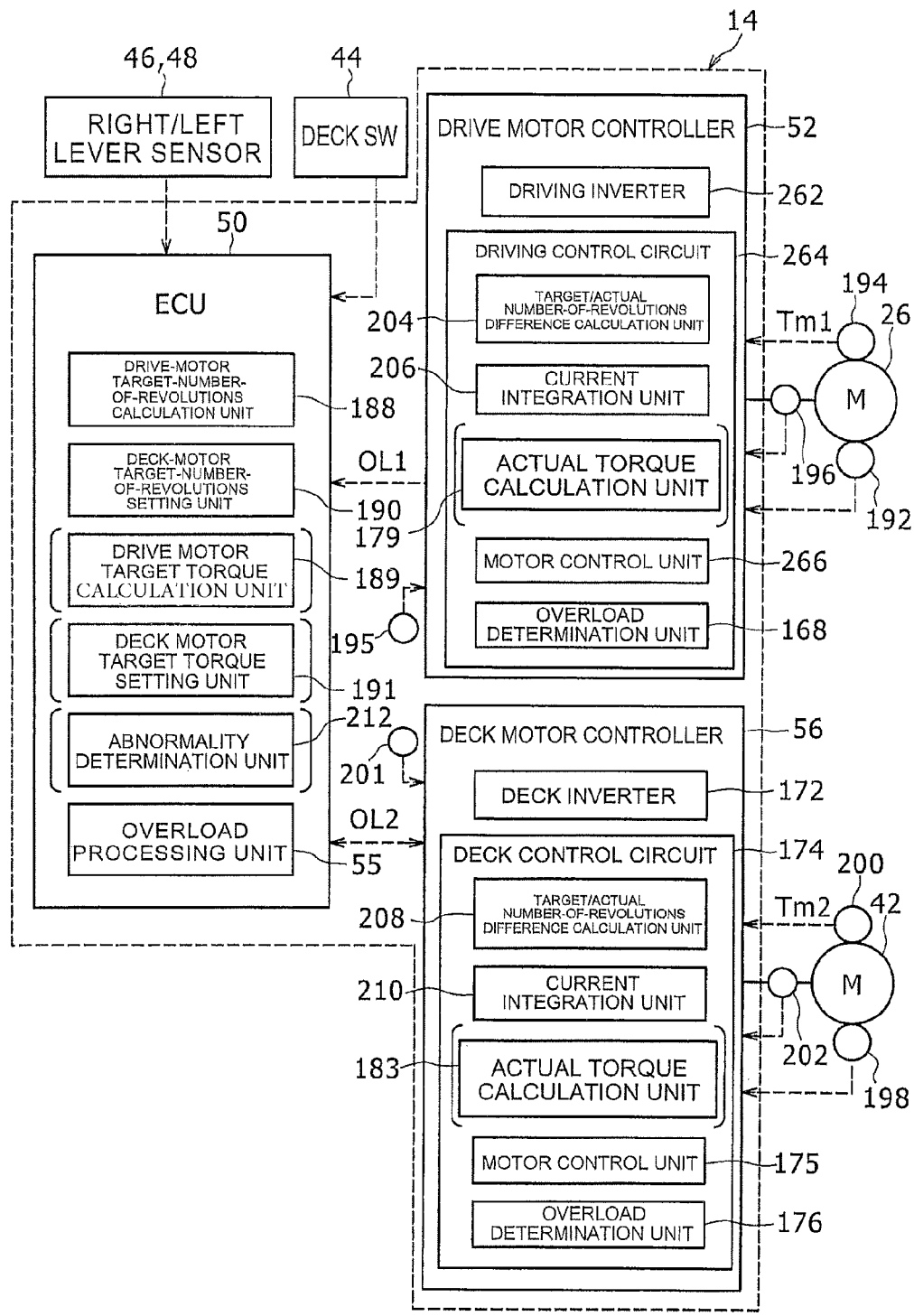
FIG. 16 is a block diagram showing a configuration of a controller unit shown in FIG. 15.

The controller unit 14 controls each of the drive motors 26 and 28 and the deck motors 42. In FIG. 15, the controller unit 14 is arranged below a seat, not shown, at substantially the center of the vehicle body. FIG. 16 shows the configuration of the controller unit 14 by a block diagram.

The controller unit 14 includes the ECU 50, which is a main controller, a left drive motor controller 52 and a right drive motor controller 54 (FIG. 17), and three deck motor controllers 56. In FIG. 16, only one of the three deck motor controllers 56 is shown for the sake of simplicity. The drive motor controller 52 controls the driving of the left drive motor 26, and the right drive motor controller 54 controls the driving of the right drive motor 28.

The ECU 50 includes a microcomputer including a CPU, a memory, and the like. The ECU 50 includes a drive-motor target-number-of-revolutions calculation unit 188, and a deck-motor target-number-of-revolutions setting unit 190. The drive-motor target-number-of-revolutions calculation unit 188 calculates a target number of revolutions which is the number of revolutions per unit time, which is per minute or per second, for the left and right drive motors 26 and 28 according to the lever positions of the left and right operation levers 34 and 36 indicated by the signals input from the lever sensors 46 and 48. The ECU 50 outputs target signals, which are control signals indicating the target numbers of revolutions which have been calculated, to the corresponding drive motor controllers 52 and 54, which are lower controllers. The ECU 50 may be configured to include a drive motor target torque calculation unit 189 instead of the drive-motor target-number-of-revolutions calculation unit 188. The drive motor target torque calculation unit 189 calculates target torque for the left and right drive motors 26 and 28 according to the left and right lever positions detected, and the ECU 50 outputs target signals indicating the target torque which has been calculated to the corresponding drive motor controllers 52 and 54.

The deck-motor target-number-of-revolutions setting unit 190 stores in a storage unit and sets a target number of revolutions set in advance for the deck motors 42. The ECU 50 outputs a target signal indicating the target number of revolutions of the deck motor 42 to each deck motor controller 56 according to a signal indicating ON input from the deck switch 44. Additionally, the ECU 50 may be configured to include a deck motor target torque setting unit 191 instead of the deck-motor target-number-of-revolutions setting unit 190. The deck motor target torque setting unit 191 causes the storage unit to store the target torque, and outputs a target signal indicating the target torque of the deck motor 42 to each deck motor controller 56 according to the signal indicating ON input from the deck switch 44. The ECU 50 includes an overload processing unit 55, and this will be described later in detail.

Each of the drive motor controllers 52 and 54 (refer to FIG. 17 for 54) includes a driving inverter 262, which is a driver, and a driving control circuit 264 for controlling the driving inverter 262. In FIG. 16, of the left and right drive motor controllers 52 and 54, only the left drive motor controller 52 is representatively shown, but the configuration of the right drive motor controller 54 is the same. The driving control circuit 264 includes a CPU, a storage unit such as a memory, and the like, and a target signal is input from the ECU 50.

The driving control circuit 264 includes a motor control unit 266, and an overload determination unit 168. The motor control unit 266 controls the corresponding drive motor 26 or 28 by controlling the driving inverter 262 to cause the corresponding drive motor 26 or 28 to rotate at the target number of revolutions or the target torque indicated by a target signal in a case where the target signal is input from the ECU 50. The motor control unit 266 generates a control signal for driving with respect to the driving inverter 262 so as to make the actual number of revolutions or the actual torque detected or calculated closer to the target number of revolutions or the target torque by feedback control including PI control or PID control.

The overload determination unit 168 determines whether or not the corresponding drive motor 26 or 28 is overloaded based on the driving state of the corresponding drive motor 26 or 28, or based on the operation state of the drive motor controller 52 or 54 itself. In the case where the corresponding drive motor 26 or 28 is overloaded for a predetermined period of time set in advance or longer, the overload determination unit 168 outputs an overload determination signal OL1 to the ECU 50. The configuration of each driving control circuit 264, including the overload determination unit 168, will be described later in detail. Each of the drive motor controllers 52 and 54 is connected to the ECU 50 by a CAN communication line 178 shown in FIG. 17. Each of the drive motor controllers 52 and 54 may be configured to include an actual torque calculation unit 179. The actual torque calculation unit 179 calculates the actual torque of the corresponding drive motor 26 or 28 from a motor current input from a current sensor 196 described later and a rotational angle input from a rotational angle sensor 192, and outputs to the ECU 50 a signal indicating the actual torque which has been calculated.

Each deck motor controller 56 is a lower controller, and includes a deck inverter 172, which is a driver, and a deck control circuit 174 for controlling the deck inverter 172. The deck inverter 172 drives the deck motor 42. In FIG. 16, one of the three deck motor controllers 56 is shown, but the deck motor controllers 56 are all configured in the same manner.

The deck control circuit 174 includes a CPU, a storage unit such as a memory, and the like, and a target signal is input thereto from the ECU 50. The deck control circuit 174 includes a motor control unit 175, and an overload determination unit 176. The motor control unit 175 controls the corresponding deck motor 42 by controlling the deck inverter 172 to cause the corresponding deck motor 42 to rotate at the target number of revolutions or the target torque indicated by a target signal when a target signal is input from the ECU 50. Like the motor control unit 266, the motor control unit 175 generates a control signal for driving with respect to the deck inverter 172 so as to make the actual number of revolutions or the actual torque detected or calculated closer to the target number of revolutions or the target torque by feedback control.

The overload determination unit 176 determines whether or not the corresponding deck motor 42 is overloaded based on the driving state of the corresponding deck motor 42, or on the operation state of the deck motor controller 56 itself. In the case where the corresponding deck motor 42 is overloaded for a predetermined period of time set in advance or longer, the overload determination unit 176 outputs an overload determination signal OL2 to the ECU 50. Each deck motor controller 56 is connected to the ECU 50 by the CAN communication line 178 shown in FIG. 17. The configuration of each deck control circuit 174, including the overload determination unit 176, will be described later in detail. Additionally, each deck motor controller 56 may be configured to include an actual torque calculation unit 183. The actual torque calculation unit 183 calculates the actual torque of the corresponding deck motor 42 from a motor current input from a current sensor 202 described later and a rotational angle input from a rotational angle sensor 198, and outputs to the ECU 50 a signal indicating the actual torque which has been calculated.

The deck motor controller 56 may be provided integrally with the controller unit including the ECU 50 and the drive motor controller 52 or 54, or may be provided separately. Also, the motor controllers 52, 54, and 56 and the ECU 50 may be separately arranged on the mower vehicle 10. For example, the left and right drive motor controllers 52 and 54 may be arranged near the drive motors 26 and 28 on the corresponding sides.

Figure 17:
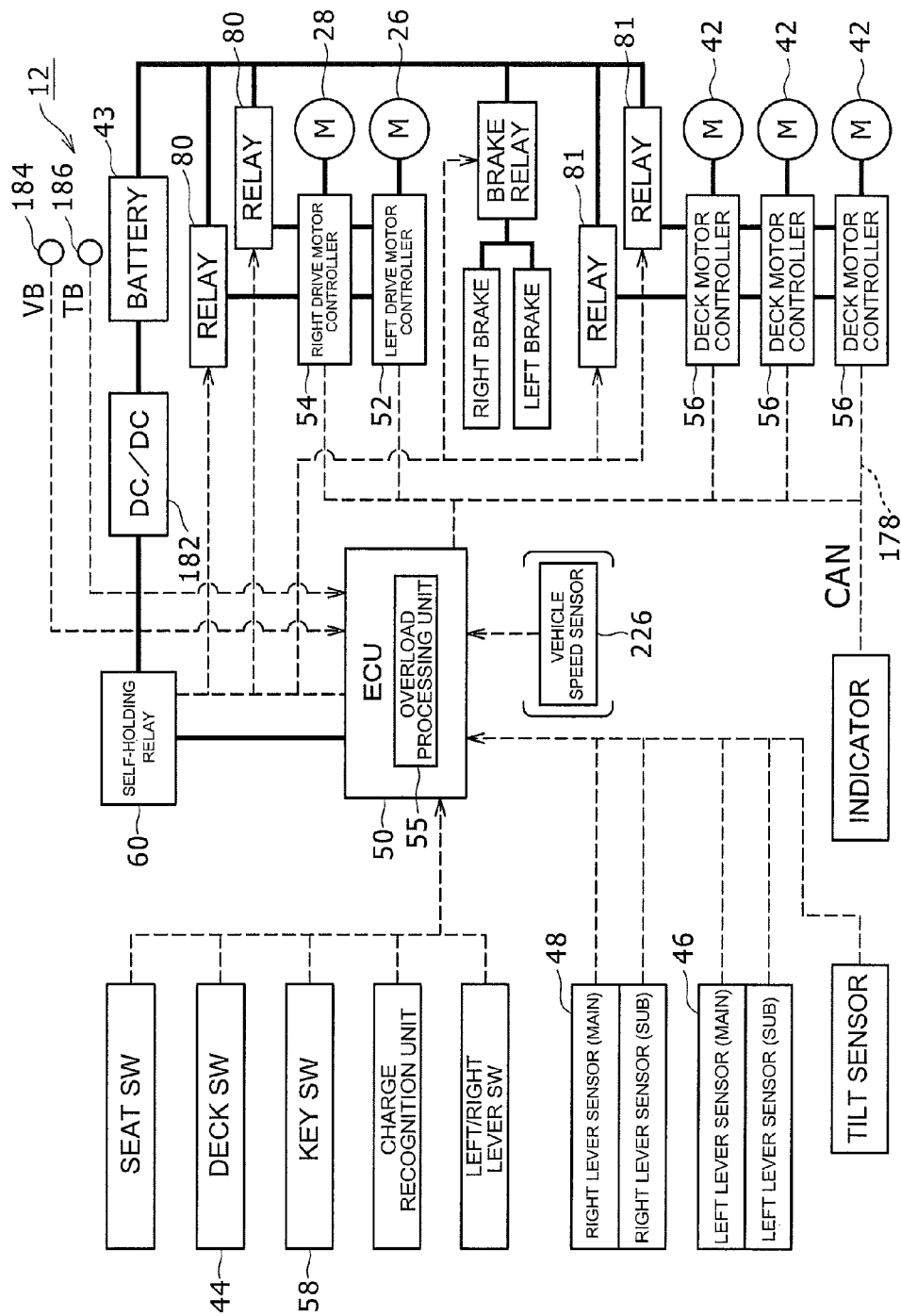
FIG. 17 is a block diagram showing an overall configuration of the control system shown in FIG. 15.

FIG. 17 is a block diagram showing the overall configuration of the motor control system 12 shown in FIG. 16. The configuration of relays 80 and 81, and the circuit configuration including the motor controllers 52 and 54 and the deck motor controllers 56 are the same as the configurations described by reference to FIG. 2 which has been described above. Also, as in the embodiment in FIG. 2, the left and right lever sensors 46 and 48 each include two sensors, and also, the ECU 50 is connected to the battery 43 via a DC/DC converter 182 and the self-holding relay 60.

A voltage sensor 184 is connected to the battery 43, detects output voltage VB of the battery 43, and transmits to the ECU 50 a signal indicating the output voltage VB which has been detected. A temperature sensor 186 detects temperature TB of the battery 43, and transmits to the ECU 50 a signal indicating the temperature TB which has been detected.

Returning to FIG. 16, the rotational angle sensor 192 is configured from a resolver or the like, detects the rotational angle of the drive motor 26, and transmits to the drive motor controller 52 a signal indicating the rotational angle which has been detected. A temperature sensor 194 detects temperature Tm1 of the drive motor 26, and transmits to the drive motor controller 52 a signal indicating the detected temperature Tm1. A temperature sensor 195 detects temperature Tc1 of the drive motor controller 52, and transmits a signal indicating the detected temperature Tc1 to the drive motor controller 52. The current sensor 196 detects motor current input to a stator coil of the drive motor 26, and transmits to the drive motor controller 52 a signal indicating the motor current which has been detected. The current sensor 196 detects motor current flowing through two phases of the stator coil of the drive motor 26, for example, and transmits to the drive motor controller 52 a signal indicating the motor current which has been detected. The motor current flowing through the remaining one phase of the stator coil may be calculated from the detection values of the motor current of the two phases, but the motor current of all of the three phases may also be detected by the current sensor 196. The current sensor 196 may also detect the motor current of only one of the phases. The rotational angle sensor, the temperature sensor, and the current sensor connected to the right drive motor controller 54 are omitted from the drawings, but the same can be said for these.

Likewise, the rotational angle sensor 198 is configured from a resolver or the like, detects the rotational angle of the deck motor 42, and transmits to the deck motor controller 56 a signal indicating the rotational angle which has been detected. A temperature sensor 200 detects temperature Tm2 of the deck motor 42, and transmits a signal indicating the detected temperature Tm2 to the deck motor controller 56. A temperature sensor 201 detects temperature Tc2 of the deck motor controller 56, and transmits a signal indicating the detected temperature Tc2 to the deck motor controller 56. The current sensor 202 detects motor current input to a stator coil of the deck motor 42, and transmits to the deck motor controller 56 a signal indicating the motor current which has been detected. The rotational angle sensor, the temperature sensor, and the current sensor connected to the other two deck motor controllers 56, among the deck motor controllers 56, are omitted from the drawings, but the same can be said for these.

Next, the overload determination units 168 and 176 of the drive motor controllers 52 and 54 and the deck motor controllers 56, and the overload processing unit 55 of the ECU 50 will be described. Each of the overload determination units 168 and 176 determines whether or not the corresponding drive motor 26 or 28 or the corresponding deck motor 42 is overloaded based on:

(1) the difference between the target number of revolutions and the actual number of revolutions of the corresponding drive motor 26 or 28 or the corresponding deck motor 42, (2) the time integrated value of motor current input to the corresponding drive motor 26 or 28 or the corresponding deck motor 42, (3) the target torque or the actual torque of the corresponding drive motor 26 or 28 or the corresponding deck motor 42, (4) the temperature of the corresponding drive motor 26 or 28 or the corresponding deck motor 42, and (5) the temperature of the corresponding motor controller 52, 54, or 56 itself (1) to (4) correspond to the driving state of the corresponding drive motor 26 or 28 or the corresponding deck motor 42, and (5) corresponds to the operation state of the motor controller 52, 54, or 56 itself.

When it is determined that the corresponding drive motor 26 or 28 or the corresponding deck motor 42 is overloaded for a predetermined period of time set in advance or longer, the driving control circuit 264 or the deck control circuit 174 outputs an overload determination signal OL1 or OL2 to the ECU 50. In the following, the overload determination signals OL1 and OL2 may be referred to simply as the signals OL1 and OL2.

For example, a case will be described where the driving control circuit 264 or the deck control circuit 174 determines whether or not the corresponding drive motor 26 or 28 or the deck motor 42 is overloaded based on at least one of (1), (2), and (4). The driving control circuit 264 includes a target/actual number-of-revolutions difference calculation unit 204, and a current integration unit 206. The target/actual number-of-revolutions difference calculation unit 204 calculates a motor actual number of revolutions Nb1 from a detection value of the rotational angle of the drive motor 26 or 28 received from the rotational angle sensor 192, and calculates a target/actual number of revolutions difference Nd1 (=Na1−Nb1) by subtracting the actual number of revolutions Nb1 which has been calculated from a target number of revolutions Na1 of the corresponding drive motor 26 or 28 received from the ECU 50. The current integration unit 206 temporally integrates the detection values of the motor current of any one phase received from the current sensor 196 over a predetermined period of time set in advance.

The overload determination unit 168 receives the target/actual number of revolutions difference Nd1 from the target/actual number-of-revolutions difference calculation unit 204, determines whether or not the target/actual number of revolutions difference Nd1 is at or above a threshold α1 set in advance, determines the state of being overloaded in a case where the target/actual number of revolutions difference Nd1 is determined to be at or above the threshold α1, and outputs the signal OL1 as an abnormality occurrence detection signal to the ECU 50 in a case where the state of being overloaded has continued for a predetermined period of time set in advance or longer.

The overload determination unit 168 receives the time integrated value of motor current from the current integration unit 206, determines whether or not the time integrated value of the motor current of the corresponding drive motor 26 or 28 is at or above a threshold integrated value set in advance, determines the state of being overloaded in a case where the time integrated value is determined to be at or above the threshold integrated value, and outputs the signal OL1 to the ECU 50 in a case where the state of being overloaded has continued for a predetermined period of time set in advance or longer. The threshold integrated value may be set to change based on the relationship with the motor actual number of revolutions Nb1. In this case, a small threshold integrated value is set where the motor actual number of revolutions Nb1 is low, and the state of being overloaded is determined when the time integrated value of motor current is at or above the threshold integrated value.

The overload determination unit 168 receives the detected temperature Tm1 of the corresponding drive motor 26 or 28 from the temperature sensor 194, determines whether or not the detected temperature Tm1 is at or above a threshold temperature set in advance, determines the state of being overloaded in a case where the detected temperature Tm1 is determined to be at or above the threshold temperature, and outputs the signal OL1 to the ECU 50 in a case where the state of being overloaded has continued for a predetermined period of time set in advance or longer.

The overload determination unit 168 receives the detected temperature Tc1 of the drive motor controller 52 or 54 itself from the temperature sensor 195, determines whether or not the detected temperature Tc1 is at or above a threshold temperature set in advance, determines the state of being overloaded in a case where the detected temperature Tc1 is determined to be at or above the threshold temperature, and outputs the signal OL1 to the ECU 50 in a case where the state of being overloaded has continued for a predetermined period of time set in advance or longer.

Like the driving control circuit 264, the deck control circuit 174 includes a target/actual number-of-revolutions difference calculation unit 208, a current integration unit 210, and the overload determination unit 176 described above. The functions of the target/actual number-of-revolutions difference calculation unit 208, the current integration unit 210, and the overload determination unit 176 are the same as those of the target-actual number-of-revolutions difference calculation unit 204, the current integration unit 206, and the overload determination unit 168 of the driving control circuit 264, except that the target motor is the deck motor 42. The overload determination unit 176 outputs the signal OL2 to the ECU 50 in a case where the state of being overloaded is determined to have continued for a predetermined period of time or longer.

The overload processing unit 55 of the ECU 50 performs an overload handling process set in advance in a case where the signal OL1 or OL2 is input from at least one of the motor controllers 52, 54, and 56. In this case, as the overload handling process, the ECU 50 selects at least one of the motor controllers 52, 54, and 56 which are processing targets, and changes the target number of revolutions or the target torque of the corresponding motor 26, 28, or 42 which has been calculated or set, with respect to the motor controller 52, 54, or 56 which has been selected. For example, in the case where the signal OL2 is input from at least one deck motor controller 56, and the deck motor 42 is overloaded, the overload processing unit 55 changes the target numbers of revolutions or the target torque in such a way that each of the drive motors 26 and 28 is decelerated as compared with the case of normal control. For example, the target numbers of revolutions or the target torque is changed in such a way that the left and right drive motors 26 and 28 are decelerated by a predetermined rate or by a predetermined number of revolutions set in advance with respect to the target numbers of revolutions of the left and right drive motors 26 and 28 calculated at a time of normal control, which is when there is no overload, according to the detected lever positions transmitted to the ECU 50 from the left and right lever sensors 46 and 48.

Moreover, the overload processing unit 55 changes the target number of revolutions in such a way as to stop all the deck motors 42, in a case where the overloading of the deck motors 42 has continued for a predetermined period of time set in advance or longer after the deceleration of the left and right drive motors 26 and 28.

Functions of the ECU 50 may be realized by software by means of the execution of stored programs or the like, or a part or all of the functions may be realized by hardware.

Figure 18:
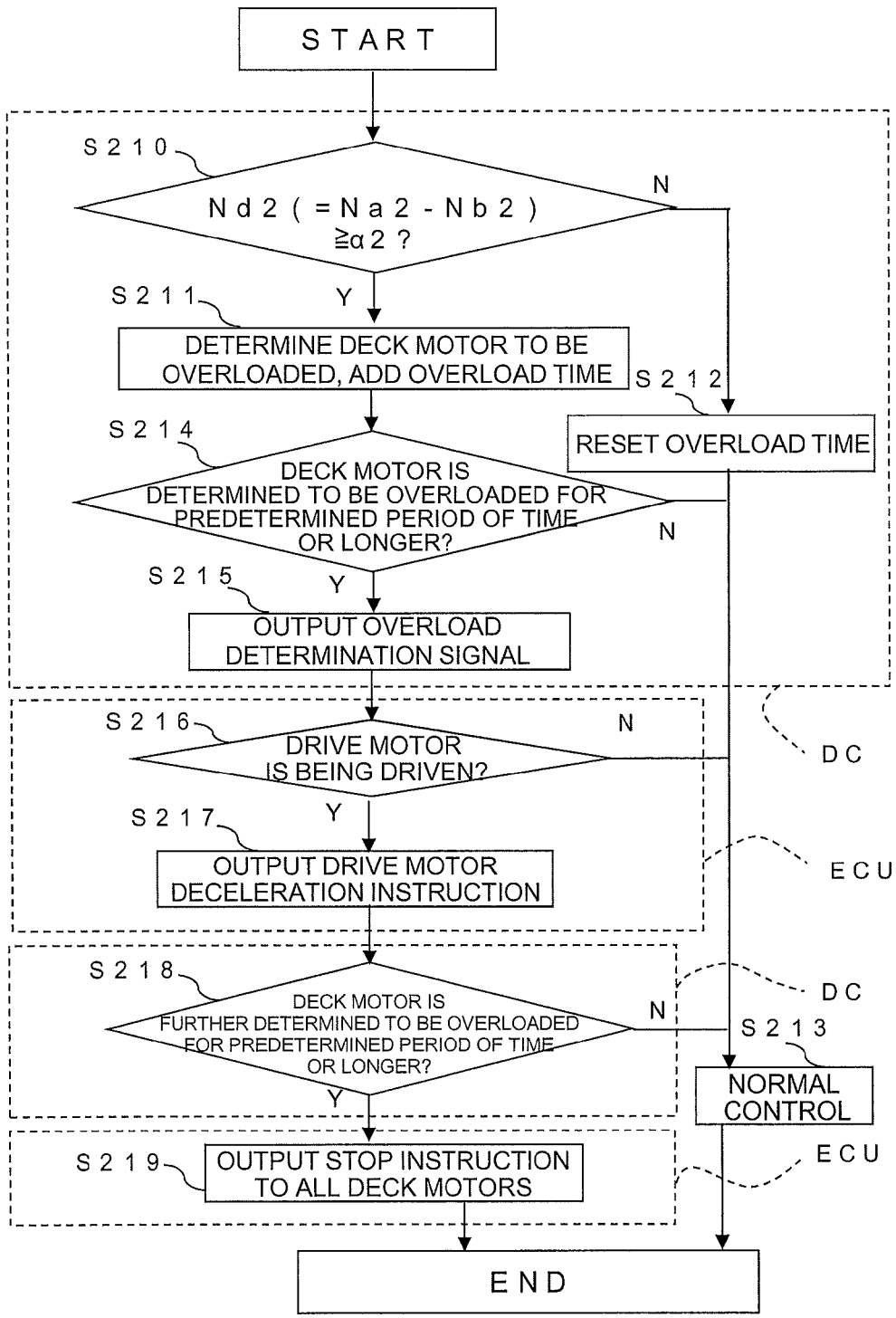
FIG. 18 is a flow chart showing one example of a method of controlling a drive motor and a deck motor which is an auxiliary motor, by using the control system of the embodiment.

The control system 12 described above controls each of the drive motors 26 and 28 and each of the deck motors 42 by a control method shown in FIG. 18. FIG. 18 is a flow chart showing one example of a method of controlling the drive motors 26 and 28 and the deck motor 42 by using the control system 12. In S210, each deck motor controller 56 calculates, by the target/actual number-of-revolutions difference calculation unit 208, a target/actual number of revolutions difference Nd2 (=Na2−Nb2), which is a difference between a target number of revolutions Na2 and the actual number of revolutions Nb2 of the deck motor 42, and determines, by the overload determination unit 176, whether or not the target/actual number of revolutions difference Nd2 is at or above a threshold α2 set in advance. In the case where the target/actual number of revolutions difference Nd2 is determined to be at or above the threshold α2, the overload determination unit 176 determines in S211 that the deck motor 42 which is the control target is overloaded, adds a set time TB set in advance to an overload time TL, stores the value in a storage unit of the deck motor controller 56, and moves on to S214. The overload time TL is initially a reset value, and is zero. In the case where the target/actual number of revolutions difference Nd2 is determined in S210 to be not at or above the threshold α2, the overload time TL is reset (S212) and becomes zero, and normal control is performed (S213).

In S214, whether or not the overload time TL stored in the storage unit has reached or exceeded a predetermined period of time set in advance is determined by the overload determination unit 176, and if it is determined that the overload time TL is the predetermined period of time or longer, the deck motor 42 is determined to be overloaded continuously for the predetermined period of time, and the deck motor controller 56 outputs a signal OL2 to the ECU 50 in S215. In this case, the overload handling process is performed by the overload processing unit 55. In this case, if the target number of revolutions of at least one of the left and right drive motors 26 and 28 is determined to be not zero in S216; that is, if at least one of the drive motors 26 and 28 is determined to be being driven in S216, the overload processing unit 55 outputs a deceleration instruction to the drive motor controller 52 or 54 in S217 so as to decelerate the drive motor 26 or 28 that is being driven. Specifically, the target number of revolutions of the drive motor 26 or 28 is reduced as compared with the case of normal control, and a signal indicating the target number of revolutions is output to the drive motor controller 52 or 54.

On the other hand, in the case where the determination result of S216 is negative, normal control is performed in S213. If, after the drive motor 26 or 28 is decelerated in S217, the deck motor 42 is further determined to be overloaded for the predetermined period of time or longer (S218) by the same processes as in S210 to S215, a stop instruction is output in S219 to each deck motor controller 56 to stop all the deck motors 42. Specifically, the target number of revolutions indicated by a signal to be output to the deck motor controller 56 is made zero. In the case where the determination result of S218 is negative, normal control is performed in S213.

In FIG. 18, the processes to be performed by the ECU 50 and the deck motor controller 56 are indicated by broken line frames ECU and DC, respectively. The same applies to the following drawings. Additionally, in the following drawings, the process to be performed by the motor controllers 52 and 54 may be indicated by a broken line frame RC.

According to the motor control system 12 of the mower vehicle 10 described above, the drive motors 26 and 28 are decelerated when at least one deck motor 42 is overloaded for a predetermined period of time or longer, and thus, current supplied to the deck motor 42 from the battery 43 does not become insufficient, and the overload is swiftly alleviated or eliminated and the deck motor 42 may be protected.

Figure 19:
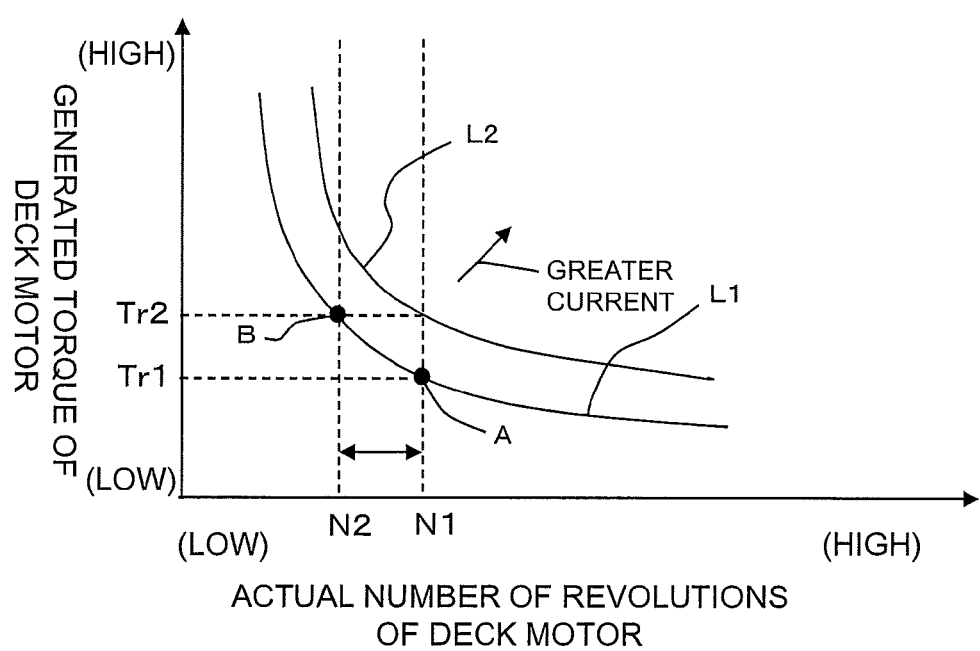
FIG. 19 is a diagram showing a relationship between an actual number of revolutions and generated torque, for describing the reason for reduction in the actual number of revolutions caused by an increase in the load on a deck motor.

FIG. 19 is a diagram showing a relationship between the actual number of revolutions and generated torque, and for describing the reason for reduction in the actual number of revolutions caused by an increase in the load on the deck motor 42. According to the configuration described above, the drive motors 26 and 28, and the deck motor 42 are connected to the battery 43 in parallel. In this case, the load applied on the deck motor 42 may become high in a case where the motors 26, 28, and 42 are being driven, and the mower 25 is being driven in a state where the lawn is excessively compacted or where it is raining, for example. In this case, since the relationship between the actual number of revolutions of the deck motor 42 and the generated torque changes along an equal current curve L1 as shown in FIG. 19, the actual number of revolutions may be reduced from N1 to N2 along with the change from a point A in normal times to a point B.

If the drive motors 26 and 28 connected to the same battery 43 are decelerated in this case, the current flowing through the deck motor 42 increases, and the equal current curve changes from L1 to L2. Thus, even if the same load as at the point B is applied on the deck motor 42, the actual number of revolutions may be increased from N2 to N1, and the overload on the deck motor 42 may be eliminated.

Figure 20:
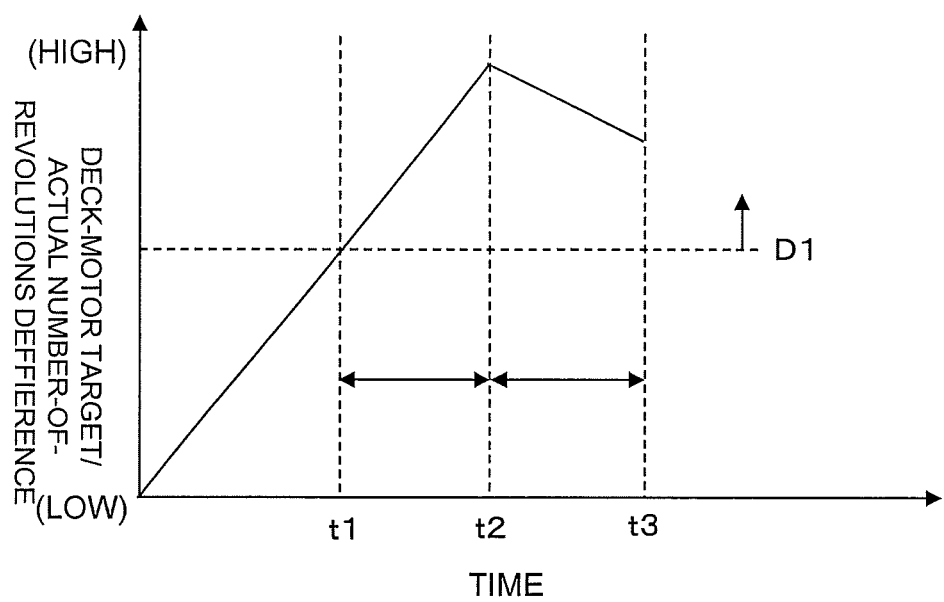
FIG. 20 is a diagram showing one example of change over time of a target/actual number of revolutions difference, which is a difference between a target number of revolutions and an actual number of revolutions of a deck motor, in a case where the deck motor becomes overloaded in midcourse.

FIG. 20 is a diagram showing one example of change over time of the target/actual number of revolutions difference Nd2, which is a difference between the target number of revolutions Na2 and the actual number of revolutions Nb2 of the deck motor 42, in a case where the deck motor 42 becomes overloaded in the mid-course in the present embodiment. FIG. 20 shows a case where the deck motor 42 becomes overloaded, and the target/actual number of revolutions difference Nd2 gradually becomes greater. In this case, if the target/actual number of revolutions difference Nd2 reaches or exceeds a threshold D1 at time t1, the deck motor controller 56 determines that the deck motor 42 is overloaded. Then, if the overloaded state of the deck motor 42 continues until time t2, and the overload time TL reaches or exceeds a predetermined period of time T1 (=t2−t1) set in advance, the deck motor controller 56 outputs the signal OL2 to the ECU 50. The ECU 50 outputs deceleration instructions for the drive motors 26 and 28 to the drive motor controllers 52 and 54 by way of the overload processing unit 55, and decelerates the drive motors 26 and 28. The overloading of the deck motor 42 is thereby alleviated, and the target/actual number of revolutions difference Nd2 of the deck motor 42 gradually becomes smaller.

When the overload time TL of the deck motor 42 is added by the amount of the predetermined period of time T2 (=t3−t2) set in advance after the deceleration of the drive motors 26 and 28, the deck motor 42 is stopped at time t3, and the deck motor 42 is protected from being overloaded. Additionally, the predetermined period of time T1 may be the same as or different from the predetermined period of time T2.

Figure 21:
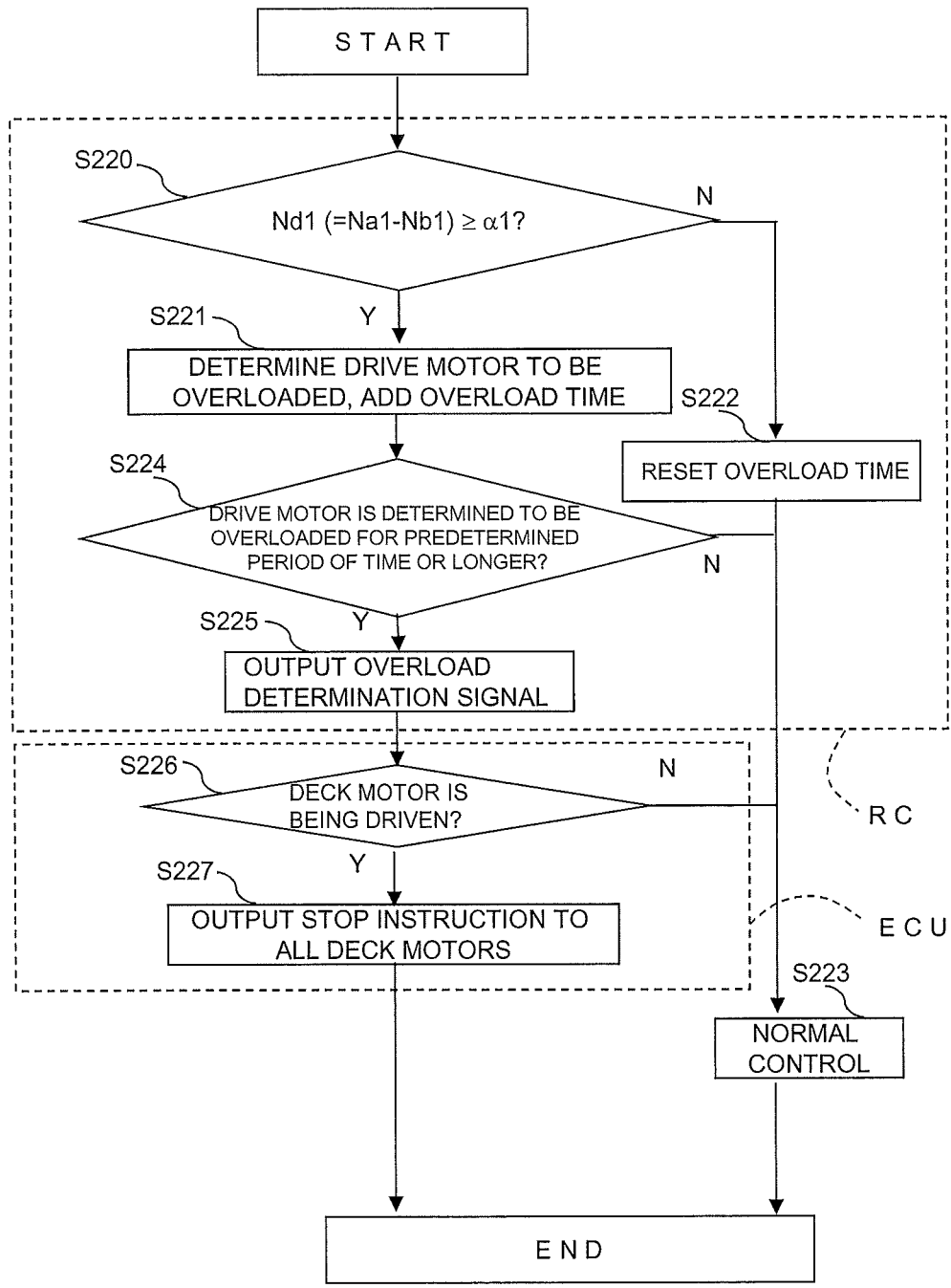
FIG. 21 is a flow chart showing a method of controlling a deck motor according to the embodiment.

FIG. 21 is a flow chart showing a method of controlling the deck motor 42 in the present embodiment. Unlike the case in FIG. 18, with the control method in FIG. 21, the advantage is to alleviate or eliminate the overload on the drive motors 26 and 28. The basic configurations for performing control in FIG. 21, FIGS. 22 to 26, and FIGS. 29 to 31 described later, and the basic configurations in FIGS. 27 and 32 described later are the same as the configurations shown in FIGS. 15 to 17. According to the configuration for performing the control in FIG. 21, the overload processing unit 55 has the signal OL1 input thereto from at least one of the drive motor controllers 52 and 54, and stops all the deck motors 42 as the overload handling process in a case where the corresponding drive motor 26 or 28 is overloaded. Additionally, in the following, a case where the drive motor 26 (or 28) is overloaded will be described as a case where the left drive motor 26 is overloaded, for the sake of simplicity of description.

According to the configuration described above, in the case of controlling the deck motors 42, each of the drive motor controllers 52 and 54 calculates, in S220 in FIG. 21, by means of the target-actual number-of-revolutions difference calculation unit 204, a target/actual number of revolutions difference Nd1 (=Na1−Nb1), which is the difference between a target number of revolutions Na1 and an actual number of revolutions Nb1 of the corresponding drive motor 26 or 28, and determines, by means of the overload determination unit 168, whether or not the target/actual number of revolutions difference Nd1 is at or above a threshold α1 set in advance. In the case where the target/actual number of revolutions difference Nd1 is determined to be at or above the threshold α1, the overload determination unit 168 determines in S221 that the drive motor 26 which is the control target is overloaded, adds a set time TB set in advance to an overload time TL, stores the value in a storage unit of the drive motor controller 52, and moves on to S224. In the case where the target/actual number of revolutions difference Nd1 is determined in S220 to be not at or above the threshold α1, the overload time TL is reset (S222), and normal control is performed (S223).

In S224, whether or not the overload time TL stored in the storage unit has reached or exceeded a predetermined period of time set in advance is determined by the overload determination unit 168, and if it is determined that the overload time TL is the predetermined period of time or longer, the drive motor 26 is determined to be overloaded continuously for the predetermined period of time, and the drive motor controller 52 outputs a signal OL1 to the ECU 50 in S225. In this case, the overload handling process is performed by the overload processing unit 55. In this case, the overload processing unit 55 determines in S226 whether or not the deck motors 42 are being driven, and in the case where the deck motors 42 are being driven, the overload processing unit 55 outputs a stop instruction to the deck motor controllers 56 in S227 so as to stop all the deck motors 42. On the other hand, in the case where the determination result of S226 is negative, normal control is performed in S223.

According to the configuration described above, the deck motors 42 are stopped when at least one of the drive motors 26 and 28 is overloaded for a predetermined period of time or longer, and thus, current supplied to the drive motors 26 and 28 from the battery 43 does not become insufficient, and the overload is swiftly alleviated or eliminated and the drive motors 26 and 28 may be protected.

In the examples of FIGS. 18 and 21, cases have been described where the overload determination is performed based on the target/actual number of revolutions difference Nd2 or Nd1 of the deck motors 42 or the drive motors 26 and 28, but the overload determination may be performed based on at least one of (1) to (5) described above, and the signal OL1 or OL2 may be output to the ECU 50 from the deck motor controller 56 or the drive motor controller 52 or 54 in a case where there is overload for a predetermined period of time set in advance or longer.

Figure 22:
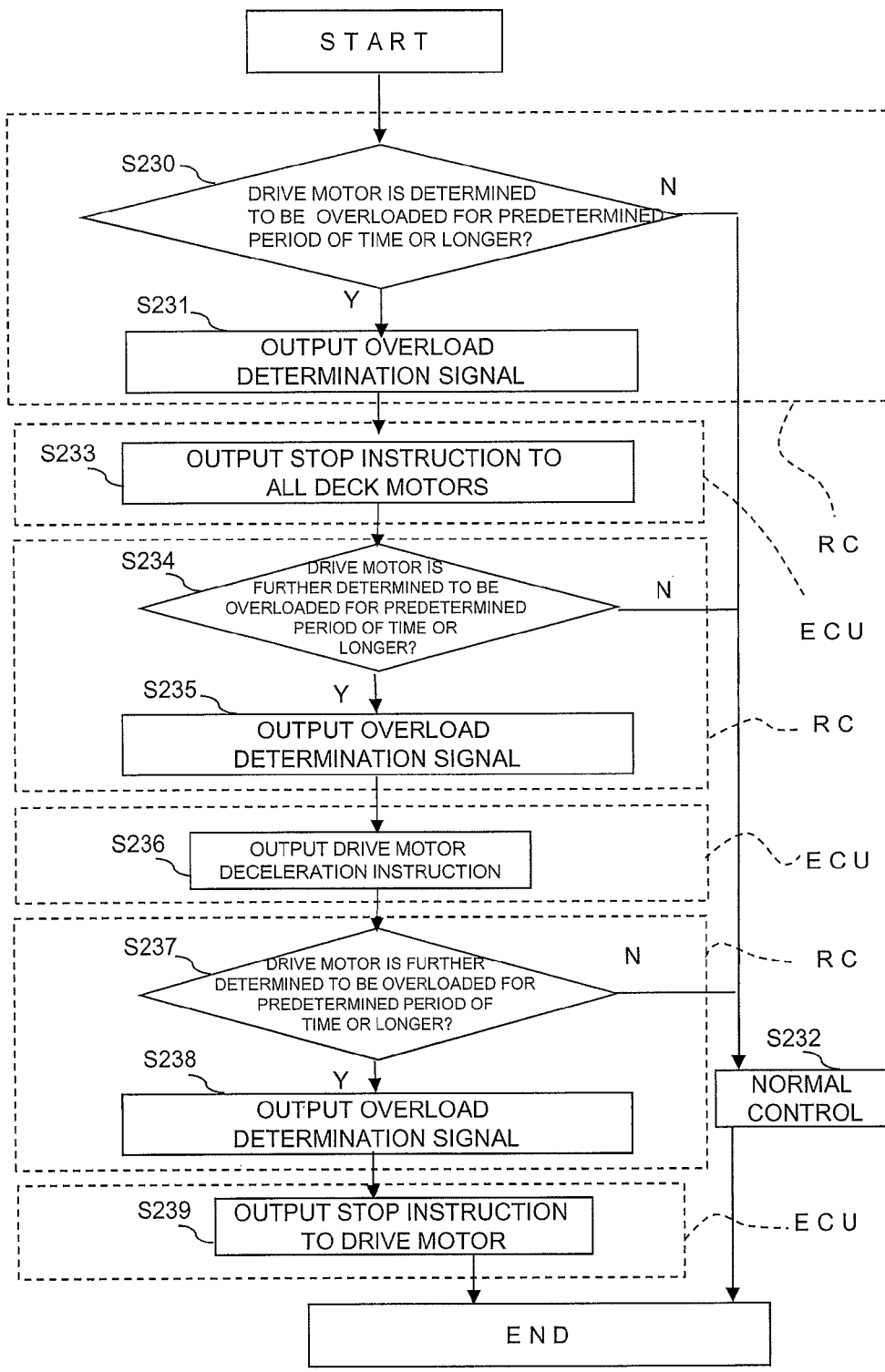
FIG. 22 is a flow chart showing a method of controlling a deck motor and a drive motor according to the embodiment.

FIG. 22 is a flow chart showing a method of controlling the deck motors 42 and the drive motors 26 and 28 according to the embodiment. According to the configuration for performing the control in FIG. 22, in the case where the signal OL1 is input from the drive motor controller 52, and the corresponding drive motor 26 is overloaded, the overload processing unit 55 stops all the deck motors 42, as the overload handling process, and then, in the case where there is further occurrence of overload, performs a first step and a second step. The first step is a step of decelerating each of the drive motors 26 and 28 as compared with the case of normal control in the case where, after the deck motors 42 have been stopped, the overloading of the drive motor 26 has continued for a predetermined period of time set in advance or longer. The second step is a step of stopping each of the drive motors 26 and 28 in the case where, after the drive motors 26 and 28 have been decelerated, the overloading of the drive motor 26 has continued for a predetermined period of time set in advance or longer.

In the case of controlling the deck motors 42 and the drive motors 26 and 28 by the configuration described above, when the drive motor controller 52 determines, in S230 in FIG. 22, by means of the overload determination unit 168, that the drive motor 26 which is the control target is overloaded, and an overload time TL is determined to be a predetermined period of time or longer, the process proceeds to S231. In S231, the drive motor controller 52 outputs the signal OL1 to the ECU 50. In this case, the overload handling process is performed by the overload processing unit 55. In this case, the overload processing unit 55 outputs a stop instruction to the deck motor controllers 56 in S233 so as to stop all the deck motors 42. On the other hand, in the case where the determination result of S230 is negative, normal control is performed in S232.

When the overloading of the drive motor 26 is determined in S234 to have further continued for a predetermined period of time or longer after all the deck motors 42 have been stopped, the drive motor controller 52 further outputs the signal OL1 to the ECU 50 (S235). In this case, the overload processing unit 55 outputs in S236, as the overload handling process, a deceleration instruction to each of the drive motor controllers 52 and 54 so as to decelerate each of the drive motors 26 and 28 as compared with the case of normal control. Then, when the overloading of the drive motor 26 is determined in S237 to have further continued for a predetermined period of time or longer, the drive motor controller 52 further outputs the signal OL1 to the ECU 50 (S238). In this case, the overload processing unit 55 outputs in S239 a stop instruction to each of the drive motor controllers 52 and 54 so as to stop each of the drive motors 26 and 28. On the other hand, in the case where the determination results of S234 and S237 are negative, normal control is performed in S232.

Also with the configuration described above, the overloading of the drive motors 26 and 28 is swiftly alleviated or eliminated, and the drive motors 26 and 28 may be protected.

Figure 23:
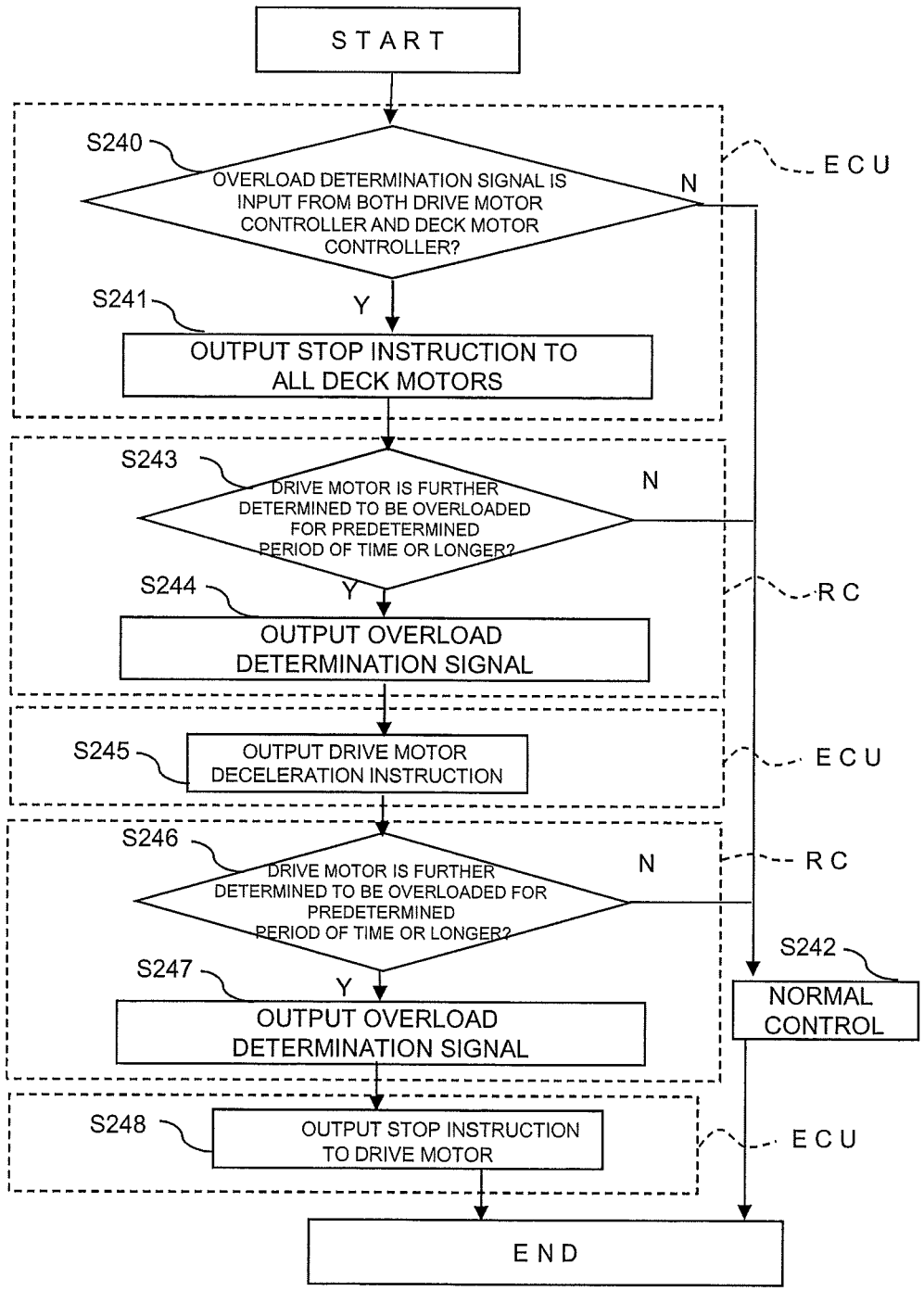
FIG. 23 is a flow chart showing another example of the method of controlling a deck motor and a drive motor according to the embodiment.

With the control methods of FIG. 23 and FIGS. 24 and 25 described later, the advantages are to alleviate or eliminate the overload on the deck motors 42 and the drive motors 26 and 28. FIG. 23 is a flow chart showing another example of the method of controlling the deck motors 42 and the drive motors 26 and 28 according to the embodiment. According to the configuration for performing the control in FIG. 23, the overload processing unit 55 has input thereto the signals OL1 and OL2 from the drive motor controller 52 and the deck motor controller 56, and in the case where the corresponding drive motor 26 and the deck motor 42 are overloaded, performs first through third steps as the overload handling process. The first step is a step of stopping all the deck motors 42. The second step is a step of decelerating each of the drive motors 26 and 28 as compared with the case of normal control in a case where, after the deck motors 42 have been stopped, the overloading of the drive motor 26 has continued for a predetermined period of time set in advance or longer. The third step is a step of stopping each of the drive motors 26 and 28 in a case where, after each of the drive motors 26 and 28 has been decelerated, the overloading of the drive motor 26 has continued for a predetermined period of time set in advance or longer.

In the case of controlling the deck motors 42 and the drive motors 26 and 28 by the configuration described above, the drive motor controller 52 or 54 outputs the signal OL1 to the ECU 50 in the case of determining in a step before S240 in FIG. 23, by means of the overload determination unit 168, that the drive motor 26 or 28 which is the control target is overloaded, and that the overload time is a predetermined period of time or longer. Also, the deck motor controller 56 outputs the signal OL2 to the ECU 50 in the case where the deck motor 42 is determined by means of the overload determination unit 176 to be overloaded, and the overload time is a predetermined period of time. In the following, a case where the drive motor 26 becomes overloaded will be described. In S240, the overload processing unit 55 determines whether the signals OL1 and OL2 have been input from the drive motor controller 52 and at least one of the deck motor controllers 56. In the case of determining that both the signal OL1 and the signal OL2 have been input to the ECU 50, the overload processing unit 55 performs the overload handling process. In this case, the overload processing unit 55 outputs a stop instruction to the deck motor controllers 56 in S241 so as to stop all the deck motors 42. On the other hand, in the case where the determination result of S240 is negative, normal control is performed in S242.

When the overloading of the drive motor 26 is determined in S243 to have further continued for a predetermined period of time or longer after all the deck motors 42 have been stopped, the drive motor controller 52 further outputs the signal OL1 to the ECU 50 (S244). The processes from S243 to S248 are the same as the processes from S234 to S239 shown in FIG. 22 described above.

The overload processing unit 55 may be configured to select which overload handling process of those in FIG. 18, FIG. 21 or 22, and FIG. 23 to be performed based on the input state of the signal OL1 and OL2, and to perform the selected process. The overload processing unit 55 may also be configured to include the function of performing only one of the overload handling processes in FIG. 18, FIG. 21 or 22, and FIG. 23.

Figure 24:
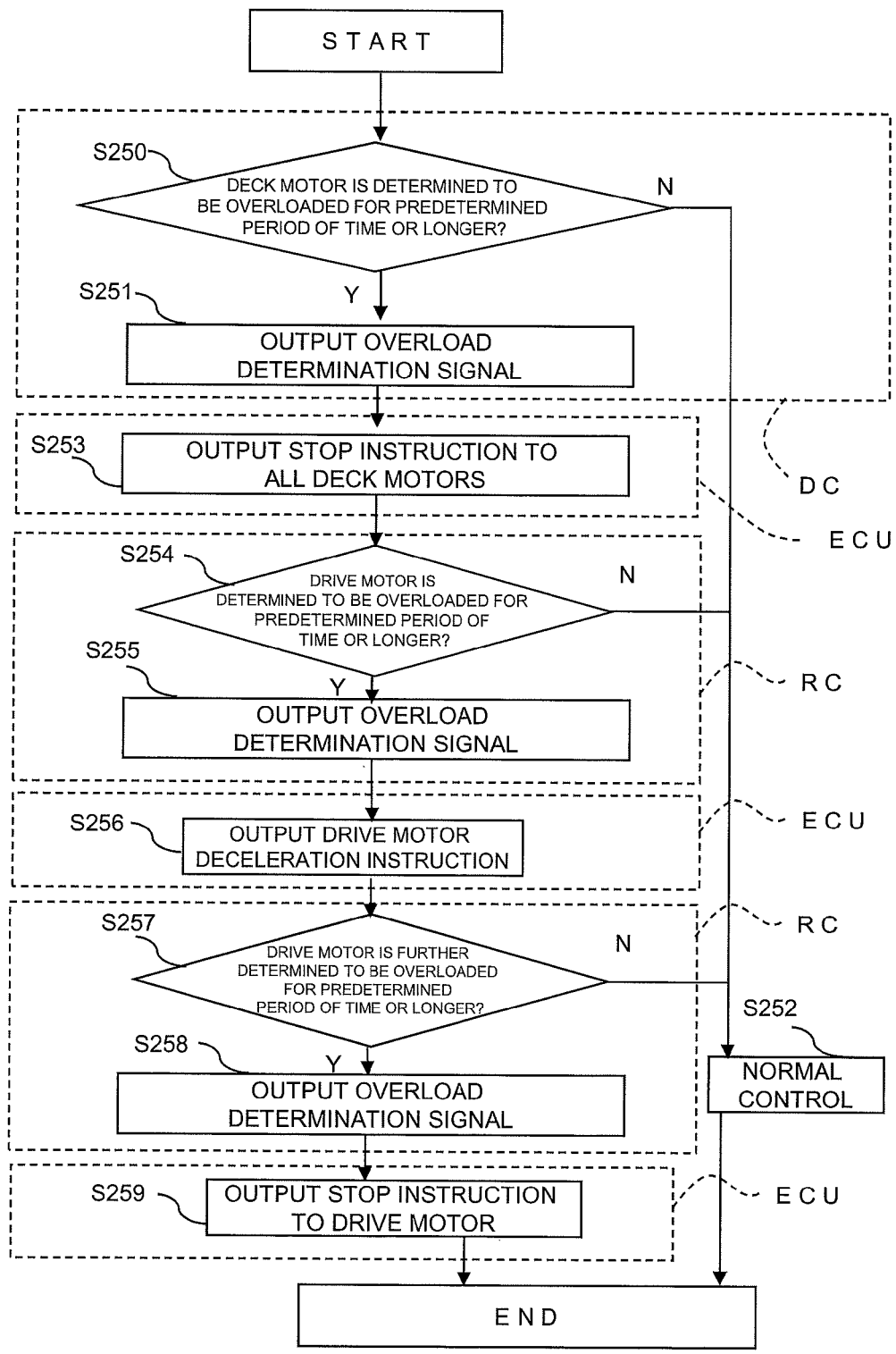
FIG. 24 is a flow chart showing another second example of the method of controlling a deck motor and a drive motor according to the embodiment.

FIG. 24 is a flow chart showing another, second example of the method of controlling the deck motors 42 and the drive motors 26 and 28 according to the embodiment. According to the configuration for performing the control in FIG. 24, the overload processing unit 55 performs first through third steps as the overload handling process in the case where the signal OL2 is input from the deck motor controller 56. The first step is a step of stopping all the deck motors 42. The second step is a step of decelerating each of the drive motors 26 and 28 as compared with the case of normal control in a case where, after the deck motors 42 have been stopped, the overloading of the drive motor 26 has continued for a predetermined period of time set in advance or longer. The third step is a step of stopping each of the drive motors 26 and 28 in a case where, after each of the drive motors 26 and 28 has been decelerated, the overloading of the drive motor 26 has continued for a predetermined period of time set in advance or longer.

In the case of controlling the deck motors 42 and the drive motors 26 and 28 by the configuration described above, if at least one deck motor controller 56 determines in S250 in FIG. 24, by means of the overload determination unit 176, that the deck motor 42 is overloaded, and the overload time is determined to be a predetermined period of time or longer, the process proceeds to S251. In S251, the deck motor controller 56 outputs the signal OL2 to the ECU 50. The overload processing unit 55 performs the overload handling process in the case where the signal OL2 is input to the ECU 50. In this case, the overload processing unit 55 outputs a stop instruction to the deck motor controllers 56 in S253 so as to stop all the deck motors 42. On the other hand, in the case where the determination result of S250 is negative, normal control is performed in S252.

When the overloading of the drive motor 26 is determined in S254 to have continued for a predetermined period of time or longer, after all the deck motors 42 have stopped, the drive motor controller 52 outputs the signal OL1 to the ECU 50 (S255). The processes from S254 to S259 are the same as the processes of S234 to S239 shown in FIG. 22 described above.

Figure 25:
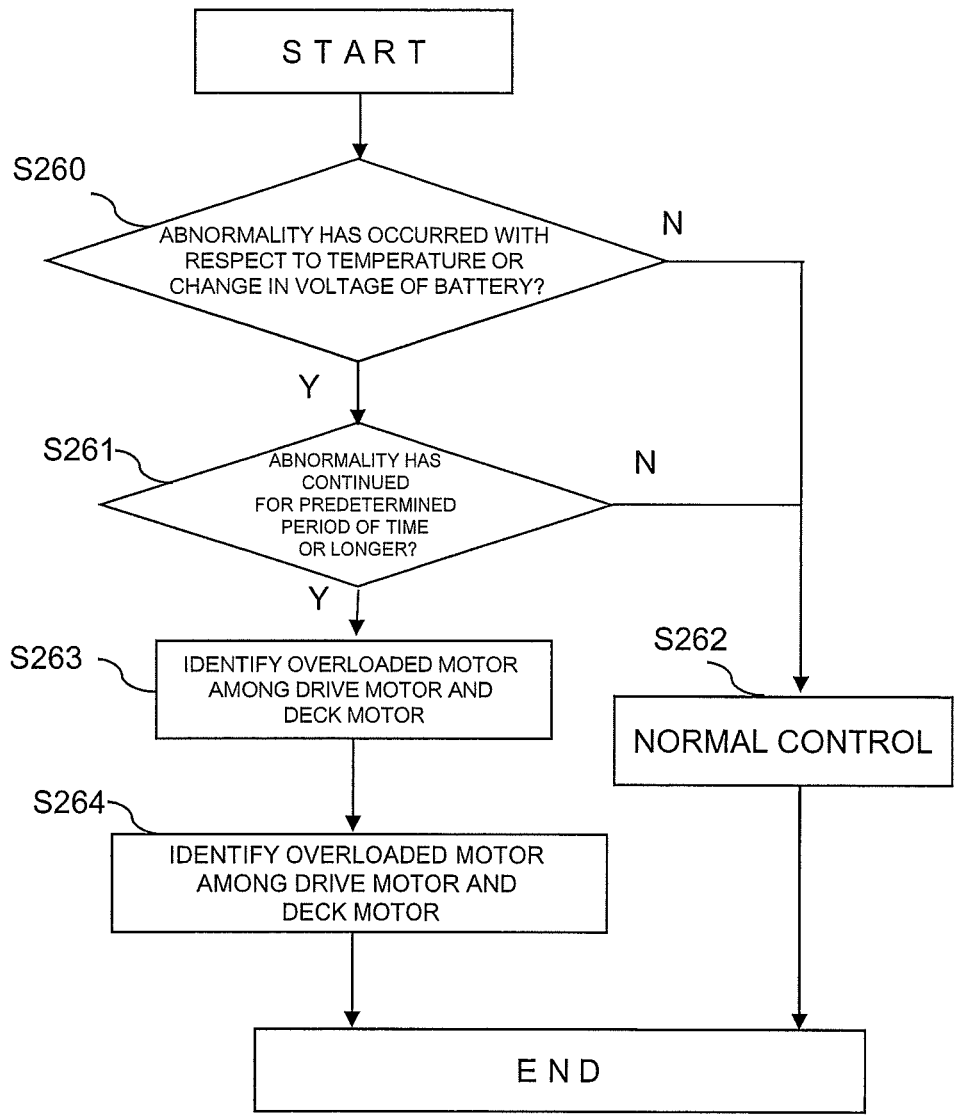
FIG. 25 is a flow chart showing another third example of the method of controlling a deck motor and a drive motor according to the embodiment.

FIG. 25 is a flow chart showing another, third example of the method of controlling the deck motors 42 and the drive motors 26 and 28 according to the embodiment. According to the configuration for performing the control in FIG. 25, the ECU 50 includes an abnormality determination unit 212 shown in FIG. 16. The abnormality determination unit 212 monitors at least one of the temperature and a change in voltage of the battery 43, and determines whether or not there is an abnormality. For example, the ECU 50 acquires detected temperature Tb of the battery 43 by a signal transmitted from the temperature sensor 186. Also, the ECU 50 acquires detected voltage VB of the battery 43 by a signal transmitted from the voltage sensor 184. In a case where the detected temperature Tb of the battery 43 is at or above a predetermined temperature, or where a change in voltage of the battery 43, which is a range of change or time rate of change of the detected voltage VB in a predetermined period of time, is at or above a predetermined value, the abnormality determination unit 212 determines that there is an abnormality in the battery 43.

In the case of determining that the abnormality of the battery 43 has continued for a predetermined period of time or longer, the overload processing unit 55 identifies which of the drive motors 26 and 28 and the deck motors 42 is overloaded, and performs an overload handling process according to the overloaded motor, which is the overloaded drive motor 26 or 28 or the overloaded deck motor 42. In the case of identifying the overloaded motor, whether or not overload is applied for a predetermined period of time or longer is determined for each of the drive motor controllers 52 and 54 and each of the deck motor controllers 56, as with the configurations described by reference to FIGS. 18 to 24 described above, and a motor which is overloaded for a predetermined period of time or longer is identified as the overloaded motor. The overload handling process is a process performed by the overload processing unit 55 in at least one of the configurations described by reference to FIGS. 18 to 24 described above.

In the case of controlling the deck motors 42 and the drive motors 26 and 28 by the configuration described above, the abnormality determination unit 212 determines in S260 in FIG. 25 whether or not an abnormality has occurred in the battery 43 with respect to the temperature Tb or a change in voltage, and in the case where it is determined that an abnormality has occurred, whether or not the abnormality has continued for a predetermined period of time or longer is determined (S261). In the case where the determination result of S261 is positive, the overload processing unit 55 uses the drive motor controllers 52 and 54 and the deck motor controllers 56, and identifies the overloaded motor among the drive motors 26 and 28 and the deck motors 42 in S263, and performs the overload handling process in S264 in accordance with the overloaded motor which has been identified. On the other hand, in the case where the determination results are negative in S260 and S261, normal control is performed in S262.

In the case of the configuration described above, first, overloading of the drive motor 26 or 28 or a deck motor 42 is determined, the overloaded motor is then identified, and a corresponding process is performed. Also with the configuration described with any of FIGS. 23 to 25, the overloading of the drive motor 26 or 28 or the deck motor 42 is swiftly alleviated or eliminated, and the drive motor 26 or 28 or the deck motor 42 may be protected.

Figure 26:
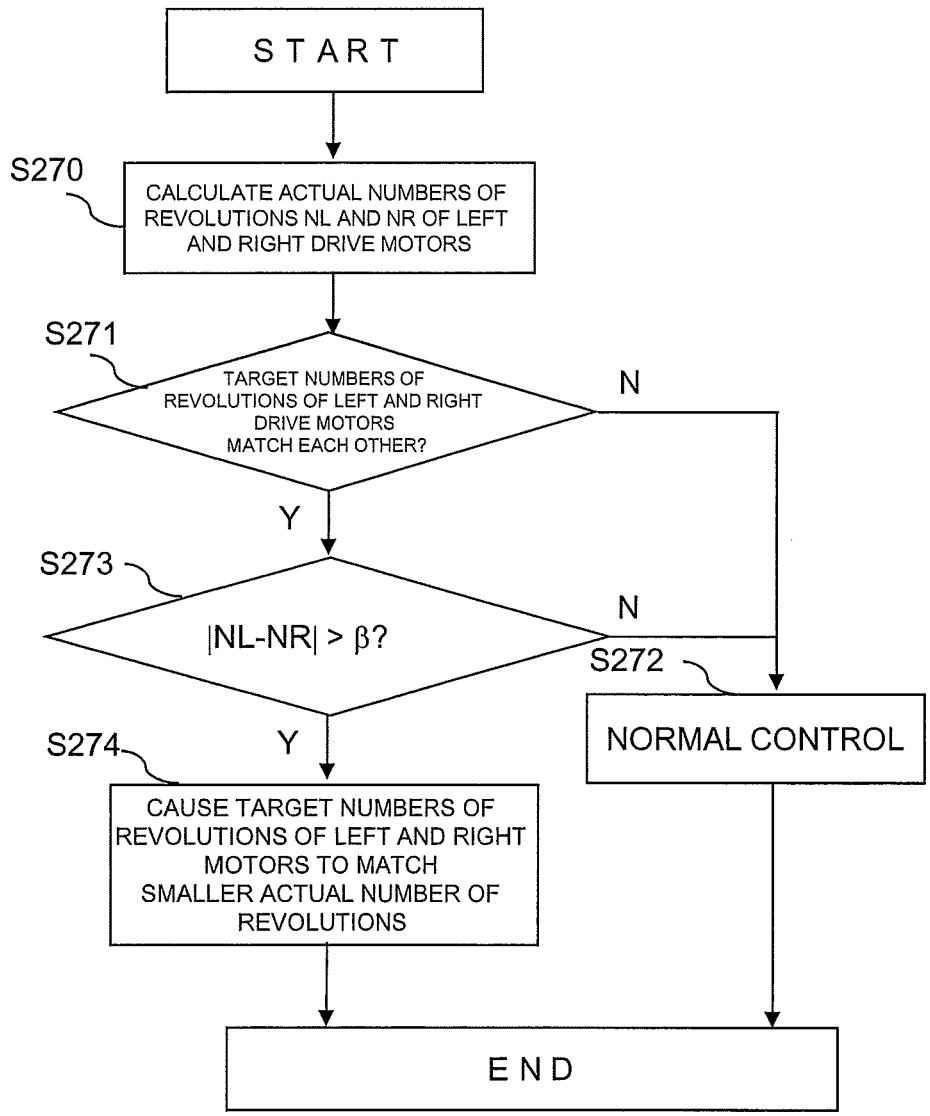
FIG. 26 is a flow chart showing a method of controlling left and right drive motors according to the other first example of the embodiment.

FIG. 26 is a flow chart showing a method of controlling the left and right drive motors 26 and 28 according to the other first example of the embodiment. According to the configuration for performing the control in FIG. 26, the driving control circuit 264 of each of the drive motor controllers 52 and 54 calculates, from the rotational angle of the corresponding left or right drive motor 26 or 28 detected by the rotational angle sensor 192, an actual number of revolutions NL or NR of the left or right drive motor 26 or 28. Moreover, each drive motor controller 52 or 54 outputs a signal indicating the actual number of revolutions NL or NR which has been calculated to the ECU 50, by way of the CAN communication line 178. The ECU 50 determines whether the target numbers of revolutions calculated by the drive-motor target-number-of-revolutions calculation unit 188 match between the left and right drive motors 26 and 28, and also, whether an absolute value |NL−NR| of the difference between the actual number of revolutions NL of the left drive motor 26 and the actual number of revolutions NR of the right drive motor 28 received approximately at the same time from the drive motor controllers 52 and 54 is greater than a predetermined value β set in advance. In the case where the absolute value |NL−NR| is determined to be greater than the predetermined value β, the ECU 50 controls the driving of the left and right drive motors 26 and 28 in such a way that the target numbers of revolutions of the left and right drive motors 26 and 28 match the smaller of the actual numbers of revolutions NL and NR of the left and right drive motors 26 and 28.

A method of controlling the numbers of revolutions of the left and right drive motors 26 and 28 by the configuration described above is performed in the following manner. First, the actual numbers of revolutions NL and NR of the left and right drive motors 26 and 28 are calculated by the drive motor controllers 52 and 54 in S270 in FIG. 26, and signals indicating the actual numbers of revolutions NL and NR are output to the ECU 50. The ECU 50 determines in S271 whether or not the target numbers of revolutions of the left and right drive motors 26 and 28 match each other, and in the case where they match each other, determines in S273 whether or not the absolute value |NL−NR| of the difference between the actual numbers of revolutions of the left and right drive motors 26 and 28 is greater than the predetermined value β. In the case where the determination result of S273 is positive, the ECU 50 performs control so as to cause the target numbers of revolutions of the left and right drive motors 26 and 28 to match the smaller of the actual numbers of revolutions NL and NR of the left and right drive motors 26 and 28 (S274). Specifically, an instruction signal indicating a target number of revolutions matching the smaller actual number of revolutions is output to each of the motor controllers 52 and 54, and the motor controllers 52 and 54 control the drive motors 26 and 28 according to the target number of revolutions. On the other hand, if the determination results of S271 and S273 are negative, normal control is performed in S272.

According to the configuration described above, even in the case where travelling straight of the vehicle is instructed, and where there is a great difference between the target number of revolutions and the actual number of revolutions of one of the left and right drive motors 26 and 28, the target numbers of revolutions of the left and right drive motors 26 and 28 are matched with each other on the slower side, and thus, the vehicle may be decelerated and travelling straight may be realized, and improvement in the travelling feeling and reduction in the burden of operation imposed on the driver may be achieved. Additionally, it is also possible to perform the process of causing the target numbers of revolutions of the left and right drive motors 26 and 28 to match the actual number of revolutions on the slower side only in the case where travelling straight at the maximum speed is determined to have been instructed by the left and right operation levers 34 and 36 or by the accelerator pedal. For example, travelling straight at the maximum speed is determined to be instructed by the driver if the left and right operation levers 34 and 36 are at positions where they have been operated by the maximum amount to the front (or to the back) from upright neutral positions, and the advantage of the configuration will be apparent.

Figure 27:
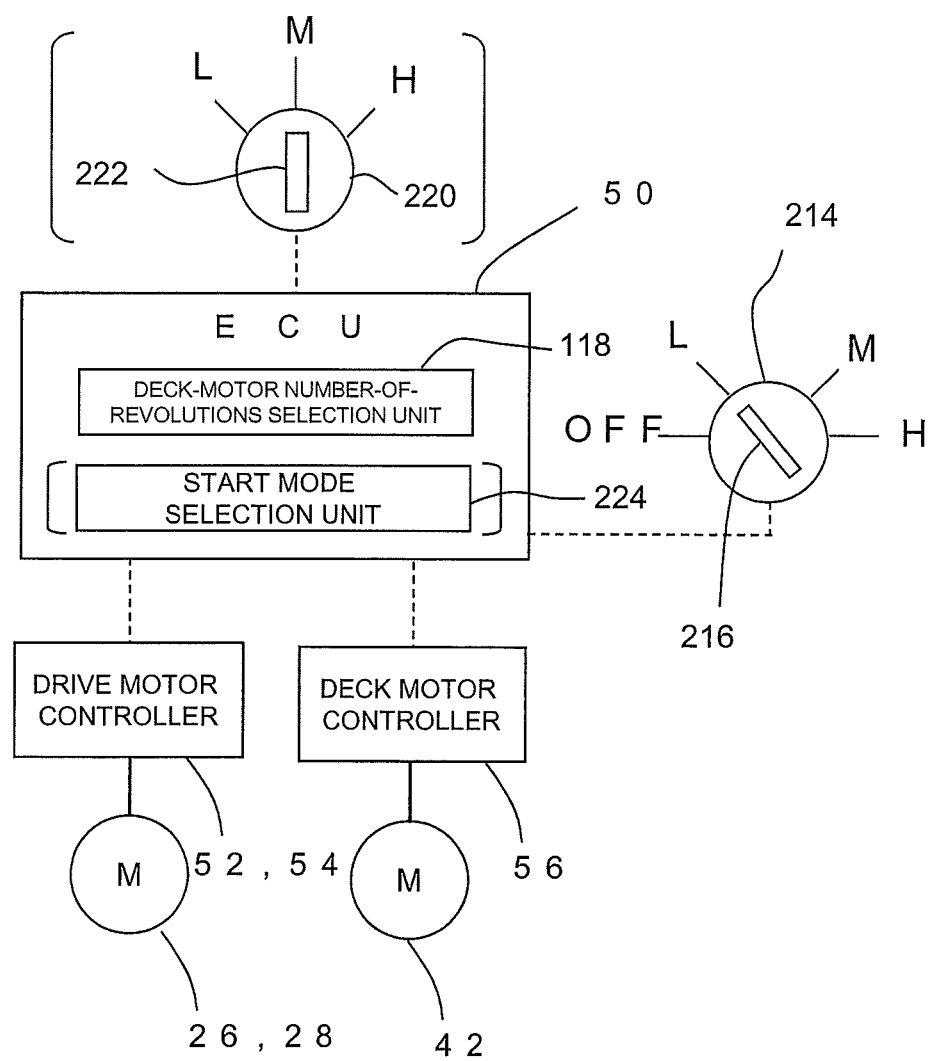
FIG. 27 is a block diagram showing a configuration of main units according to the other second and third examples of the embodiment.

FIG. 27 is a block diagram showing a configuration of main units according to the other second and third examples of the embodiment. First, the other second example of the embodiment will be described. According to the configuration in FIG. 27, the control system 12 includes a deck switch 214, which is a deck motor speed switching unit. The deck switch 214 is used instead of the deck switch 44 shown in FIG. 16, and switching between the positions of OFF, L, M, and H is possible by operating a knob portion 216. Stopping of the deck motor 42 is instructed when switching to the OFF position is performed. Driving of the deck motor 42 at a low speed, a medium speed, or a high speed is instructed when switching to L, M, or H is performed. Signals indicating the instructions from the deck switch 214 are output to the ECU 50. These signals include a signal of zero corresponding to a stop instruction.

The ECU 50 includes a deck-motor number-of-revolutions selection unit 218. The deck-motor number-of-revolutions selection unit 218 changes the target number of revolutions set with respect to the deck motor 42 according to an instruction input from the deck switch 214 in a case where the instruction indicates driving at a low speed, a medium speed, or a high speed. For example, in the case where driving at a low speed is instructed at the L position, the deck-motor number-of-revolutions selection unit 218 changes the target number of revolutions set at the medium speed in the initial setting to the number of revolutions on the low speed side set in advance. In the case where driving at a high speed is instructed at the H position, the deck-motor number-of-revolutions selection unit 218 changes the target number of revolutions to the number of revolutions on the high speed side set in advance. The ECU 50 outputs, in a case where the target number of revolutions is changed, a signal indicating the target number of revolutions after change to the deck motor controller 56, and causes the deck motor 42 to be driven at the target number of revolutions.

According to the configuration described above, the functionality of the mower vehicle 10 and the degree of freedom regarding the mowing work may be increased. Additionally, in FIG. 27, the deck switch 214 allows adjustment of the speed in three stages, but this is not restrictive, and adjustment in two stages or four or more stages may also be allowed. Also, the OFF position may be removed from the deck switch 214, and the deck switch 44, shown in FIG. 16, for switching between ON and OFF and the deck switch 214 may be used in combination. Moreover, as the deck motor speed switching unit, a volume-type allowing non-stage adjustment of the number of revolutions of the deck motor 42 may be used instead of the deck switch 214.

Next, the other third example of the embodiment will be described with reference to FIG. 27. According to the configuration in FIG. 27, the control system 12 includes a speed adjustment switch 220, which is a drive motor start speed switching unit. The speed adjustment switch 220 allows switching between the positions of L, M, and H by the operation of a knob portion 222. By switching to the M position, normal control where no adjustment is performed with respect to the start speed is performed, and it is instructed to cause the responsiveness to control with respect to the target number of revolutions of each of the drive motors 26 and 28 to be medium. By switching to L or H, it is instructed to switch the responsiveness of control with respect to the target number of revolutions to a low state or a high state, at the time of driving start where each of the drive motors 26 and 28 is transitioned from being stopped to being driven. A signal indicating the instruction from the speed adjustment switch 220 is output to the ECU 50.

The ECU 50 includes a start mode selection unit 224. In a case where the instruction input from the speed adjustment switch 220 is for switching to low or high responsiveness, the start mode selection unit 224, according to the instruction, selects a start mode set in advance, and instructs each of the drive motor controllers 52 and 54 to change the responsiveness with respect to the target number of revolutions at the time of driving start of each of the drive motors 26 and 28. That is, in a case where a low responsiveness is instructed, the start mode selection unit 224 selects a low responsiveness mode where the responsiveness is low, and in a case where a high responsiveness is instructed, the start mode selection unit 224 selects a high responsiveness mode where the responsiveness is high. Also, in a case a medium responsiveness is instructed, the start mode selection unit 224 selects a medium responsiveness mode for normal control. In the case where the low responsiveness mode or the high responsiveness mode is selected, the start mode selection unit 224 sets a time constant set in advance to a small time constant or a large time constant with respect to a first-order lag for a case of performing feedback control by a target number of revolutions according to the target vehicle speed at the time of driving start of each of the drive motors 26 and 28. The ECU 50 outputs a signal indicating the time constant which has been set to each of the drive motor controllers 52 and 54. In the case where the time constant after change is input from the ECU 50 to each of the drive motor controllers 52 and 54, each of the drive motor controllers 52 and 54 changes, to the time constant after change, the time constant for a case of performing feedback control on the number of revolutions of each of the drive motors 26 and 28 by the target number of revolutions within a predetermined period of time or at a predetermined speed or less set in advance at the time of driving start.

According to the configuration described above, a user is allowed to select the starting performance of the mower vehicle 10. For example, when the speed adjustment switch 220 is switched to the L position, and a low responsiveness is instructed, the time constant becomes smaller, and the responsiveness at the time of making the actual number of revolutions of each of the drive motors 26 and 28 closer to the target number of revolutions becomes lower. Thus, the left and right wheels 22 and 24 are less likely to slip, and the lawn may be prevented from being roughened at the time of the wheels travelling on the lawn.

Figure 28:
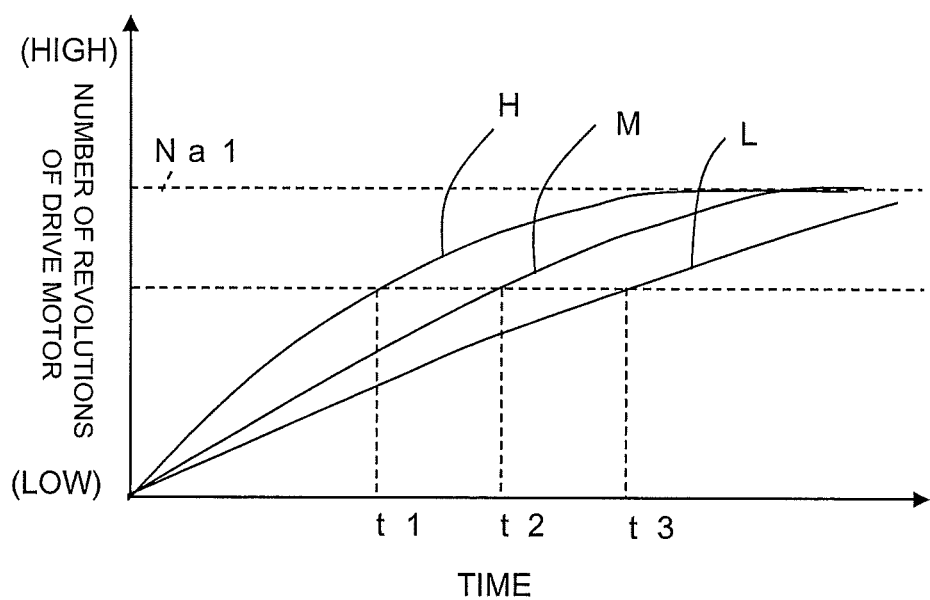
FIG. 28 is a diagram showing change over time of the number of revolutions in a case where the number of revolutions of a drive motor is controlled based on a selection by a start mode selection unit according to the other third example of the embodiment.

FIG. 28 is a diagram showing change over time of the number of revolutions in a case where the numbers of revolutions of the drive motors 26 and 28 are controlled based on a selection by the start mode selection unit 224 according to the present example. FIG. 28 shows, with curves L, M, and H, cases where the low responsiveness mode, the medium responsiveness mode, and the high responsiveness mode are selected, and the time constants are t1, t2, and t3, respectively. Accordingly, the responsiveness with respect to the target number of revolutions of the drive motor 26 or 28 may be switched among three stages by the switching of the speed adjustment switch 220, and gradual acceleration at the time of start may be achieved in the low responsiveness mode shown by the curve L.

Additionally, according to the configuration of the present example, the speed adjustment switch 220 allows adjustment of the responsiveness at the time of starting in three stages, but this is not restrictive, and adjustment in two stages or four or more stages may also be allowed. Also, as the drive motor start speed switching unit, a volume-type allowing non-stage adjustment of the time constant for the left and right drive motors 26 and 28 may also be used instead of the speed adjustment switch 220.

Figure 29:
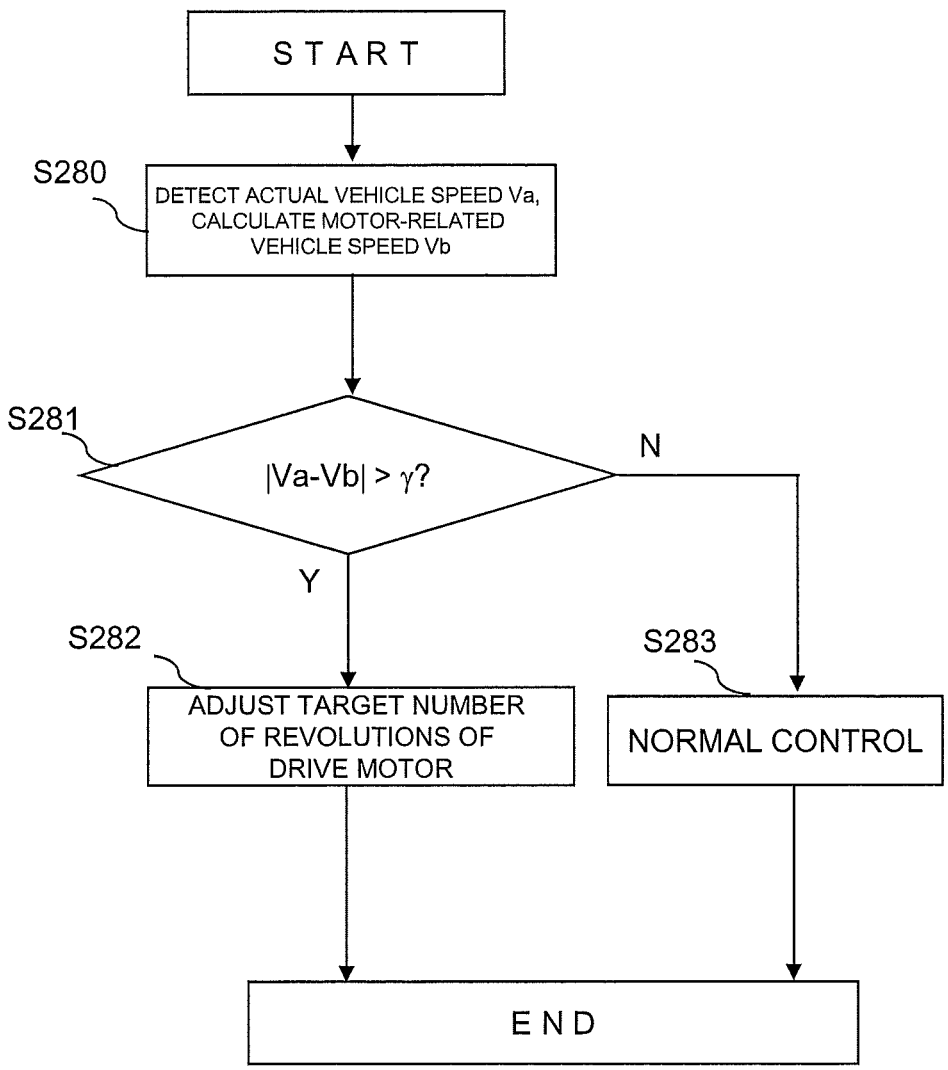
FIG. 29 is a flow chart showing a method of controlling a drive motor according to another fourth example of the embodiment.

FIG. 29 is a flow chart showing a method of controlling the drive motors 26 and 28 according to another, fourth example of the embodiment. According to the configuration for performing control in FIG. 29, the control system 12 includes a vehicle speed sensor 226 as shown in FIG. 17. The vehicle speed sensor 226 includes an acceleration sensor, for example, and detects an actual vehicle speed Va of the vehicle by time integration or the like of acceleration of the vehicle obtained from the acceleration sensor. A signal indicating the actual vehicle speed Va detected by the vehicle speed sensor 226 is output to the ECU 50. The driving control circuits 264 of the drive motor controllers 52 and 54 calculate, from the rotational angles of the corresponding drive motors 26 and 28 detected by the rotational angle sensors 192, actual numbers of revolutions of the drive motors 26 and 28, and output signals indicating the actual numbers of revolutions to the ECU 50 by way of the CAN communication line 178.

The ECU 50 compares a motor-related estimated vehicle speed Vb, which is an actual vehicle speed estimated value calculated from the average value of the actual numbers of revolutions of the drive motors 26 and 28 which have been input, and a detected actual vehicle speed Va detected by the vehicle speed sensor 226, and in a case where an absolute value |Va−Vb| of the difference between the motor-related estimated vehicle speed Vb and the detected actual vehicle speed Va is greater than a predetermined value γ set in advance, the ECU 50 performs adjustment control with respect to the target numbers of revolutions of the drive motors 26 and 28. The adjustment control is for reducing the target numbers of revolutions in accordance with the lever positions of the left and right operation levers 34 and 36 in such a way that the numbers of revolutions of the drive motors 26 and 28 are reduced by predetermined proportions or by predetermined numbers of revolutions as compared with a case of normal control. The ECU 50 outputs to the drive motor controllers 52 and 54 the target number of revolutions which has been reduced, and the drive motor controllers 52 and 54 control the drive motors 26 and 28 to be driven at the target number of revolutions.

Additionally, as the adjustment control, the ECU 50 may reduce the target numbers of revolutions in accordance with the lever positions of the left and right operation levers 34 and 36 in such a way that the numbers of revolutions of the drive motors 26 and 28 are reduced as compared with the case of normal control by a proportion according to the size of the absolute value |Va−Vb|. For example, in the case where the absolute value |Va−Vb| is great, the target number of revolutions of each of the drive motors 26 and 28 is greatly reduced.

The method of controlling the numbers of revolutions of the left and right drive motors 26 and 28 by the configuration described above is performed in the following manner. First, the actual vehicle speed Va is detected in S280 in FIG. 29 by the vehicle speed sensor 226, and the motor-related estimated vehicle speed Vb is calculated from the detection value of the rotational angle sensor 192 by the drive motor controllers 52 and 54 and the ECU 50. Then, whether or not the absolute value |Va−Vb| of the difference between the motor-related estimated vehicle speed Vb and the detected actual vehicle speed Va is greater than a predetermined value γ set in advance is determined in S281, and in the case where the detection result is positive, the adjustment control described above is performed in S282. On the other hand, if the determination result is negative in S281, normal control is performed in S283.

According to the configuration described above, in a case where at least one of the left and right wheels 22 and 24 is slipping on damp ground or the like and the actual vehicle speed Va is approximately zero or is extremely low, and the average value of the rotational speeds of the drive motors 26 and 28 is excessively great and the motor-related estimated vehicle speed Vb is excessively high, the target numbers of revolutions of the drive motors 26 and 28 are reduced. Accordingly, the vehicle is less likely to slip, and the lawn is less likely to be roughened at the time of the vehicle travelling on the lawn.

Figure 30:
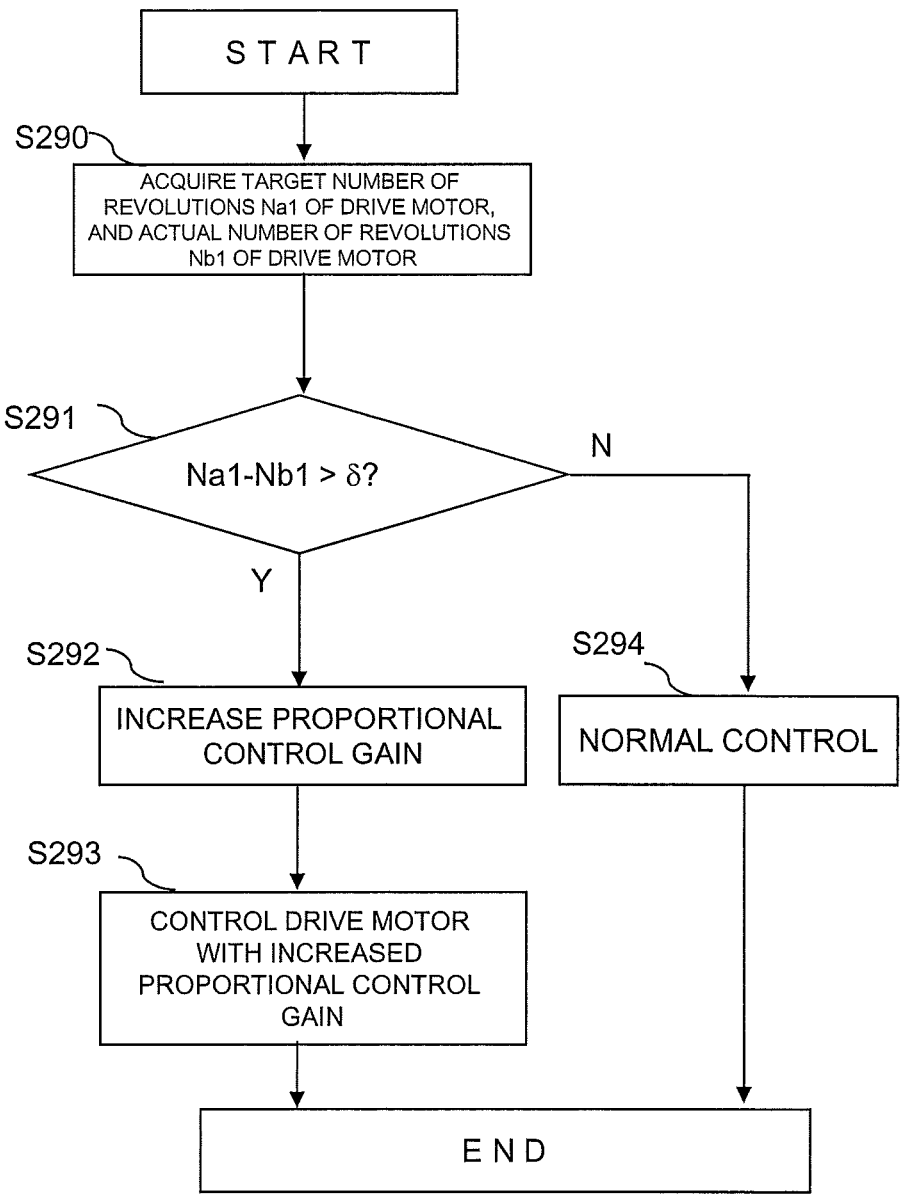
FIG. 30 is a flow chart showing a method of controlling a drive motor according to another fifth example of the embodiment.

FIG. 30 is a flow chart showing a method of controlling the drive motors 26 and 28 according to another, fifth example of the embodiment. According to the configuration for performing the control in FIG. 30, each of the drive motor controllers 52 and 54 acquires the target number of revolutions Na1 of the drive motor 26 or 28 input from the ECU 50, and the actual number of revolutions Nb1 of the drive motor 26 or 28 calculated from the detection value of the rotational angle sensor 192, and in the case where the difference (Na1−Nb1) between the target number of revolutions Na1 and the actual number of revolutions Nb1 is determined to be greater than a predetermined value δ set in advance, a proportional control gain for the case of controlling the number of revolutions of the drive motor 26 or 28 by PI control or PID control is changed to another proportional control gain greater than that for normal control.

The method of controlling the numbers of revolutions of the left and right drive motors 26 and 28 by the configuration described above is performed in the following manner. First, the drive motor controller 52 or 54 acquires the target number of revolutions Na1 and the actual number of revolutions Nb1 of the drive motor 26 or 28 in S290 in FIG. 30, and determines in S291 whether the difference (Na1−Nb1) between the target number of revolutions Na1 and the actual number of revolutions Nb1 is greater than a predetermined value δ. The predetermined value δ may be zero. If the determination result of S291 is positive, the proportional control gain is changed to another, greater proportional control gain in S292, and the drive motor controller 52 or 54 controls the drive motor 26 or 28 by the increased proportional control gain. On the other hand, if the determination result of S291 is negative, normal control is performed in S294. In the normal control, an initially set control gain is used. In the case where the determination result is positive in S291, a signal to that effect is output to the ECU 50, and the ECU 50 may output to the corresponding drive motor controller 52 (or 54) an instruction for changing the proportional control gain to another greater proportional control gain. In this case, the drive motor controller 52 (or 54) controls the driving of the corresponding drive motor 26 or 28 by the greater proportional control gain.

According to the configuration described above, the actual number of revolutions Nb1 of each of the drive motors 26 and 28 may be made closer to the target number of revolutions Na1 more swiftly and with more accuracy, and the control accuracy may be increased, and the operation feeling of the driver may be improved. In the case where the difference (Na1−Nb1) between the target number of revolutions Na1 and the actual number of revolutions Nb1 is greater than the predetermined value δ, the proportional control gain may be increased in a stage-wise or non-stage manner as the difference (Na1−Nb1) becomes greater. A case of controlling the drive motors 26 and 28 has been described above, but the configuration of FIG. 30 may be applied to the control of the deck motor 42, and the proportional control gain may be increased in the case where the difference between the target number of revolutions and the actual number of revolutions is great.

Figure 31:
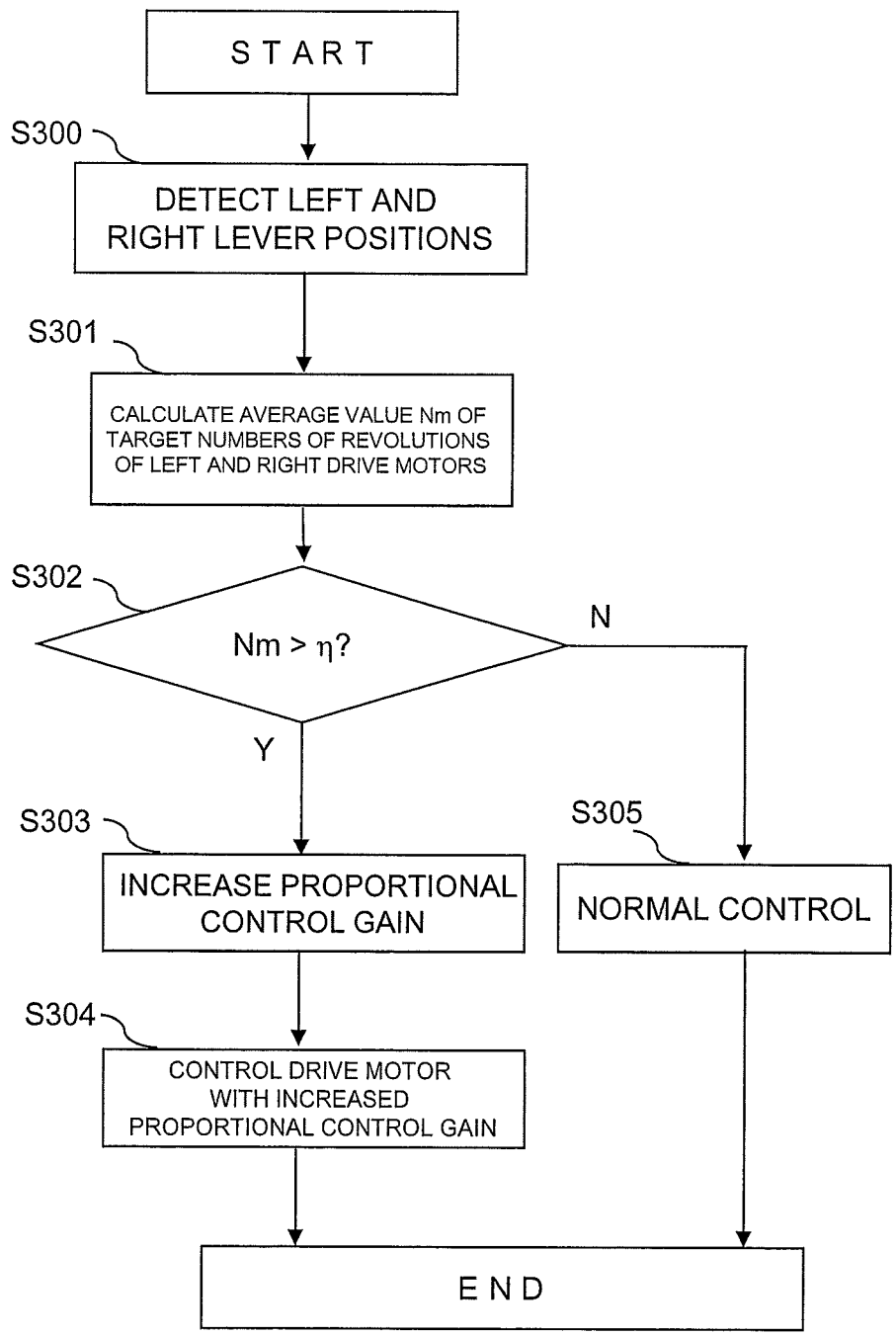
FIG. 31 is a flow chart showing a method of controlling a drive motor according to another sixth example of the embodiment.

FIG. 31 is a flow chart showing a method of controlling the drive motors 26 and 28 according to another, sixth example of the embodiment. According to the configuration for performing the control in FIG. 31, the ECU 50 calculates, from the target numbers of revolutions of the left drive motor 26 and the right drive motor 28 calculated by the drive-motor target-number-of-revolutions calculation unit 188, an average value Nm of the target numbers of revolutions of both left and right. In the case of determining the average value Nm to be greater than a predetermined value η set in advance, the ECU 50 changes the proportional control gain for the case of controlling the number of revolutions of each of the drive motors 26 and 28 by PI control or PID control to another proportional control gain greater than that for normal control.

The method of controlling the numbers of revolutions of the left and right drive motors 26 and 28 by the configuration described above is performed in the following manner. First, the lever sensors 46 and 48 detect the left and right lever positions in S300 in FIG. 31, and output to the ECU 50 signals indicating the detected lever positions. In S301, the ECU 50 calculates the target numbers of revolutions of the drive motors 26 and 28 according to the left and right lever positions, and calculates the average value Nm of the target numbers of revolutions. In S302, the ECU 50 determines whether or not the average value Nm is greater than the predetermined value η, and if the determination result of S302 is positive, outputs an instruction to each of the drive motor controllers 52 and 54 to increase the proportional control gain. In this case, each of the drive motor controllers 52 and 54 changes the proportional control gain to another proportional gain greater than that for normal control, and controls the drive motor 26 or 28 with the increased proportional control gain. On the other hand, if the determination result of S302 is negative, normal control is performed in S305. In the normal control, an initially set proportional control gain is used.

According to the configuration described above, the proportional control gain is changed according to the vehicle speed, and in the case where the vehicle speed is high, the actual numbers of revolutions of the drive motors 26 and 29 may be made closer to the target numbers of revolutions more swiftly and with more accuracy, and the control accuracy may be increased, and the operation feeling of the driver may be improved. In the case where the average value Nm of the target numbers of revolutions of the left and right drive motors 26 and 28 is greater than the predetermined value η, the proportional control gain may be increased in a stage-wise or non-stage manner as the average value Nm becomes greater. Also, a case is described above where the average value Nm of the target numbers of revolutions of the drive motors 26 and 28 is calculated from the detected left and right lever positions, but in the case of using an accelerator pedal, the average value of the target numbers of revolutions may be calculated from a detected accelerator pedal position.

Figure 32:
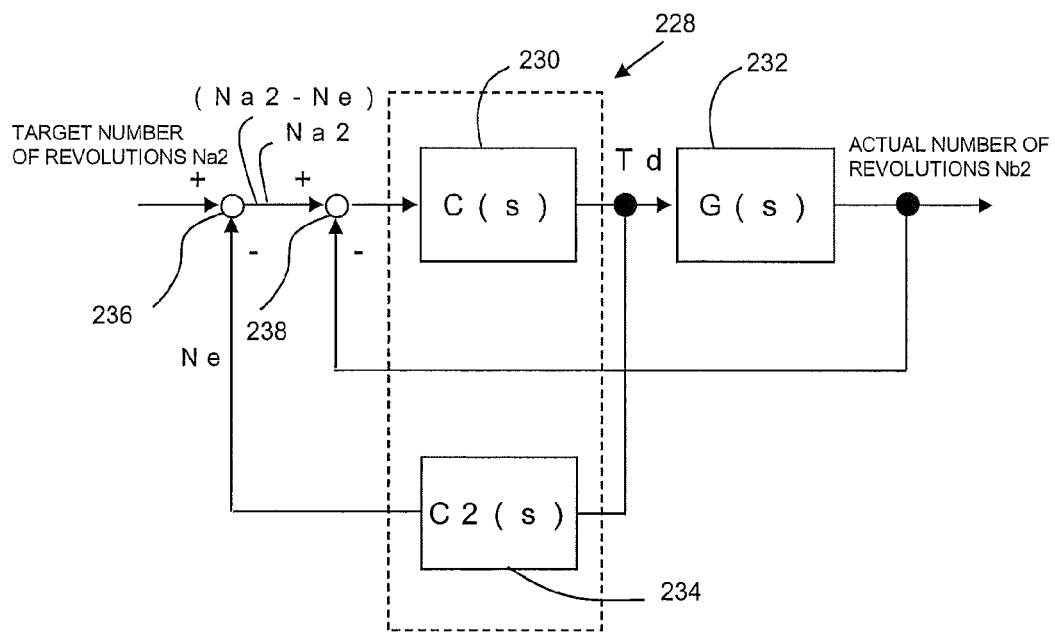
FIG. 32 is a control block diagram used for control of the number of revolutions of a deck motor according to another seventh example of the embodiment.

FIG. 32 is a control block diagram used for control of the number of revolutions of the deck motor 42 according to another, seventh example of the embodiment. According to the configuration in FIG. 32, each deck motor controller 56 has a function of changing control such that a target number of revolutions Na2 of the deck motor 42 is reduced in the case where a computed torque increment instruction value Td is at or below a predetermined value set in advance, in the case of performing feedback control so as to make the target number of revolutions Na2 match an actual number of revolutions Nb2. Specifically, a number-of-rotations control unit 228 of the motor control unit 175 shown in the block diagram in FIG. 32 includes a first calculation unit 230, a second calculation unit 232, and a third calculation unit 234. The first calculation unit 230 outputs the torque increment instruction value Td determined by PI calculation or PID calculation according to input of a deviation between the target number of revolutions Na2 and the actual number of revolutions Nb2 of the deck motor 42. The second calculation unit 232 outputs the number of revolutions determined by PI calculation or PID calculation according to input of the torque increment instruction value Td. The third calculation unit 234 functions only when the torque increment instruction value Td is at or below a predetermined value, and outputs the amount of reduction Ne in the number of revolutions determined by PI calculation or PID calculation according to input of the torque increment instruction value Td. In the case where the third calculation unit 234 functions, a deviation (Na2−Ne) between the target number of revolutions Na2 and the output Ne of the third calculation unit 234 is calculated by an additional subtracter 236, and the deviation (Na2−Ne) is output to a basic subtracter 238. The basic subtracter 238 calculates the deviation between the deviation (Na2−Ne) output from the additional subtracter 236 and the actual number of revolutions Nb2, and the deviation is output to the first calculation unit 230.

According to the configuration described above, in the case of mowing the lawn by the deck motor 42, the state of the lawn may be substantially determined by the torque increment instruction value Td for the control of the deck motor 42. For example, in the case where the load on the deck motor 42 is excessively low, it is determined that there is no lawn or only a small amount of lawn to be mowed around the mower blade, and the number of revolutions of the deck motor 42 may be reduced by the third calculation unit 234. Accordingly, the consumption current consumed by the deck motor 42 may be reduced, and also, the rotational speed at the time of idle running of the mower blade may be reduced and occurrence of rotary sound at unnecessary times may be suppressed, resulting in reduction in noise. For example, the third calculation unit 234 functions in the case where the torque increment instruction value Td output from the first calculation unit 230 is at or below a predetermined value. In this case, the third calculation unit 234 outputs the number of revolutions Ne calculated from the torque increment instruction value Td, the number of revolutions Ne is subtracted from the target number of revolutions Na2 at the additional subtracter 236, and the target number of revolutions after subtraction (Na2−Ne) is output to the basic subtracter 238. The actual number of revolutions Nb2 is thereby reduced, and the consumption current and the noise may be reduced.

Figure 33:
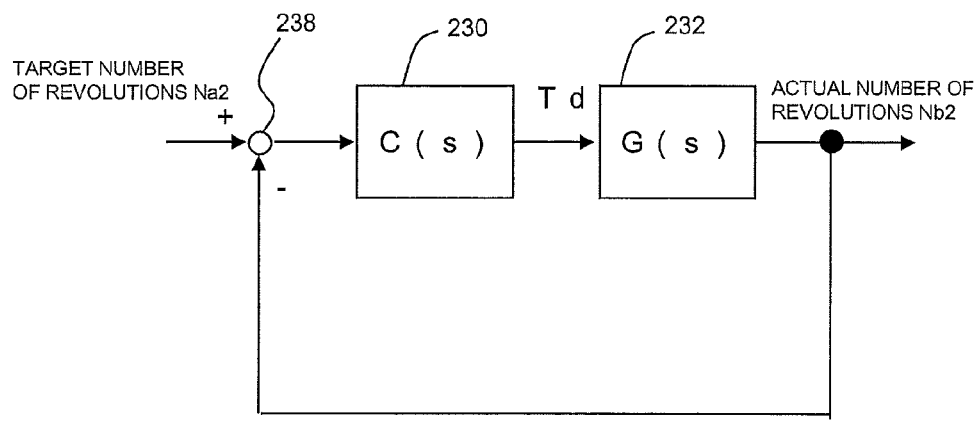
FIG. 33 is a control block diagram used for control of the number of revolutions of a deck motor according to a comparative example.

Meanwhile, FIG. 33 is a control block diagram used for control of the number of revolutions of the deck motor according to a comparative example. According to the comparative example, the mower vehicle mows the lawn at a fixed target number of revolutions at all times. The block diagram in FIG. 33 is the same as FIG. 32 without the third calculation unit 234. In the comparative example, the operation time of the deck motor is limited by the capacity of the battery which is the driving source of the deck motor. Also, in the comparative example, the number of revolutions of the mower blade may become great even if the load on the deck motor is low, and the noise may possibly become great. According to the configuration in FIG. 32, these inconveniences may be prevented.

A case of reducing, by the configuration in FIG. 32, the target number of revolutions Na2 in a case where the torque increment instruction value Td is low is described above, but the target number of revolutions Na2 may also be increased by the configuration in FIG. 32 in a case where the torque increment instruction value Td is great. In this case, the third calculation unit 234 functions only in the case where the torque increment instruction value Td is at or above a second predetermined value set in advance, and outputs the amount of increase in the number of revolutions by PI calculation or PID calculation according to input of the torque increment instruction value Td. In this case, an additional adder is used instead of the additional subtracter 236, and the amount of increase in the number of revolutions output from the third calculation unit 234 is added to the target number of revolutions Na2. Other configurations are the same as the configurations described by reference to FIG. 32 which have been described above.

According to the configuration described above, in the case where the load on the deck motor 42 is excessively high, it is determined that the lawn is yet to be mowed or that the lawn is excessively compacted, and the target number of revolutions of the deck motor 42 may be increased by the third calculation unit 234. It is also possible to cause, in the configuration in FIG. 32 described above, the third calculation unit 234 to function only where the torque increment instruction value Td is at or below the predetermined value, and where it is at or above the second predetermined value. In this case, the third calculation unit 234 outputs the amount of reduction Ne in the number of revolutions to the additional subtracter 236 in the case where the torque increment instruction value Td is at or below the predetermined value, and the third calculation unit 234 outputs the amount of increase in the number of revolutions to the additional adder in the case where the torque increment instruction value Td is at or above the second predetermined value. In this case, processes according to both of the cases where the load is excessively low and where the load is excessively high may be performed.

Furthermore, although not shown in a drawing, it is also possible to adopt a configuration, as another embodiment, according to which counter torque is generated at the time of start of driving of each deck motor 42 such that the deck motor 42 is rotated in a direction opposite the positive rotation direction for the normal operation. In this case, the negative rotation in the negative direction is generated by the amount of angle set in advance or for a predetermined period of time. Positive rotation is then performed after the negative rotation. The control described above is performed by each deck motor controller 56. In this case, it is also possible to perform the positive rotation and the negative rotation alternately and repeatedly a number of times set in advance (for example, two or three times). Also, each deck motor controller 56 may determine that the load is excessively high in a case where the load torque calculated from the detected current of the deck motor 42 is at or above a predetermined value, or in a case where the difference between the target number of revolutions and the actual number of revolutions is at or above a predetermined value, and may perform, only in this case, positive-negative rotation control according to which a positive rotation operation is performed after the negative rotation described above. In this case, an execution instruction for the positive-negative rotation control may be output from the ECU 50 to each deck motor controller 56.

According to the configuration described above, negative rotation of the deck motor 42 is performed at the start of the mowing operation, and thus, even if there is no gap between the mower blade and the lawn at the start of the driving of the mower blade, the positive rotation operation may be performed in a state where the gap is widened by the negative rotation, and the initial speed at the time of the mower blade hitting the lawn in increased, thereby making faulty operation regarding mowing of the lawn less likely. On the other hand, if the configuration described above is not adopted, the rotation direction of the deck motor 42 at the start of driving is fixed, and generated torque of the deck motor 42 is possibly not used effectively at the start of mowing of compacted lawn. With the configuration described above, this inconvenience may be prevented.

Figure 34:
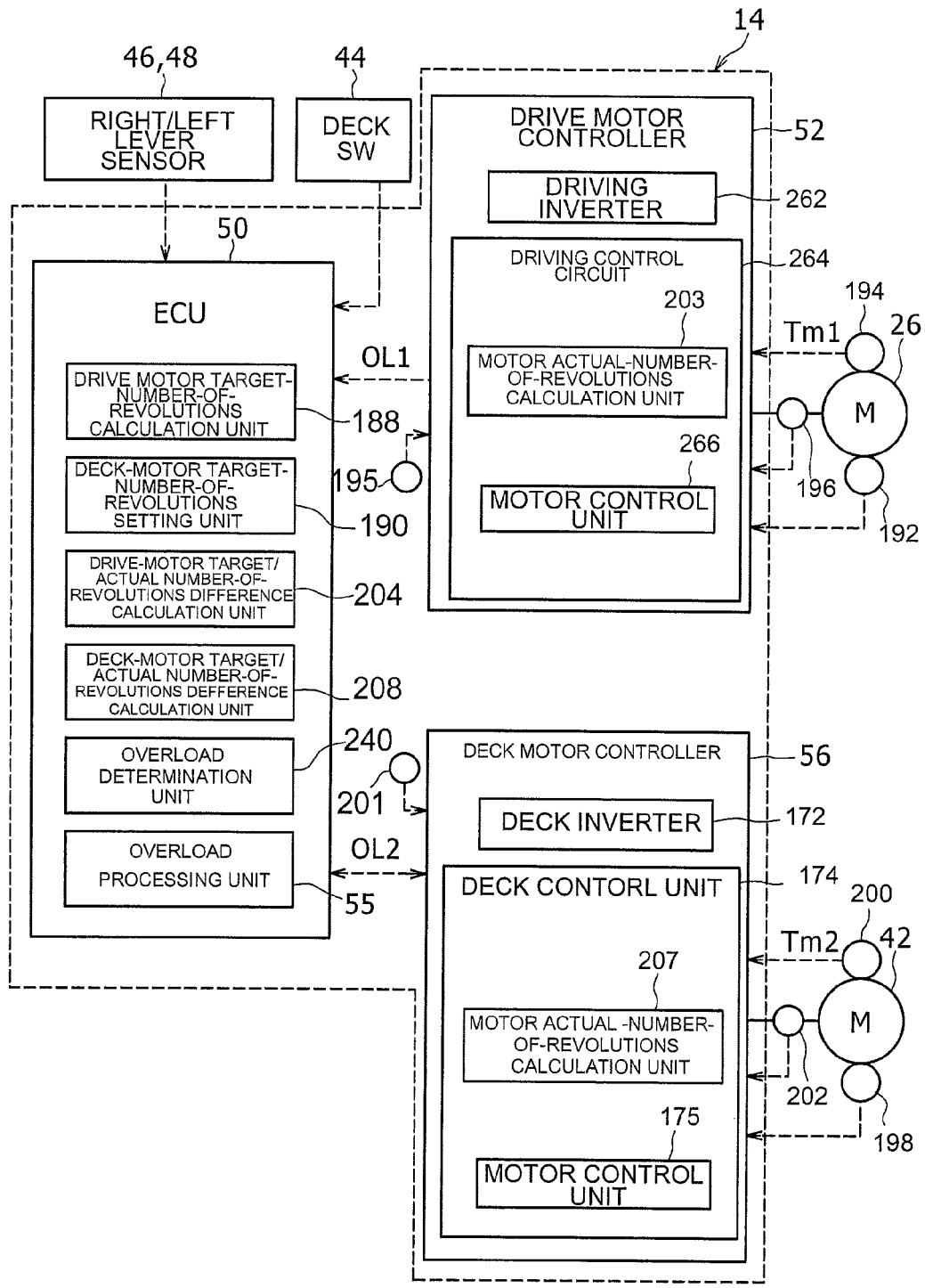
FIG. 34 is a block diagram showing a configuration of a controller unit of another second embodiment, the block diagram corresponding to the block diagram in FIG. 16.

FIG. 34 is a block diagram showing a configuration of a controller unit 14 of another second embodiment, the block diagram corresponding to the block diagram in FIG. 16. In the present embodiment, the left drive motor controller 52, and the right drive motor controller 54 referred to in FIG. 17 and the deck motor controller 56 do not include the motor target/actual number-of-revolutions difference calculation units 204 and 208 in the embodiment in FIGS. 15 to 24 described above. Instead, the left drive motor controller 52 and the right drive motor controller 54 include a motor actual-number-of-revolutions calculation unit 203, and the motor actual-number-of-revolutions calculation unit 203 calculates, from the detected value of the rotational angle of the drive motor 26 or 28 received from the rotational angle sensor 192, an actual number of revolutions Nb1 as the operation state of the motor, and outputs to the ECU 50 a signal indicating the actual number of revolutions Nb1.

Likewise, the deck motor controller 56 includes a motor actual-number-of-revolutions calculation unit 207, and the motor actual-number-of-revolutions calculation unit 207 calculates, from the detected value of the rotational angle of the deck motor 42 received from the rotational angle sensor 198, an actual number of revolutions Nb2 as the operation state of the motor, and outputs to the ECU 50 a signal indicating the actual number of revolutions Nb2.

The ECU 50 includes a drive-motor target/actual number-of-revolutions difference calculation unit 204, a deck-motor target/actual number-of-revolutions difference calculation unit 208, and an overload determination unit 240. The drive-motor target/actual number-of-revolutions difference calculation unit 204 determines whether the corresponding drive motor 26 or 28 is overloaded, based on the actual number of revolutions Nb1 indicated by the signal input from the drive motor controller 52 or 54 and the target number of revolutions Na1 of the corresponding drive motor 26 or 28. Specifically, the drive-motor target/actual number-of-revolutions difference calculation unit 204 calculates a target/actual number of revolutions difference Nd1 (=Na1−Nb1) by subtracting the actual number of revolutions Nb1 calculated for the corresponding drive motor 26 or 28 from the target number of revolutions Na1 of the drive motor 26 or 28. The overload determination unit 240 receives the target/actual number of revolutions difference Nd1 from the drive-motor target/actual number-of-revolutions difference calculation unit 204, determines whether the target/actual number of revolutions difference Nd1 is at or above a threshold $\alpha 1$ set in advance, and determines the state of being overloaded in the case where the target/actual number of revolutions difference Nd1 is determined to be at or above the threshold $\alpha 1$. The overload determination unit 240 outputs an overload determination signal to the overload processing unit 55 in the case where the state of being overloaded has continued for a predetermined period of time set in advance or longer.

Likewise, the deck-motor target/actual number-of-revolutions difference calculation unit 208 determines whether the corresponding deck motor 42 is overloaded, based on the actual number of revolutions Nb2 indicated by the signal input from the deck motor controller 56 and the target number of revolutions Na2 of the corresponding deck motor 42. Specifically, the deck-motor target/actual number-of-revolutions difference calculation unit 208 calculates a target/actual number of revolutions difference Nd2 (=Na2−Nb2) by subtracting the actual number of revolutions Nb2 calculated for the corresponding deck motor 42 from the target number of revolutions Na2 of the deck motor 42. The overload determination unit 240 receives the target/actual number of revolutions difference Nd2 from the deck-motor target/actual number-of-revolutions difference calculation unit 208, determines whether the target/actual number of revolutions difference Nd2 is at or above a threshold $\alpha 2$ set in advance, and determines the state of being overloaded in the case where the target/actual number of revolutions difference Nd2 is at or above the threshold $\alpha 2$. The overload determination unit 240 outputs an overload determination signal to the overload processing unit 55 in the case where the state of being overloaded has continued for a predetermined period of time set in advance or longer.

The overload processing unit 55 performs the overload handling process set in advance which has been described by reference to FIGS. 18 to 24 described above, in the case where the overload determination signal is input from at least one of the drive-motor target/actual number-of-revolutions difference calculation unit 204 and the deck-motor target/actual number-of-revolutions difference calculation unit 208. For example, in the case where the deck motor 42 is overloaded, the overload processing unit 55 changes, as the overload handling process, the target number of revolutions in such a way that the drive motors 26 and 28 are decelerated as compared with a case of normal control.

Moreover, in the case where the deck motor 42 further continues to be overloaded for a predetermined period of time set in advance or longer after the deceleration of the left and right drive motors 26 and 28, the overload processing unit 55 changes the target number of revolutions in such a way as to stop all the deck motors 42.

The motor control system of the embodiment described above includes a drive motor and an auxiliary motor, a drive motor controller and an auxiliary motor controller, and a main controller. Each motor controller outputs to the main controller a signal indicating the operation state of the corresponding motor. The main controller determines, as the operation state of the motor input from at least one of the motor controllers, whether or not the motor is overloaded, based on the signal indicating the actual number of revolutions of the corresponding motor, and performs an overload handling process set in advance in the case where the motor is overloaded for a predetermined period of time set in advance or longer. The main control determines whether or not a motor is overloaded, based on the difference between the actual number of revolutions of the motor indicated by a signal input from at least one of the motor controllers and the target number of revolutions of the motor.

According to the configuration described above, the overloading of a motor is swiftly alleviated or eliminated, and the motor can be protected. For example, in the case where the drive motors 26 and 28 are decelerated as the overload handling process where at least one of the deck motors 42 is overloaded for a predetermined period of time or longer, the current supplied to the deck motor 42 from the battery does not become insufficient, and overloading is swiftly alleviated or eliminated. Other configurations and effects are the same as those of the embodiment of FIGS. 15 to 24 described above.

According to the motor control system of at least one of the embodiments described above, the auxiliary motor is disabled when the amount of charge of the electric power storage unit reaches or falls below the first threshold set in advance, thereby providing the driver a chance to pull over in the case where the amount of charge of the electric power storage unit has become low, and also suppressing the reduction in the amount of charge after providing the chance and increasing the travelling range of the vehicle.

The motor control system of at least one of the embodiments described above has the configuration of the first motor control system described above. Accordingly, the decelerated travelling mode where the allowed speed of the drive motor is reduced is executed in the case where the amount of charge of the electric power storage unit has reached or fallen below the first threshold and the drive motor is disabled and then the disabled state is released, and thus, the reduction in the amount of charge of the electric power storage unit may be more effectively suppressed, and the travelling range may be further increased.

The motor control system of at least one of the embodiments described above has the configuration of the second motor control system described above. Accordingly, when the amount of charge of the electric power storage unit reaches or falls below the second threshold lower than the first threshold, the decelerated travelling mode where the allowed speed of the drive motor is reduced is executed, and the reduction in the amount of charge of the electric power storage unit may be more effectively suppressed, and the travelling range may be further increased. Also, the auxiliary motor is disabled after the amount of charge of the electric power storage unit has reached or fallen below the first threshold and until the amount of charge reaches or falls below the second threshold, but the allowed speed of the drive motor is not reduced, and thus, reduction in the travelling performance over a long period of time may be suppressed.

The motor control system of at least one of the embodiments described above has the configuration of the fourth motor control system described above. Accordingly, even if the manual switched is OFF, electric power supply from the electric power storage unit to the controller is maintained while at least one of the drive motor and the auxiliary motor that are controlled by the controller is rotating, and thus, occurrence of a situation not desirable with respect to the durability of parts may be prevented even if the manual switch is turned off during rotation of at least one of the drive motor and the auxiliary motor.

According to the control system, for an electric motor-driven vehicle, of at least one of the embodiments described above, in the case where overloading of at least one of the drive motor and the auxiliary motor occurs, the overloading may be swiftly alleviated or eliminated and the motor may be protected.

What is claimed is:

1. A control system for an electric motor-driven vehicle, the control system comprising:
   a drive motor and an auxiliary motor that are connected to a power source unit;
   a drive motor controller for controlling the drive motor;
   an auxiliary motor controller for controlling the auxiliary motor; and
   a main controller for outputting a control signal to each of the motor controllers,
   wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller,
   wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller,
   wherein the main controller performs an overload handling process set in advance in a case where the overload determination signal is input from at least one of the motor controllers, and
   wherein the driving state of a corresponding one of the motors or the operation state of a corresponding one of the motor controllers itself is at least one of the following:

(1) a difference between a target number of revolutions and an actual number of revolutions of the corresponding motor, (2) an integrated value of motor current input to the corresponding motor, and (3) target torque or actual torque of the corresponding motor.

2. A control system for an electric motor-driven vehicle, the control system comprising:

a drive motor and an auxiliary motor that are connected to a power source unit;

a drive motor controller for controlling the drive motor;

an auxiliary motor controller for controlling the auxiliary motor; and a main controller for outputting a control signal to each of the motor controllers, wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller, wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller, wherein the main controller performs an overload handling process set in advance in a case where the overload determination signal is input from at least one of the motor controllers, wherein the main controller calculates or sets a target number of revolutions or target torque of at least one of the drive motor and the auxiliary motor according to a signal input from at least one operator sensor or an activation switch, and outputs a target signal that is a control signal indicating the target number of revolutions or the target torque which has been calculated or set to at least one of the drive motor controller and the auxiliary motor controller, wherein the motor controller to which the target signal has been input controls the drive motor or the auxiliary motor according to the target number of revolutions or the target torque, and wherein, as the overload handling process, the main controller selects the motor controller that is a processing target, and changes the target number of revolutions or the target torque which has been calculated or set, with respect to the motor controller which has been selected.

3. A control system for an electric motor-driven vehicle, the control system comprising:

a drive motor and an auxiliary motor that are connected to a power source unit;

a drive motor controller for controlling the drive motor;

an auxiliary motor controller for controlling the auxiliary motor; and a main controller for outputting a control signal to each of the motor controllers, wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller, wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller, and wherein in a case where the overload determination signal is input into the main controller from at least one of the motor controllers and the auxiliary motor is overloaded, the main controller decelerates, as an overload handling process set in advance, the drive motor compared with a case of normal control.

4. A control system for an electric motor-driven vehicle, the control system comprising:

a drive motor and an auxiliary motor that are connected to a power source unit;

a drive motor controller for controlling the drive motor;

an auxiliary motor controller for controlling the auxiliary motor; and a main controller for outputting a control signal to each of the motor controllers, wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller, wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller, and wherein in a case where the overload determination signal is input into the main controller from at least one of the motor controllers and the drive motor is overloaded, the main controller stops the auxiliary motor, as an overload handling process set in advance.

5. The control system for an electric motor-driven vehicle according to claim 4, wherein the main controller performs a step of decelerating the drive motor as compared with a case of normal control in a case where overloading of the drive motor continues for a predetermined period of time set in advance or longer after the auxiliary motor has been stopped, and a step of stopping the drive motor in a case where overloading of the drive motor continues for a predetermined period of time set in advance or longer after the drive motor has been decelerated.

6. A control system for an electric motor-driven vehicle, the control system comprising:

a drive motor and an auxiliary motor that are connected to a power source unit;

a drive motor controller for controlling the drive motor;

an auxiliary motor controller for controlling the auxiliary motor; and a main controller for outputting a control signal to each of the motor controllers, wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller, wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller, and wherein in a case where the overload determination signals are input into the main controller from at least one of the motor controllers and both the auxiliary motor and the drive motor are overloaded, the main controller performs, as an overload handling process set in advance, a step of stopping the auxiliary motor, a step of decelerating the drive motor as compared with a case of normal control in a case where overloading of the drive motor continues for a predetermined period of time set in advance or longer after the auxiliary motor has been stopped, and a step of stopping the drive motor in a case where overloading of the drive motor continues for a predetermined period of time set in advance or longer after the drive motor has been decelerated.

7. A control system for an electric motor-driven vehicle, the control system comprising:

a drive motor and an auxiliary motor that are connected to a power source unit;

a drive motor controller for controlling the drive motor;

an auxiliary motor controller for controlling the auxiliary motor; and a main controller for outputting a control signal to each of the motor controllers, wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller, wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller, wherein in a case where the overload determination signal is input into the main controller from at least one of the motor controllers and the auxiliary motor is overloaded, the main controller stops the auxiliary motor, as an overload handling process set in advance, and wherein the main controller performs a step of decelerating the drive motor as compared with a case of normal control in a case where overloading of the drive motor continues for a predetermined period of time set in advance or longer after the auxiliary motor has been stopped, and a step of stopping the drive motor in a case where overloading of the drive motor continues for a predetermined period of time set in advance or longer after the drive motor has been decelerated.

8. A control system for an electric motor-driven vehicle, the control system comprising:

a drive motor and an auxiliary motor that are connected to a power source unit;

a drive motor controller for controlling the drive motor;

an auxiliary motor controller for controlling the auxiliary motor; and a main controller for outputting a control signal to each of the motor controllers, wherein the drive motor controller determines, based on a driving state of the drive motor or an operation state of the drive motor controller itself, whether or not the drive motor is overloaded, and in a case where the drive motor is overloaded for a predetermined period of time set in advance or longer, outputs an overload determination signal to the main controller, wherein the auxiliary motor controller determines, based on a driving state of the auxiliary motor or an operation state of the auxiliary motor controller itself, whether or not the auxiliary motor is overloaded, and in a case where the auxiliary motor is overloaded for a predetermined period of time set in advance or longer, outputs an overload determination signal to the main controller, and wherein the main controller performs a step of decelerating the drive motor as compared with a case of normal control, as an overload handling process set in advance, in a case where the overload determination signal is input from at least one of the motor controllers and the auxiliary motor is overloaded, and a step of stopping the auxiliary motor in a case where overloading of the auxiliary motor or the drive motor continues for a predetermined period of time set in advance or longer after the drive motor has been decelerated.

* * * * *